United States Patent
Shoykher et al.

(10) Patent No.: US 10,248,219 B2
(45) Date of Patent: Apr. 2, 2019

(54) TRACKING USER BEHAVIOR VIA APPLICATION MONITORED CHANNEL CHANGING NOTIFICATIONS

(71) Applicant: Flextronics AP, LLC, San Jose, CA (US)

(72) Inventors: Mikhail Shoykher, Thornhill (CA); Sanjiv Sirpal, Oakville (CA)

(73) Assignee: Flextronics AP, LLC, San Jose, CA (US)

(*) Notice: Subject to any disclaimer, the term of this patent is extended or adjusted under 35 U.S.C. 154(b) by 0 days.

(21) Appl. No.: 15/693,801

(22) Filed: Sep. 1, 2017

(65) Prior Publication Data

US 2017/0366842 A1    Dec. 21, 2017

Related U.S. Application Data

(63) Continuation of application No. 14/841,199, filed on Aug. 31, 2015, now Pat. No. 9,774,918, which is a
(Continued)

(51) Int. Cl.
*G06F 3/01* (2006.01)
*H04N 21/431* (2011.01)
(Continued)

(52) U.S. Cl.
CPC ............ *G06F 3/017* (2013.01); *G06F 3/0481* (2013.01); *G06F 3/04817* (2013.01);
(Continued)

(58) Field of Classification Search
None
See application file for complete search history.

(56) References Cited

U.S. PATENT DOCUMENTS

| 5,539,479 A | 7/1996 | Bertram |
| 5,734,444 A * | 3/1998 | Yoshinobu ............... H04N 5/44 348/734 |

(Continued)

FOREIGN PATENT DOCUMENTS

| CN | 101540850 | 9/2009 |
| CN | 101567992 | 10/2009 |

(Continued)

OTHER PUBLICATIONS

Sohail, "Smart TV—A Late Bloomer," Harwarezonw.com, Apr. 1, 2011, 2 pages.
(Continued)

*Primary Examiner* — Justin E Shepard
(74) *Attorney, Agent, or Firm* — Sheridan Ross P.C.

(57) ABSTRACT

An intelligent television and methods for user interaction between the intelligent television and the user are provided. In general, a user is provided with navigation, notification, and setup options which enable one or more functions associated with the intelligent television. The presentation of options is based on input received by the intelligent television. As a user provides input to the intelligent television via a remote control or other input device, the intelligent television is configured to interpret the input and provide interactive functionality in the form of content presented to the display of the intelligent television.

20 Claims, 46 Drawing Sheets

Related U.S. Application Data continuation of application No. 13/968,929, filed on Aug. 16, 2013, now abandoned, and a continuation of application No. 13/968,983, filed on Aug. 16, 2013, now Pat. No. 9,271,039, and a continuation of application No. 13/968,948, filed on Aug. 16, 2013, now Pat. No. 9,414,108, and a continuation of application No. 13/968,937, filed on Aug. 16, 2013, now abandoned, and a continuation of application No. 14/418,972, filed as application No. PCT/CN2013/081639 on Aug. 16, 2013, now abandoned.

(60) Provisional application No. 61/684,672, filed on Aug. 17, 2012, provisional application No. 61/702,650, filed on Sep. 18, 2012, provisional application No. 61/697,710, filed on Sep. 6, 2012, provisional application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | |
|---|---|
| *H04N 21/4725* | (2011.01) |
| *H04N 21/40* | (2011.01) |
| *H04N 21/8545* | (2011.01) |
| *H04N 21/85* | (2011.01) |
| *H04N 21/43* | (2011.01) |
| *H04N 21/422* | (2011.01) |
| *H04N 21/25* | (2011.01) |
| *H04N 21/258* | (2011.01) |
| *H04N 21/24* | (2011.01) |
| *H04N 5/44* | (2011.01) |
| *H04N 21/262* | (2011.01) |
| *H04N 21/81* | (2011.01) |
| *H04N 21/442* | (2011.01) |
| *H04N 21/485* | (2011.01) |
| *H04N 21/84* | (2011.01) |
| *H04N 21/478* | (2011.01) |
| *G06F 3/0481* | (2013.01) |
| *H04N 21/61* | (2011.01) |
| *H04L 12/58* | (2006.01) |
| *G06F 3/0488* | (2013.01) |
| *H04N 5/445* | (2011.01) |
| *H04N 21/658* | (2011.01) |
| *H04N 21/426* | (2011.01) |
| *G06F 3/0484* | (2013.01) |
| *H04N 21/472* | (2011.01) |
| *H04N 21/414* | (2011.01) |
| *H04N 21/482* | (2011.01) |
| *H04N 21/231* | (2011.01) |
| *H04N 1/00* | (2006.01) |

(52) U.S. Cl.
CPC ...... *G06F 3/04842* (2013.01); *G06F 3/04883* (2013.01); *H04L 51/32* (2013.01); *H04N 1/00448* (2013.01); *H04N 5/4403* (2013.01); *H04N 5/44591* (2013.01); *H04N 21/23109* (2013.01); *H04N 21/24* (2013.01); *H04N 21/25* (2013.01); *H04N 21/251* (2013.01); *H04N 21/258* (2013.01); *H04N 21/25808* (2013.01); *H04N 21/25883* (2013.01); *H04N 21/25891* (2013.01); *H04N 21/26291* (2013.01); *H04N 21/40* (2013.01); *H04N 21/414* (2013.01); *H04N 21/422* (2013.01); *H04N 21/4221* (2013.01); *H04N 21/42203* (2013.01); *H04N 21/42684* (2013.01); *H04N 21/43* (2013.01); *H04N 21/431* (2013.01); *H04N 21/4302* (2013.01); *H04N 21/4312* (2013.01); *H04N 21/4314* (2013.01); *H04N 21/4316* (2013.01); *H04N 21/44204* (2013.01); *H04N 21/44222* (2013.01); *H04N 21/478* (2013.01); *H04N 21/4725* (2013.01); *H04N 21/47205* (2013.01); *H04N 21/485* (2013.01); *H04N 21/4823* (2013.01); *H04N 21/4858* (2013.01); *H04N 21/6125* (2013.01); *H04N 21/6175* (2013.01); *H04N 21/6582* (2013.01); *H04N 21/8166* (2013.01); *H04N 21/8173* (2013.01); *H04N 21/84* (2013.01); *H04N 21/85* (2013.01); *H04N 21/8545* (2013.01); *G06F 2203/04804* (2013.01); *H04N 2005/4414* (2013.01)

(56) References Cited

U.S. PATENT DOCUMENTS

| | | |
|---|---|---|
| 5,933,141 A | 8/1999 | Smith |
| 6,661,468 B2 | 12/2003 | Alten et al. |
| 6,978,473 B1 | 12/2005 | Nsonwu et al. |
| 7,152,236 B1 | 12/2006 | Wugofski et al. |
| 7,159,177 B2 | 1/2007 | Billmaier et al. |
| 7,487,529 B1 | 2/2009 | Orlick |
| 7,493,641 B2 | 2/2009 | Klosterman et al. |
| 7,543,320 B2 | 6/2009 | Schein et al. |
| 7,685,520 B2 | 3/2010 | Rashkovskiy et al. |
| 7,694,319 B2 | 4/2010 | Hassell et al. |
| 7,880,077 B2 | 2/2011 | Pauws et al. |
| 7,900,228 B2 | 3/2011 | Stark et al. |
| 7,908,635 B2 | 3/2011 | Barton et al. |
| 8,006,201 B2 | 8/2011 | Bhattacharya |
| 8,127,329 B1 | 2/2012 | Kunkel et al. |
| 8,132,221 B2 | 3/2012 | Malik |
| 8,166,511 B2 | 4/2012 | Griggs |
| 8,220,021 B1 | 7/2012 | Look et al. |
| 8,281,339 B1 | 10/2012 | Walker et al. |
| 8,352,983 B1 | 1/2013 | Chane et al. |
| 8,510,780 B2 | 8/2013 | Stallings et al. |
| 8,516,519 B2 | 8/2013 | Lee |
| 8,549,561 B2 | 10/2013 | Yeh et al. |
| 8,640,166 B1 | 1/2014 | Craner |
| 8,683,519 B2 | 3/2014 | McCarthy et al. |
| 8,776,101 B2 | 7/2014 | Donoghue et al. |
| 8,875,056 B2 | 10/2014 | Onogi et al. |
| 9,055,255 B2 | 6/2015 | Burdzinski et al. |
| 9,118,864 B2 | 8/2015 | Sirpal et al. |
| 9,247,174 B2 | 1/2016 | Sirpal et al. |
| 9,271,039 B2 | 2/2016 | Sirpal et al. |
| 9,414,108 B2 | 8/2016 | Sirpal et al. |
| 9,510,040 B2 | 11/2016 | Selim et al. |
| 9,774,918 B2 | 9/2017 | Sirpal et al. |
| 2001/0056577 A1 | 12/2001 | Gordon et al. |
| 2002/0026637 A1 | 2/2002 | Markel et al. |
| 2002/0067376 A1 | 6/2002 | Martin et al. |
| 2002/0188944 A1 | 12/2002 | Noble |
| 2002/0188958 A1 | 12/2002 | Miller |

(56) References Cited

U.S. PATENT DOCUMENTS

| | | |
|---|---|---|
| 2003/0028880 A1 | 2/2003 | Smith et al. |
| 2003/0069874 A1 | 4/2003 | Hertzog et al. |
| 2003/0070171 A1 | 4/2003 | Jeon et al. |
| 2003/0182659 A1 | 9/2003 | Ellis et al. |
| 2003/0221192 A1 | 11/2003 | Rappaport et al. |
| 2004/0216156 A1 | 10/2004 | Wagner |
| 2005/0097622 A1 | 5/2005 | Zigmond et al. |
| 2006/0117343 A1 | 6/2006 | Novak et al. |
| 2006/0136965 A1 | 6/2006 | Ellis et al. |
| 2007/0011702 A1 | 1/2007 | Vaysman |
| 2007/0199022 A1 | 8/2007 | Moshiri et al. |
| 2007/0261090 A1 | 11/2007 | Miller et al. |
| 2008/0022309 A1 | 1/2008 | Begeja et al. |
| 2008/0086745 A1 | 4/2008 | Knudson et al. |
| 2008/0120635 A1 | 5/2008 | Trimper et al. |
| 2008/0155613 A1 | 6/2008 | Benya et al. |
| 2008/0282294 A1 | 11/2008 | Carpenter et al. |
| 2009/0013350 A1 | 1/2009 | Ohlfs et al. |
| 2009/0158375 A1 | 6/2009 | Rodriguez et al. |
| 2009/0160764 A1 | 6/2009 | Myllymäki |
| 2009/0199241 A1 | 8/2009 | Unger et al. |
| 2009/0204929 A1 | 8/2009 | Baurmann et al. |
| 2009/0228919 A1 | 9/2009 | Zott et al. |
| 2009/0271823 A1 | 10/2009 | Jung et al. |
| 2009/0313232 A1 | 12/2009 | Tinsley et al. |
| 2010/0013997 A1 | 1/2010 | Hwang |
| 2010/0037267 A1 | 2/2010 | Bennett |
| 2010/0060799 A1 | 3/2010 | Ishii |
| 2010/0095317 A1* | 4/2010 | Toebes .............. H04N 7/163 725/9 |
| 2010/0177252 A1 | 7/2010 | Larsen et al. |
| 2010/0180292 A1 | 7/2010 | Epstein et al. |
| 2010/0180300 A1 | 7/2010 | Carpenter et al. |
| 2010/0225830 A1 | 9/2010 | Blanchard et al. |
| 2010/0251304 A1 | 9/2010 | Donoghue et al. |
| 2011/0078745 A1 | 3/2011 | Macrae et al. |
| 2011/0107376 A1 | 5/2011 | Lee et al. |
| 2011/0119626 A1 | 5/2011 | Faenger et al. |
| 2011/0119702 A1 | 5/2011 | Jang et al. |
| 2011/0145860 A1 | 6/2011 | Wei |
| 2011/0179453 A1 | 7/2011 | Poniatowski |
| 2011/0289419 A1 | 11/2011 | Yu et al. |
| 2012/0030317 A1 | 2/2012 | Smyth et al. |
| 2012/0072952 A1 | 3/2012 | Vaysman et al. |
| 2012/0076473 A1 | 3/2012 | Kunkel et al. |
| 2012/0090004 A1 | 4/2012 | Jeong |
| 2012/0120316 A1 | 5/2012 | Lee |
| 2012/0144416 A1 | 6/2012 | Wetzer et al. |
| 2012/0144422 A1 | 6/2012 | Han et al. |
| 2012/0144423 A1 | 6/2012 | Kim et al. |
| 2012/0167142 A1* | 6/2012 | Hey ..................... H04N 5/76 725/44 |
| 2012/0174039 A1 | 7/2012 | Rhoads et al. |
| 2012/0185902 A1 | 7/2012 | LaRosa et al. |
| 2012/0200574 A1 | 8/2012 | Hill et al. |
| 2012/0210275 A1 | 8/2012 | Park et al. |
| 2012/0210370 A1 | 8/2012 | Kim et al. |
| 2012/0210386 A1 | 8/2012 | Kim et al. |
| 2012/0221972 A1 | 8/2012 | Patterson et al. |
| 2012/0257108 A1 | 10/2012 | Friedlander et al. |
| 2012/0260284 A1 | 10/2012 | Young et al. |
| 2012/0272271 A1 | 10/2012 | Nishizawa et al. |
| 2012/0291068 A1 | 11/2012 | Khushoo et al. |
| 2013/0198685 A1 | 8/2013 | Bernini et al. |
| 2013/0326557 A1 | 12/2013 | Kang et al. |
| 2014/0047467 A1* | 2/2014 | Arling ............ H04N 21/42204 725/14 |
| 2014/0053180 A1 | 2/2014 | Shoykher |
| 2014/0053198 A1 | 2/2014 | Sirpal et al. |
| 2014/0059606 A1 | 2/2014 | Selim et al. |
| 2014/0059635 A1 | 2/2014 | Sirpal et al. |
| 2014/0068674 A1 | 3/2014 | Sirpal et al. |
| 2015/0201147 A1 | 7/2015 | Sirpal et al. |
| 2016/0050462 A1 | 2/2016 | Sirpal et al. |
| 2017/0099521 A1 | 4/2017 | Sirpal et al. |

FOREIGN PATENT DOCUMENTS

| | | |
|---|---|---|
| CN | 201937743 | 8/2011 |
| EP | 2328346 | 6/2011 |
| EP | 2487922 | 8/2012 |
| WO | WO 99/21308 | 4/1999 |

OTHER PUBLICATIONS

International Search Report and Written Opinion for International (PCT) Patent Application No. PCT/US2013/055293, dated Dec. 2, 2013 12 pages.

International Preliminary Report for International (PCT) Patent Application No. PCT/US2013/055293, dated Feb. 26, 2015 12 pages.

International Search Report and Written Opinion for International (PCT) Patent Application No. PCT/US2013/055294, dated Dec. 2, 2013 10 pages.

International Preliminary Report on Patentability for International (PCT) Patent Application No. PCT/US2013/055294, dated Feb. 26, 2015 10 pages.

International Search Report and Written Opinion for International (PCT) Patent Application No. PCT/US2013/055296, dated Nov. 29, 2013 9 pages.

International Preliminary Report on Patentability for International (PCT) Patent Application No. PCT/US2013/055296, dated Feb. 26, 2015 8 pages.

International Search Report and Written Opinion for International (PCT) Patent Application No. PCT/US13/55493, dated Nov. 7, 2013 9 pages.

International Preliminary Report on Patentability for International (PCT) Patent Application No. PCT/US13/55493, dated Feb. 26, 2015 8 pages.

International Search Report and Written Opinion for International (PCT) Patent Application No. PCT/US13/55509, dated Nov. 8, 2013 9 pages.

International Preliminary Report on Patentability for International (PCT) Patent Application No. PCT/US13/55509, dated Feb. 26, 2015 8 pages.

International Search Report and Written Opinion for Intenational (PCT) Patent Application No. PCT/CN2013/081639, dated Nov. 28, 2013 10 pages.

International Preliminary Report for International (PCT) Patent Application No. PCT/CN2013/081639, dated Feb. 26, 2015 6 pages.

International Search Report and Written Opinion for International (PCT) Patent Application No. PCT/US2013/055303, dated Dec. 5, 2013 8 pages.

International Preliminary Report on Patentability for International (PCT) Patent Application No. PCT/US2013/055303, dated Feb. 26, 2015 7 pages.

International Search Report and Written Opinion for International (PCT) Patent Application No. PCT/US2013/055280, dated Jan. 10, 2014 10 pages.

International Preliminary Report on Patentability for International (PCT) Patent Application No. PCT/US2013/055280, dated Jun. 11, 2015 9 pages.

International Search Report and Written Opinion for International (PCT) Patent Application No. PCT/US2013/055298, dated Nov. 29, 2013 8 pages.

International Preliminary Report for International (PCT) Patent Application No. PCT/US2013/055298, dated Feb. 26, 2015 7 pages.

Official Action for U.S. Appl. No. 13/968,983, dated Jul. 7, 2014 15 pages.

Final Action for U.S. Appl. No. 13/968,983, dated Nov. 26, 2014 17 pages.

Official Action for U.S. Appl. No. 13/968,983, dated Mar. 12, 2015 21 pages.

Notice of Allowance for U.S. Appl. No. 13/968,983, dated Oct. 8, 2015 23 pages.

Official Action for U.S. Appl. No. 13/968,948 dated May 6, 2014 11 pages.

(56) References Cited

OTHER PUBLICATIONS

Official Action for U.S. Appl. No. 13/968,948, dated Nov. 24, 2014 13 pages.
Official Action for U.S. Appl. No. 13/968,948, dated Mar. 11, 2015 13 pages.
Official Action for U.S. Appl. No. 13/968,948, dated Jul. 17, 2015 13 pages.
Notice of Allowance for U.S. Appl. No. 13/968,948, dated Mar. 28, 2016 7 pages.
Official Action for U.S. Appl. No. 13/968,929, dated Apr. 29, 2015 12 pages.
Official Action for U.S. Appl. No. 14/841,199, dated Oct. 6, 2016 10 pages.
Official Action for U.S. Appl. No. 14/841,199, dated Feb. 1, 2017 12 pages.
Notice of Allowance for U.S. Appl. No. 14/841,199, dated Apr. 17, 2017 8 pages.
Official Action for U.S. Appl. No. 13/969,588, dated Nov. 10, 2014 11 pages.
Official Action for U.S. Appl. No. 13/969,588, dated Mar. 11, 2015 12 pages.
Official Action for U.S. Appl. No. 13/969,588, dated Aug. 17, 2015 13 pages.
Official Action for U.S. Appl. No. 13/969,588, dated Jan. 21, 2016 14 pages.
Official Action for U.S. Appl. No. 15/358,788, dated Feb. 28, 2017 10 pages.
Notice of Allowance for U.S. Appl. No. 15/358,788, dated Oct. 20, 2017 9 pages.
Official Action for U.S. Appl. No. 13/970,374, dated Jun. 6, 2014 7 pages.
Official Action for U.S. Appl. No. 13/970,374, dated Dec. 9, 2014 9 pages.
Official Action for U.S. Appl. No. 13/970,374, dated May 22, 2015 11 pages.
Official Action for U.S. Appl. No. 14/834,316, dated Jan. 14, 2016 11 pages.
Notice of Allowance for U.S. Appl. No. 14/834,316, dated Jul. 20, 2016 7 pages.
Official Action for U.S. Appl. No. 14/418,972, dated Jun. 16, 2016 15 pages.
Official Action for U.S. Appl. No. 13/968,665, dated Oct. 9, 2014 12 pages.
Official Action for U.S. Appl. No. 13/968,665, dated May 7, 2015 11 pages.
Notice of Allowance for U.S. Appl. No. 13/968,665, dated Sep. 4, 2015 8 pages.
Official Action for U.S. Appl. No. 13/968,897, dated Aug. 15, 2014 15 pages.
Official Action for U.S. Appl. No. 13/968,897, dated Jan. 28, 2015 18 pages.
Official Action for U.S. Appl. No. 13/968,897, dated May 8, 2015 21 pages.
Official Action for U.S. Appl. No. 14/822,705, dated Mar. 11, 2016 21 pages.
Official Action for U.S. Appl. No. 14/822,705, dated Sep. 20, 2016 27 pages.
Official Action for U.S. Appl. No. 14/822,705, dated May 17, 2017 34 pages.
Official Action for U.S. Appl. No. 14/822,705, dated Oct. 6, 2017 48 pages.
Official Action for U.S. Appl. No. 13/968,937, dated Dec. 18, 2014 9 pages.
Official Action for U.S. Appl. No. 13/968,937, dated Apr. 7, 2015 10 pages.
Official Action for U.S. Appl. No. 13/968,937, dated Jul. 17, 2015 9 pages.
Final Action for U.S. Appl. No. 13/968,937, dated Feb. 4, 2016 11 pages.
International Search Report and Written Opinion for International (PCT) Patent Application No. PCT/US2013/036828, dated Jun. 28, 2013 12 pages.
International Preliminary Report on Patentability for International (PCT) Patent Application No. PCT/US2013/036828, dated Feb. 26, 2015 12 pages.
International Search Report and Written Opinion for International (PCT) Patent Application No. PCT/US2013/055349, dated Nov. 29, 2013 7 pages.
International Preliminary Report for International (PCT) Patent Application No. PCT/US2013/055349, dated Apr. 2, 2015 7 pages.
Official Action for U.S. Appl. No. 13/864,120 dated Jun. 13, 2014 10 pages.
Official Action for U.S. Appl. No. 13/864,120, dated Dec. 24, 2014 13 pages.
Notice of Allowance for U.S. Appl. No. 13/864,120, dated Apr. 14, 2015 9 pages.
Official Action for U.S. Appl. No. 13/968,969, dated May 6, 2014 12 pages.
Official Action for U.S. Appl. No. 13/968,969, dated Aug. 19, 2014 14 pages.
Notice of Allowance for U.S. Appl. No. 13/968,969, dated Jan. 6, 2015 6 pages.

* cited by examiner

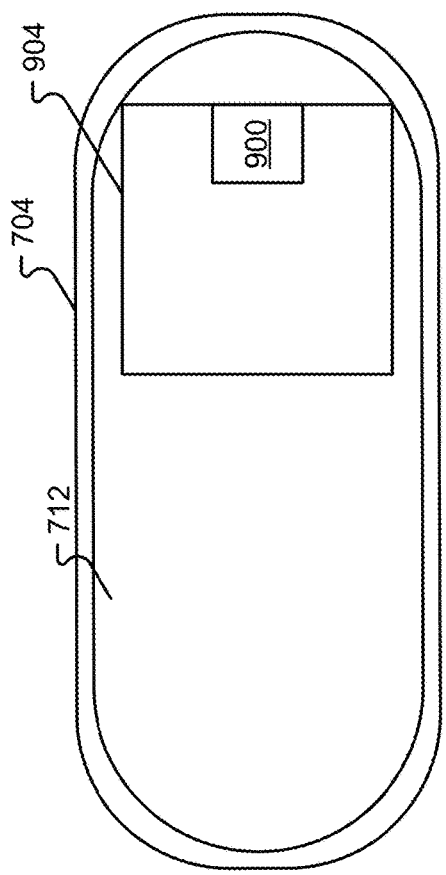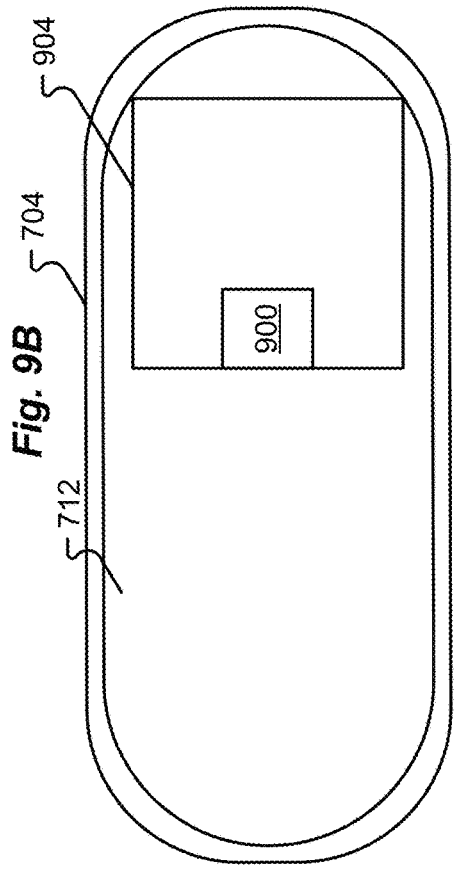

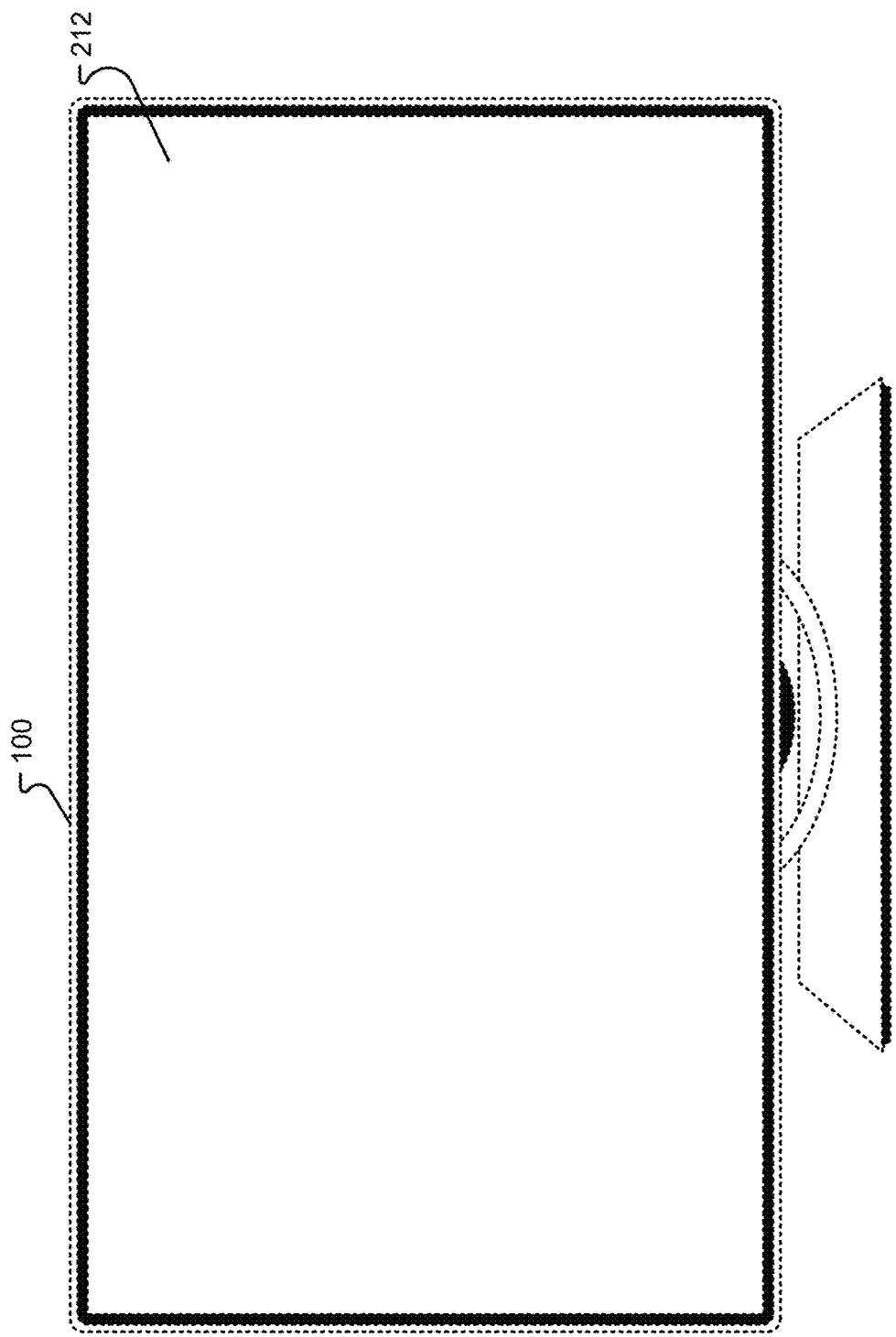

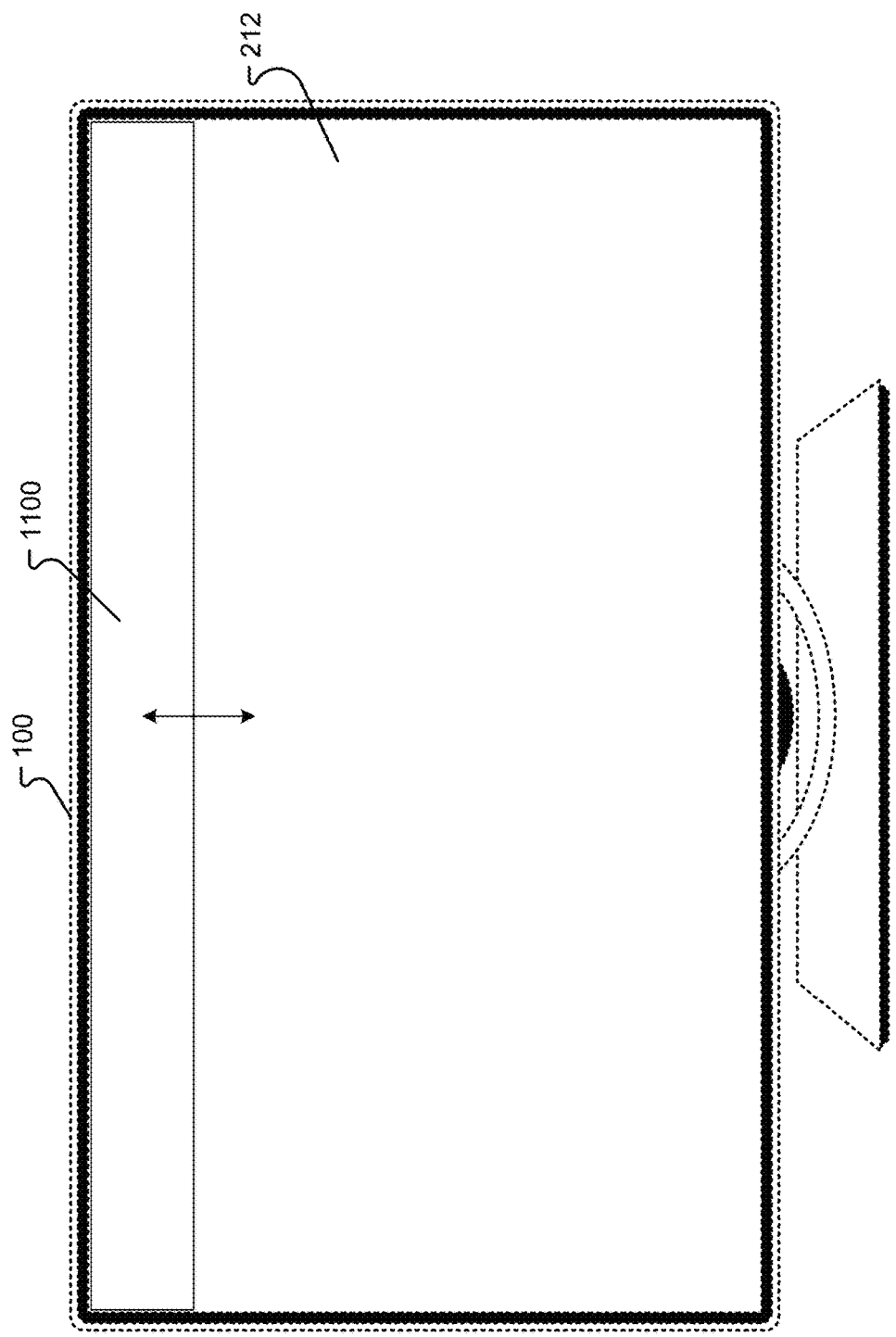

TRACKING USER BEHAVIOR VIA APPLICATION MONITORED CHANNEL CHANGING NOTIFICATIONS

CROSS REFERENCE TO RELATED APPLICATION

The present application is a continuation of and claims priority to U.S. patent application Ser. No. 14/841,199 filed on Aug. 31, 2015, entitled "Live Television Application Information Panel, which is a continuation of and claims priority to U.S. patent application Serial Nos.: (1) Ser. No. 13/968,929 filed on Aug. 16, 2013, entitled "Live Television Application Information Panel"; (2) Ser. No. 13/968,983 filed on Aug. 16, 2013, entitled "Live Television Application Setup Behavior"; (3) Ser. No. 13/968,948 filed on Aug. 16, 2013, entitled "Electronic Program Guide and Preview Window"; (4) Ser. No. 13/968,937 filed on Aug. 16, 2013, entitled "Tracking User Behavior via Application Monitored Channel Changing Notifications"; and (5) Ser. No. 14/418,972 filed on Feb. 2, 2015, entitled "Reminder Dialog Presentation and Behavior," which is a national stage application under 35 U.S.C. 371 of PCT Application No. PCT/CN13/81639, having an international filing date of Apr. 16, 2013, each of which claims the benefits of and priority, under 35 U.S.C. § 119(e), to U.S. Provisional Application Ser. No. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

In embodiments, a method is provided, comprising: detecting a first signal source change made at an intelligent television (TV); sending a first notification of the first signal source change detected to a live TV application, wherein the first notification includes first viewing information associated with the first signal source change; storing, in a memory associated with the intelligent TV, the first viewing information associated with the first signal source change; and associating the first viewing information with a user of the intelligent TV.

In another embodiment, a tangible, non-transitory computer readable medium is provided having instructions stored thereon that, when executed by a processor, perform the method comprising: detecting a first signal source change made at an intelligent television (TV); sending a first notification of the first signal source change detected to a live TV application, wherein the first notification includes first viewing information associated with the first signal source change; storing, in a memory associated with the intelligent TV, the first viewing information associated with the first signal source change; and associating the first viewing information with a user of the intelligent TV.

In yet another embodiment, a system is provided, comprising: an intelligent television (TV) having a display and a tuner, wherein the tuner is configured to receive and convert broadcast content signals to be displayed by the display; an input device associated with the intelligent TV; a memory; and a microprocessor operable to: detect a first signal source change made at the intelligent TV; send a first notification of the first signal source change detected to a live TV application, wherein the first notification includes first viewing information associated with the first signal source change; store, in the memory, the first viewing information associated with the first signal source change; and associate the first viewing information with a user of the intelligent TV.

The present disclosure can provide a number of advantages depending on the particular aspect, embodiment, and/or configuration. Among other things, embodiments of the present disclosure allow a user to interface with live television content via a live TV application of an intelligent TV. More specifically, a user may be provided with navigation, notification, and/or setup options which are associated with or enable one or more functions of the intelligent TV.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p—1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777, 600 pixels (approximately 0.8 megapixels) per field or 1,555,200 pixels (approximately 1.6 megapixels) per frame), or 720p—1280×720p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTÉ Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages." The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 9B is a bottom view of an embodiment of a remote control with the joystick in a lower position;

FIG. 9C is a bottom view of an embodiment of a remote control with the joystick in an upper position;

FIG. 11A is a front view of an embodiment of an Intelligent TV screen;

FIG. 11B is a front view of an embodiment of an Intelligent TV screen;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
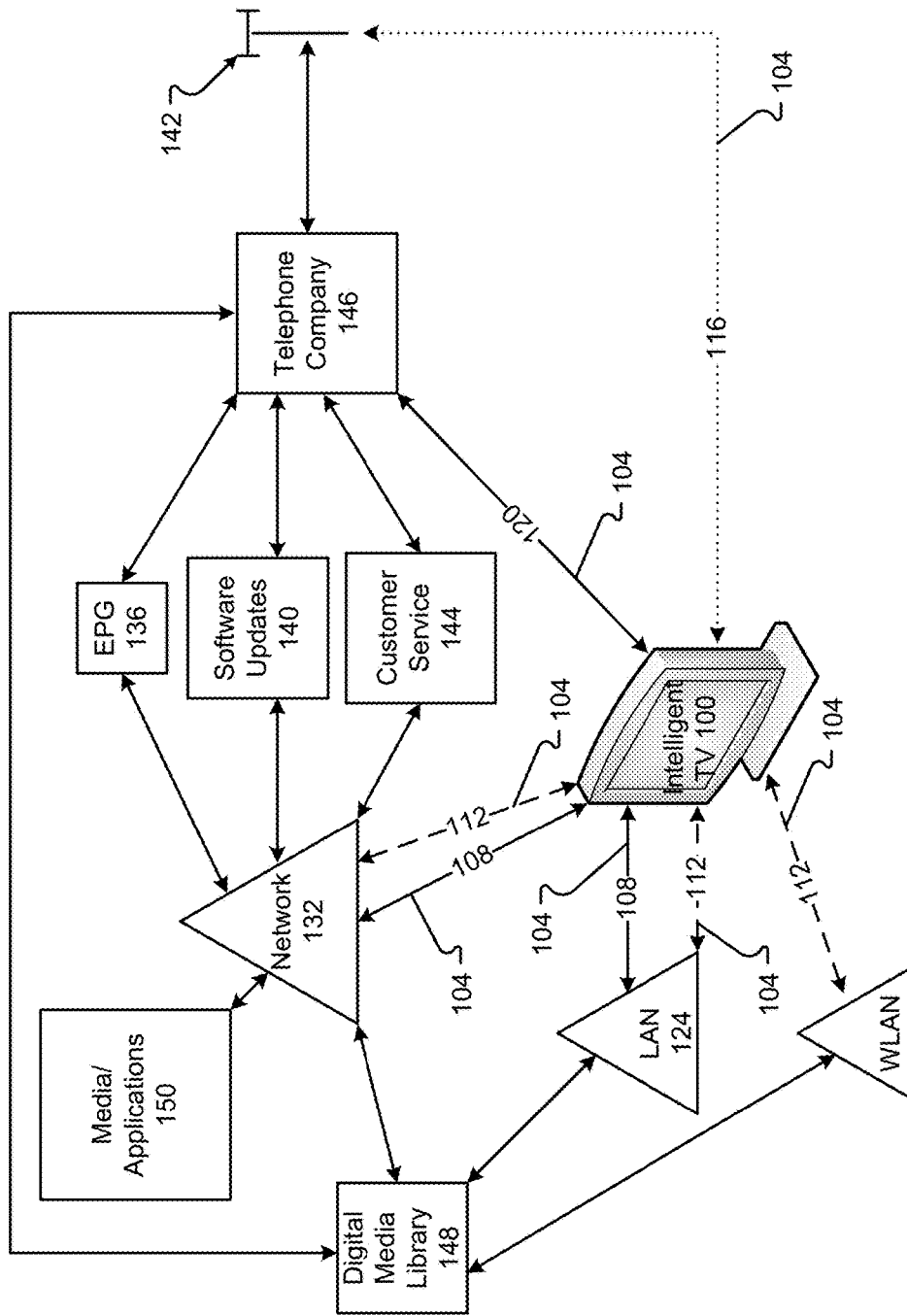
FIG. 1A includes a first view of an embodiment of an environment of an intelligent television.
Figure 1B:
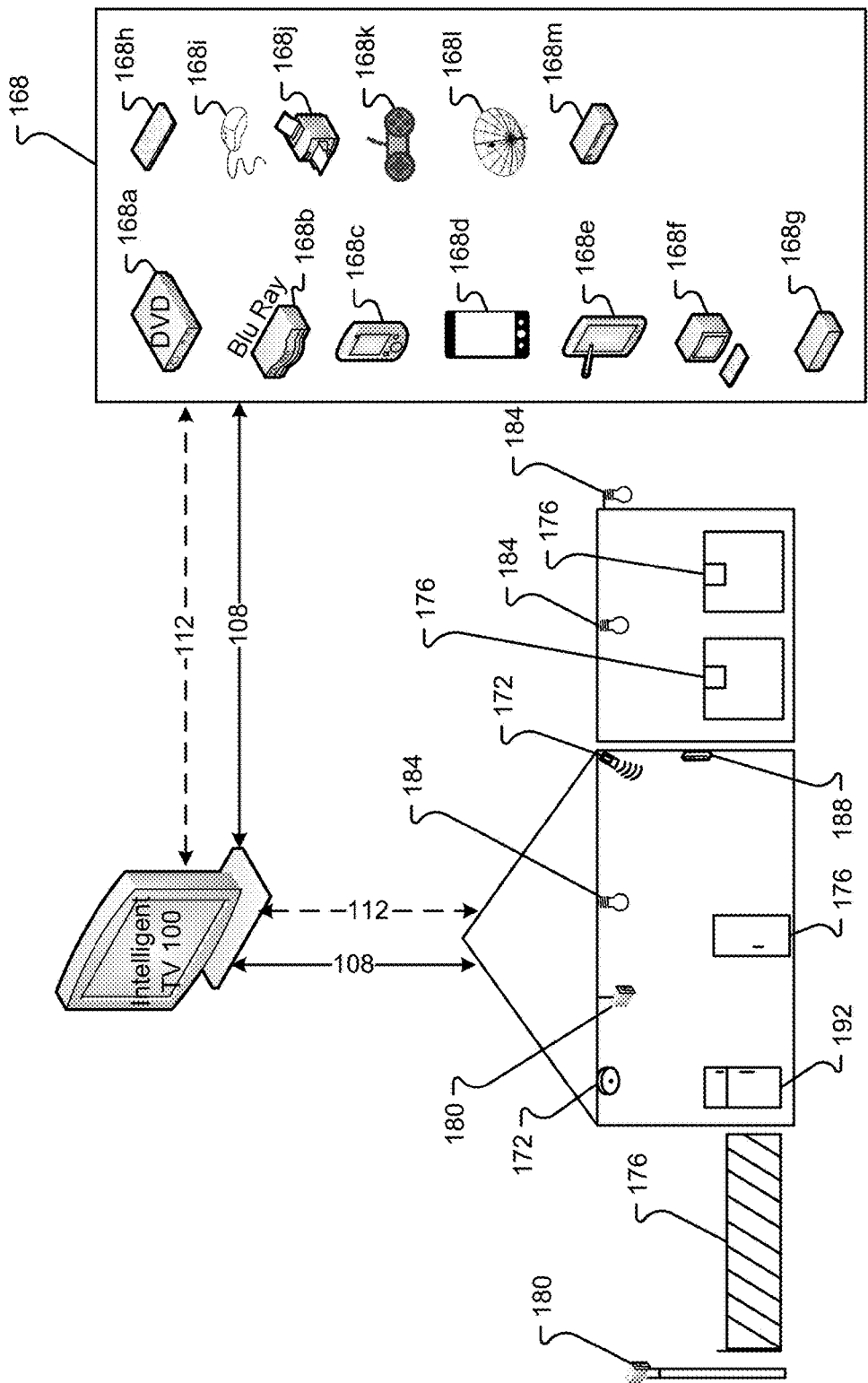
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks 132 may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the Intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™ Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168*a*, BluRay players 168*b*, portable digital media devices 168*c*, smart phones 168*d*, tablet devices 168*e*, personal computers 168*f*, external cable boxes 168*g*, keyboards 168*h*, pointing devices 168*i*, printers 168*j*, game controllers and/or game pads 168*k*, satellite dishes 168*l*, external display devices 168*m*, and other universal serial bus (USB), local area network (LAN), Bluetooth™, or high-definition multimedia interface (HDMI) compliant devices, and/or wireless devices. When connected to an external cable box 168*g* or satellite dish 168*l*, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
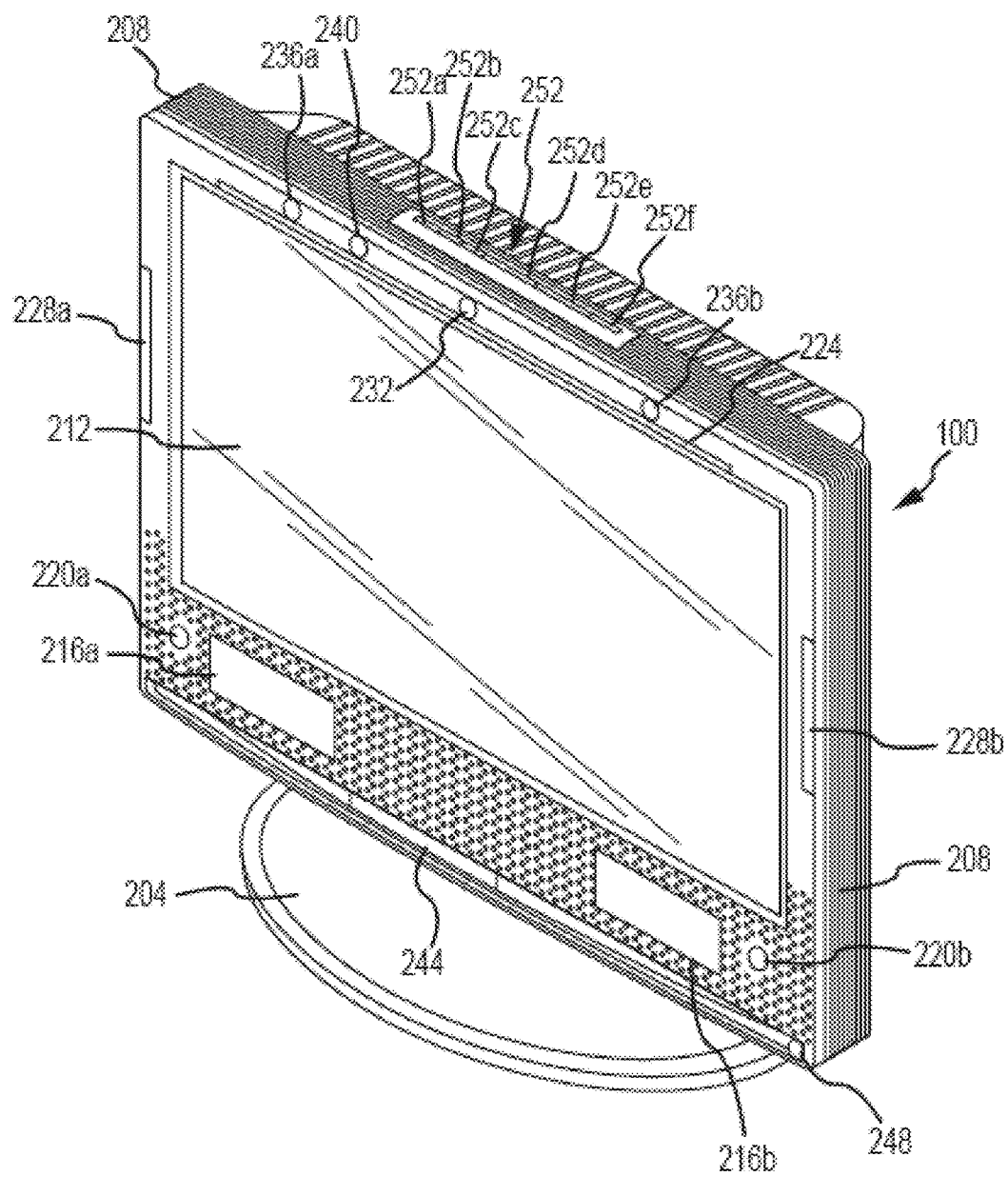
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
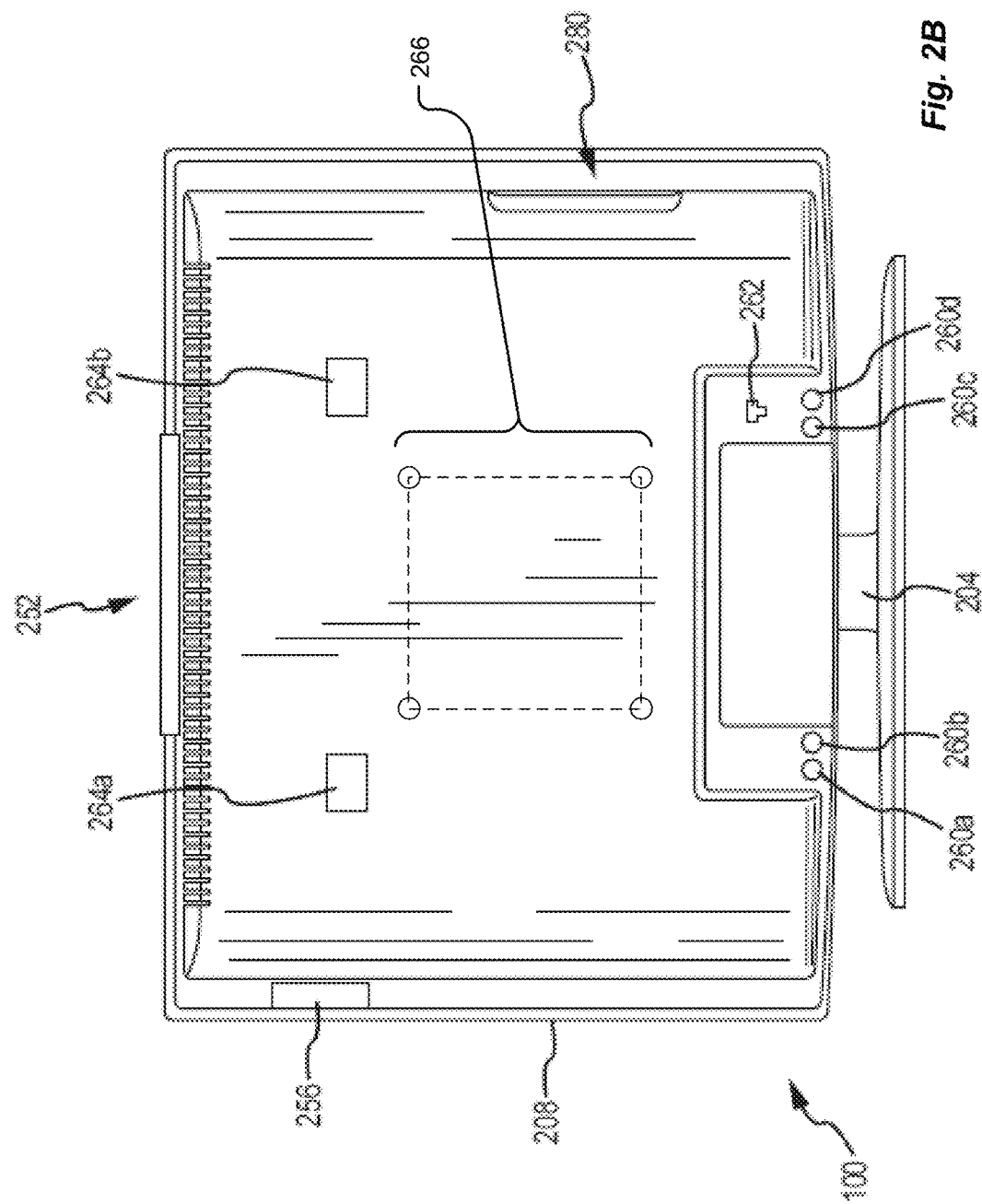
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
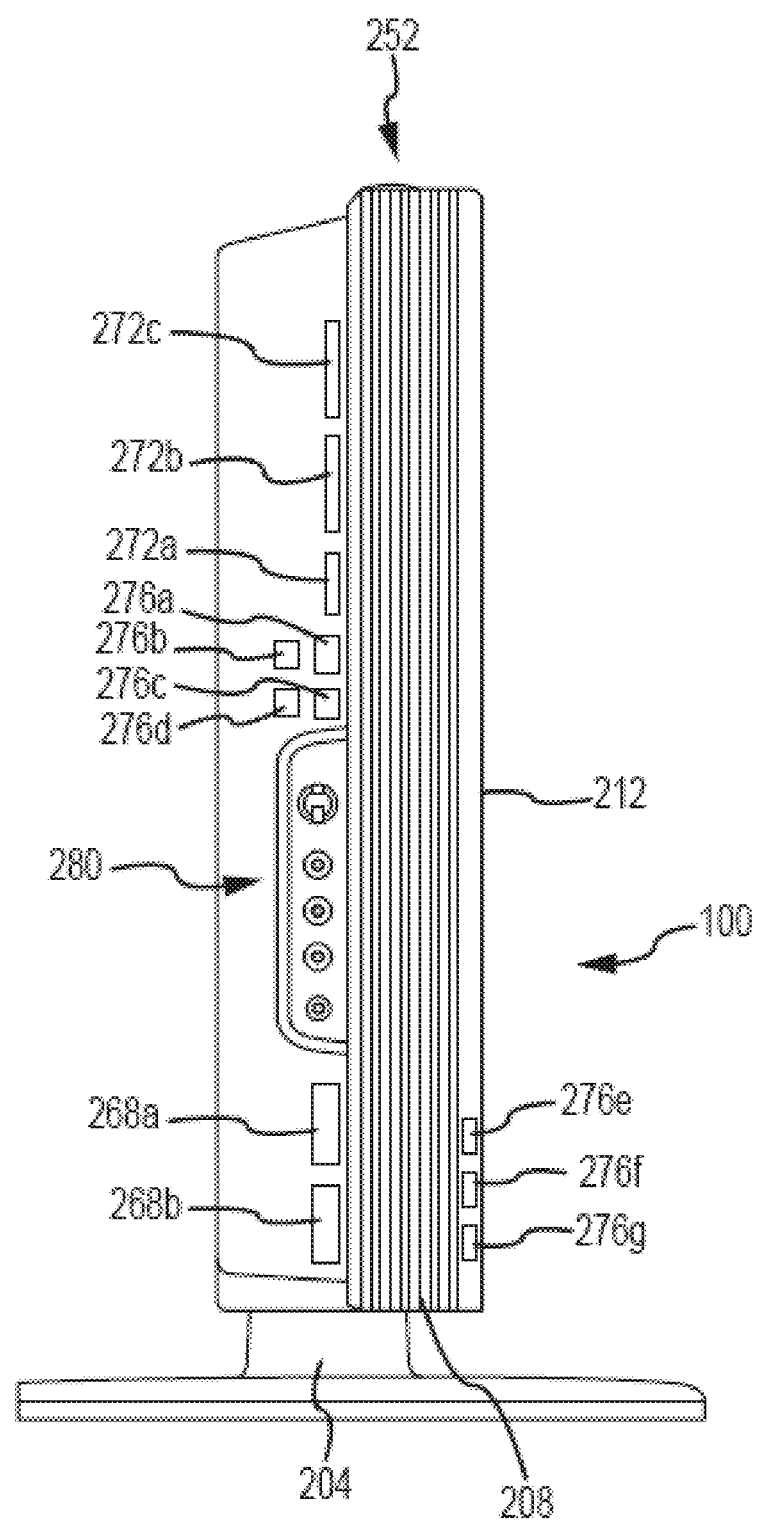
FIG. 2C includes a third view of an embodiment of an intelligent television.
Figure 2D:
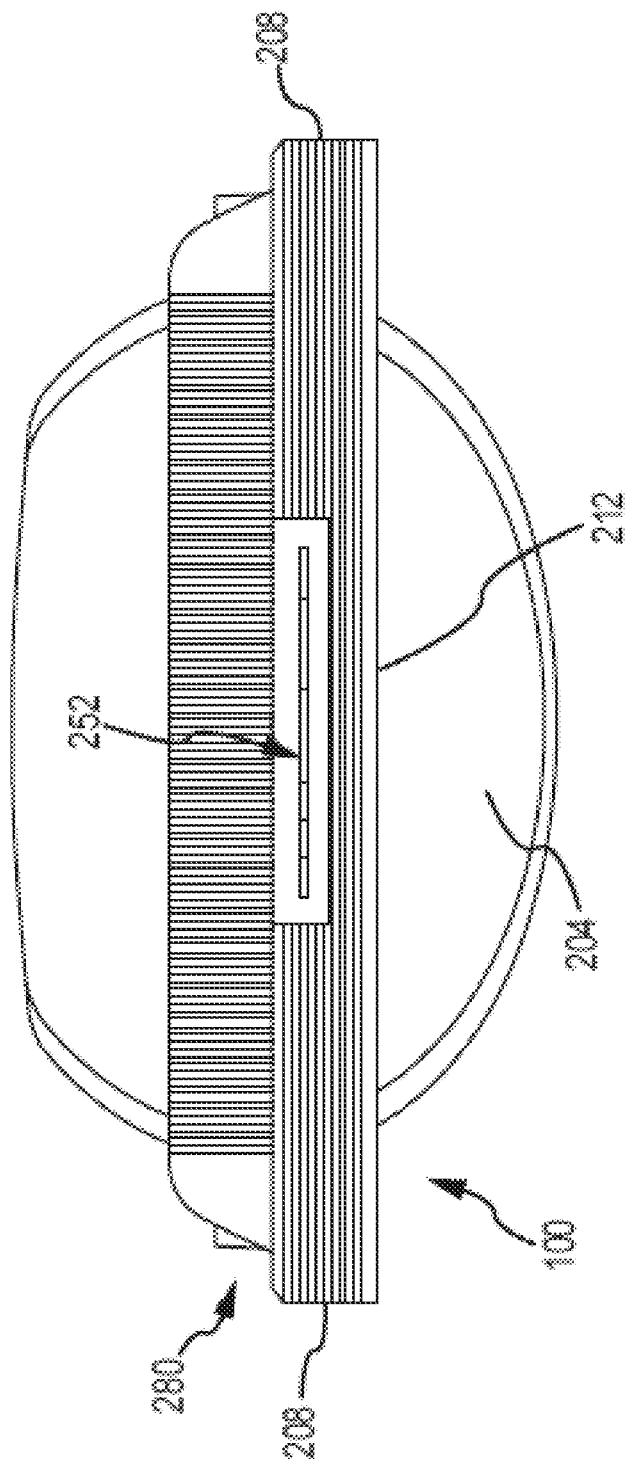
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (AN) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
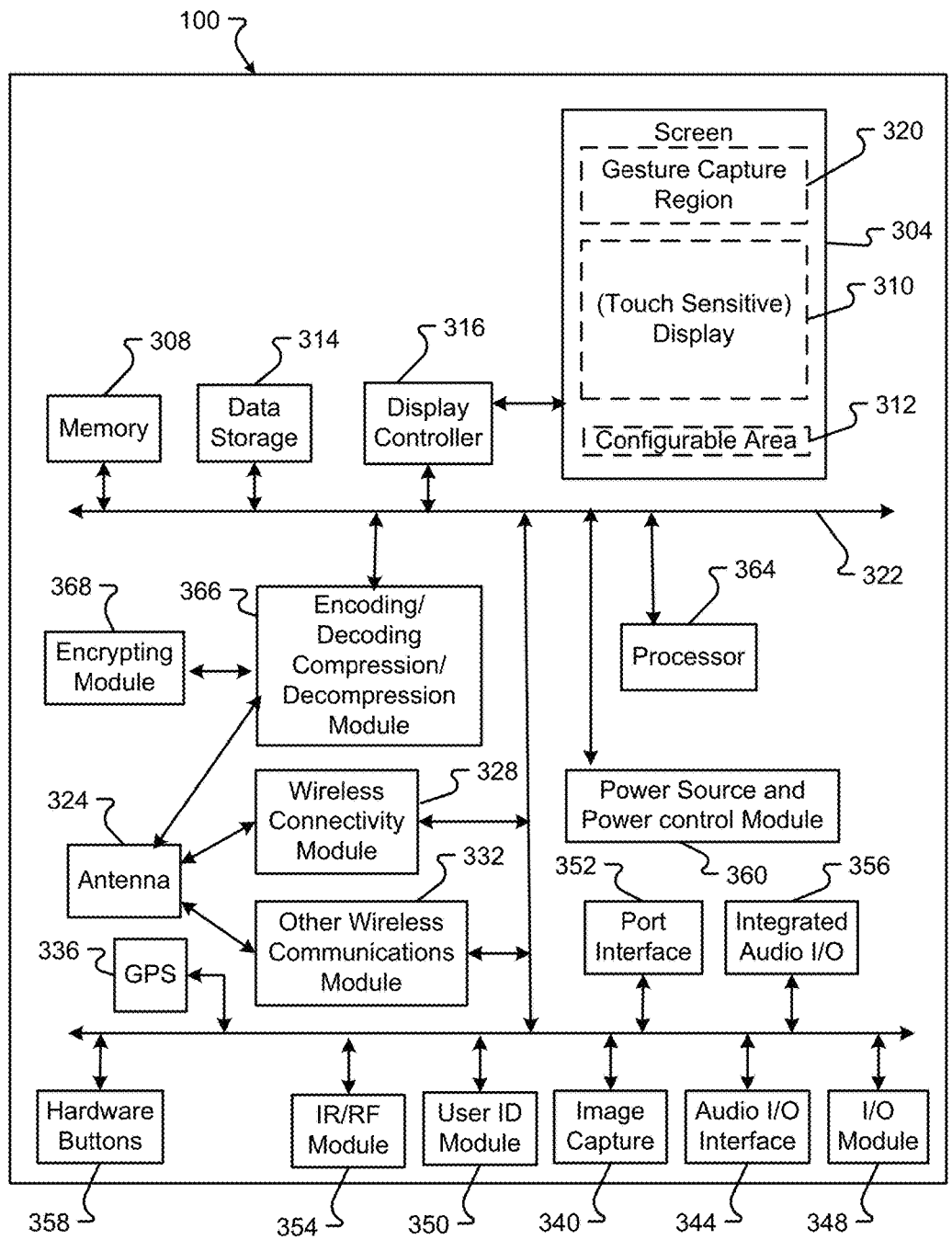
FIG. 3 is a block diagram of an embodiment of the hardware of an intelligent television.

Hardware Features:

FIG. 3 illustrates components of an Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
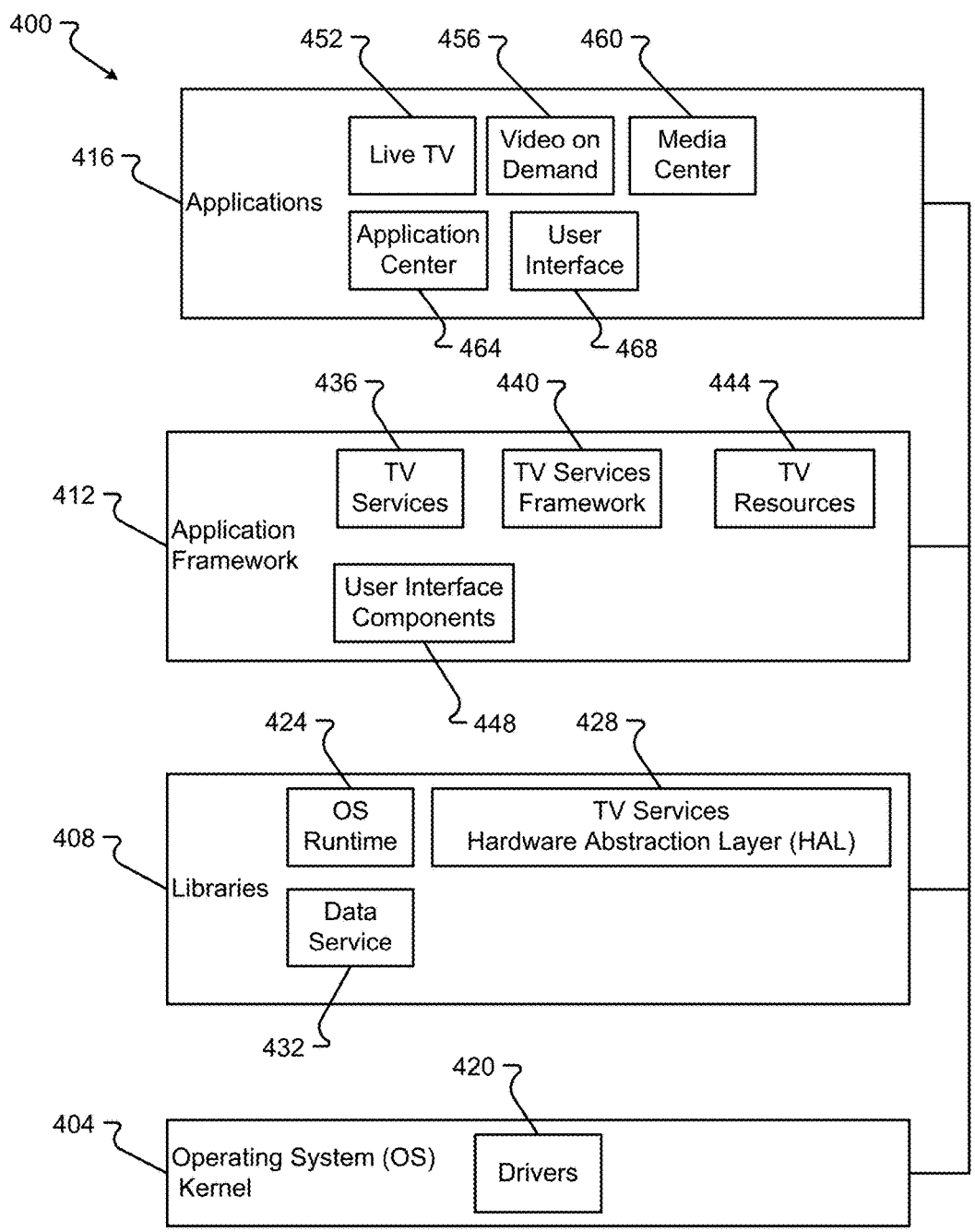
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
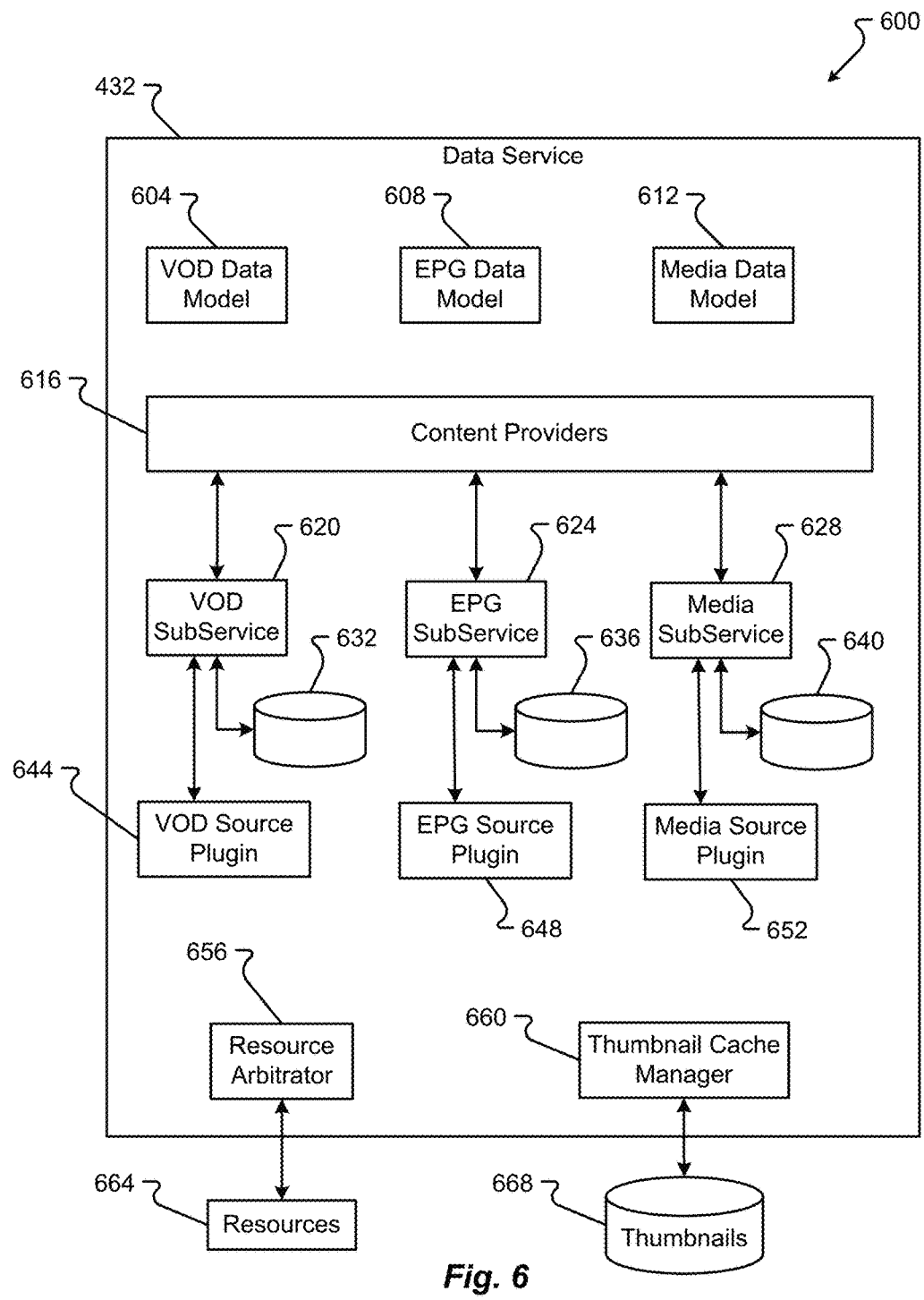
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any types of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
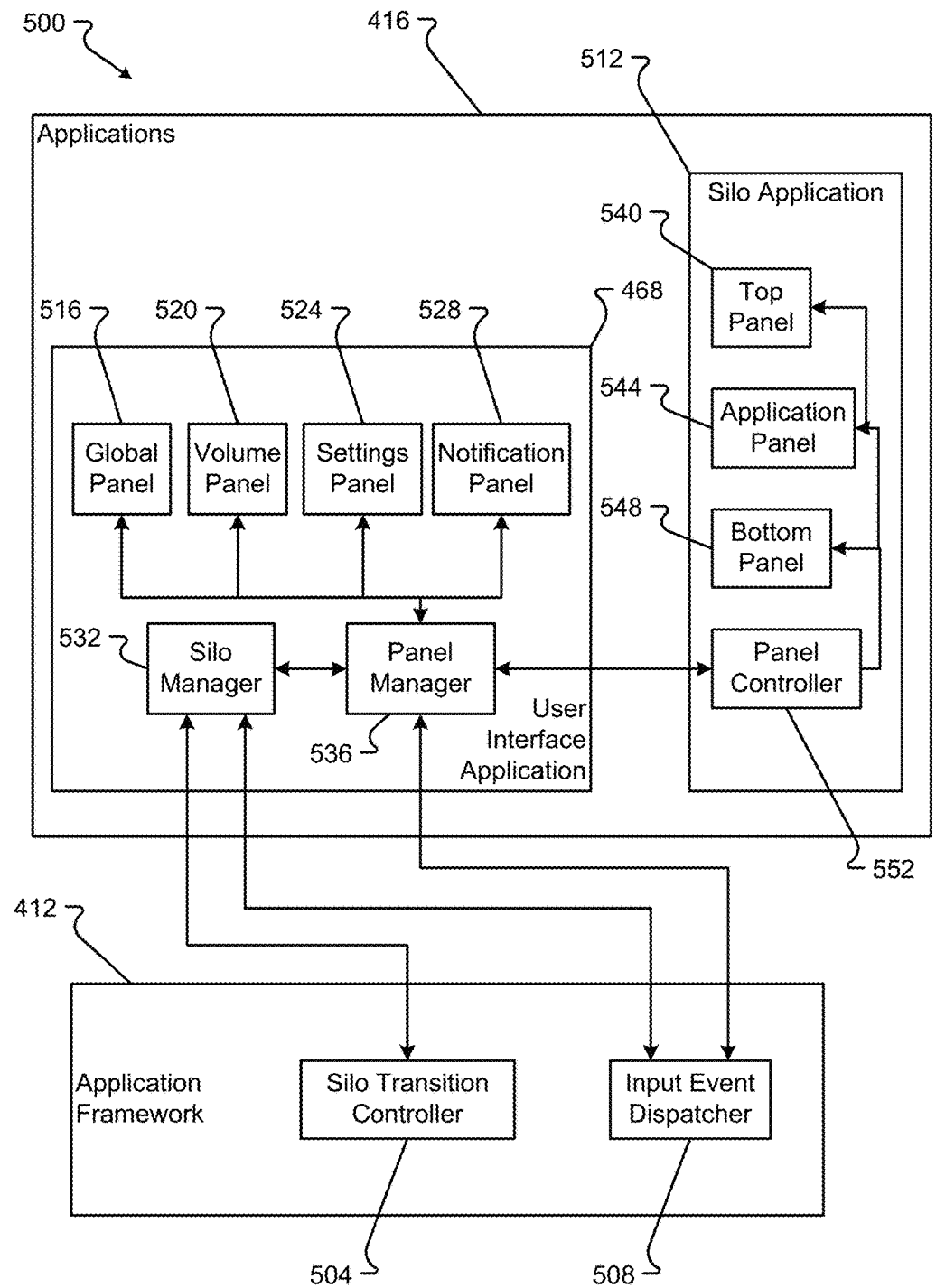
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further the thumbnail cache manager 660 may extract or retrieve that information from the thumbnails database 668 to provide to one of the data subservices 620, 624, 628.

Figure 13:
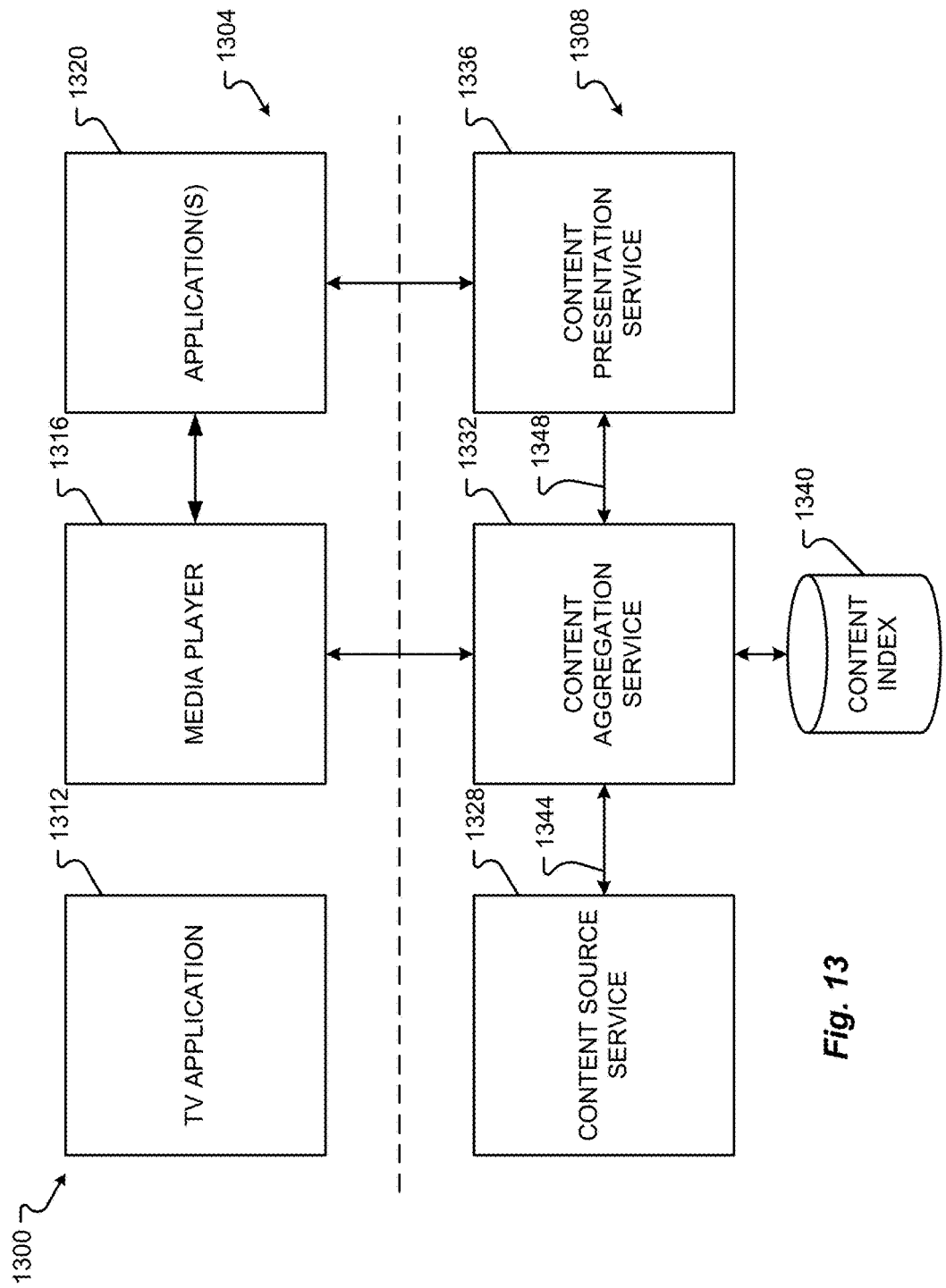
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
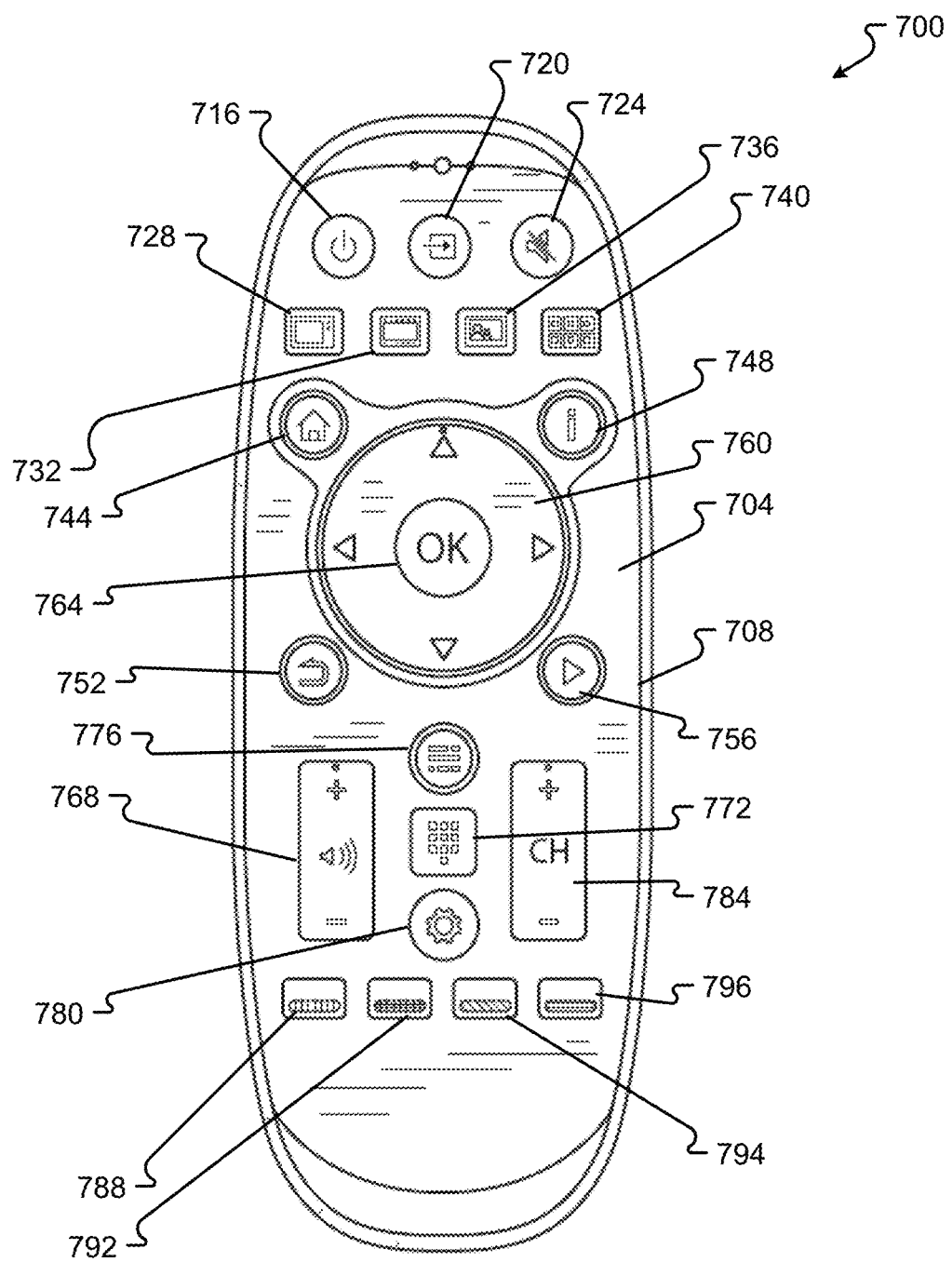
FIG. 7 is a plan view of an embodiment of a handheld remote control.
Figure 8:
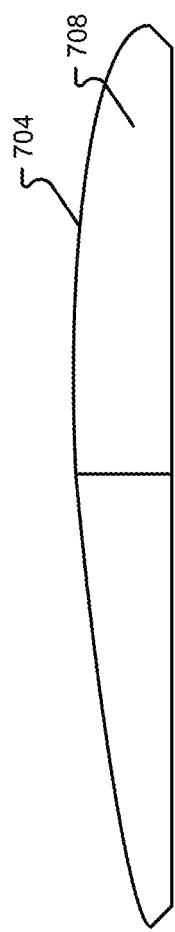
FIG. 8 is a side view of an embodiment of a remote control.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9A:
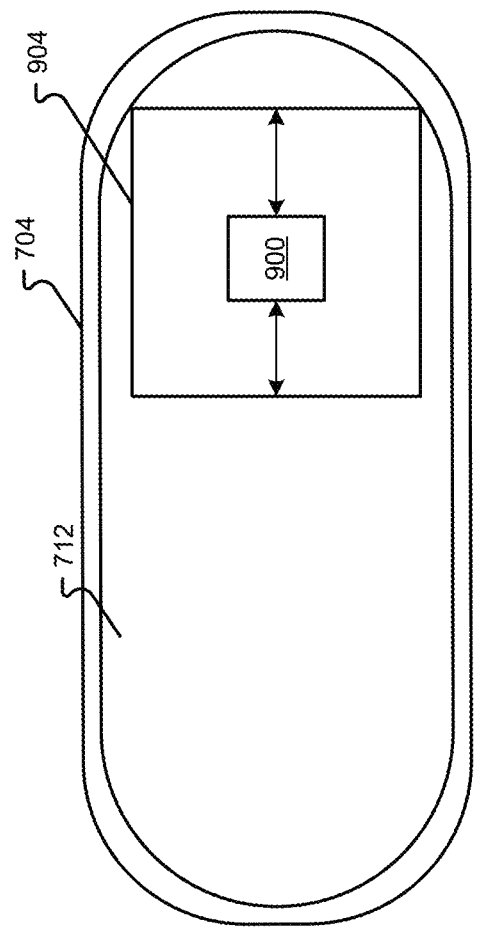
FIG. 9A is a bottom view of an embodiment of a remote control with a joystick in a neutral position.
Figure 11C:
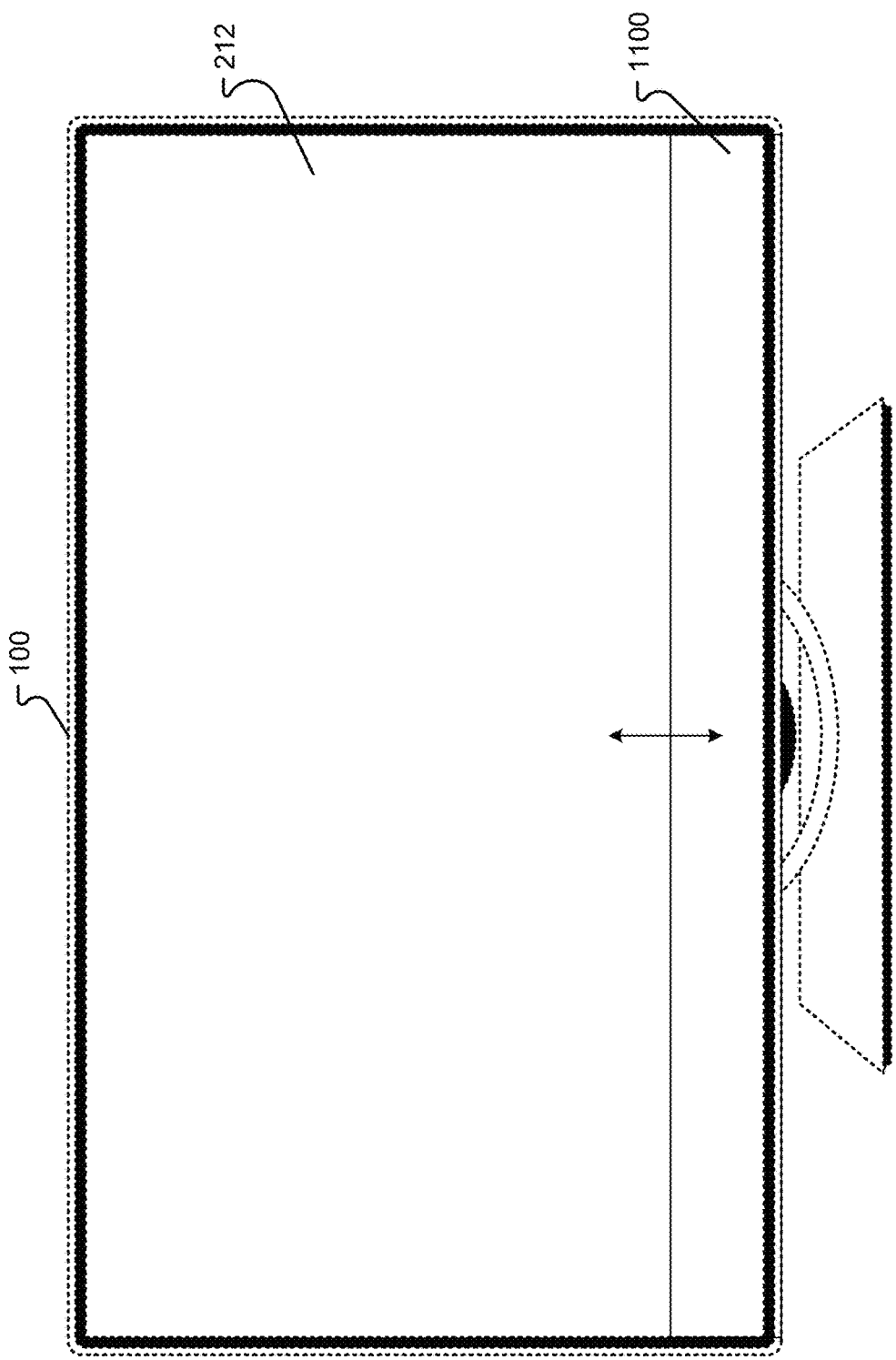
FIG. 11C is a front view of an embodiment of an Intelligent TV screen.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
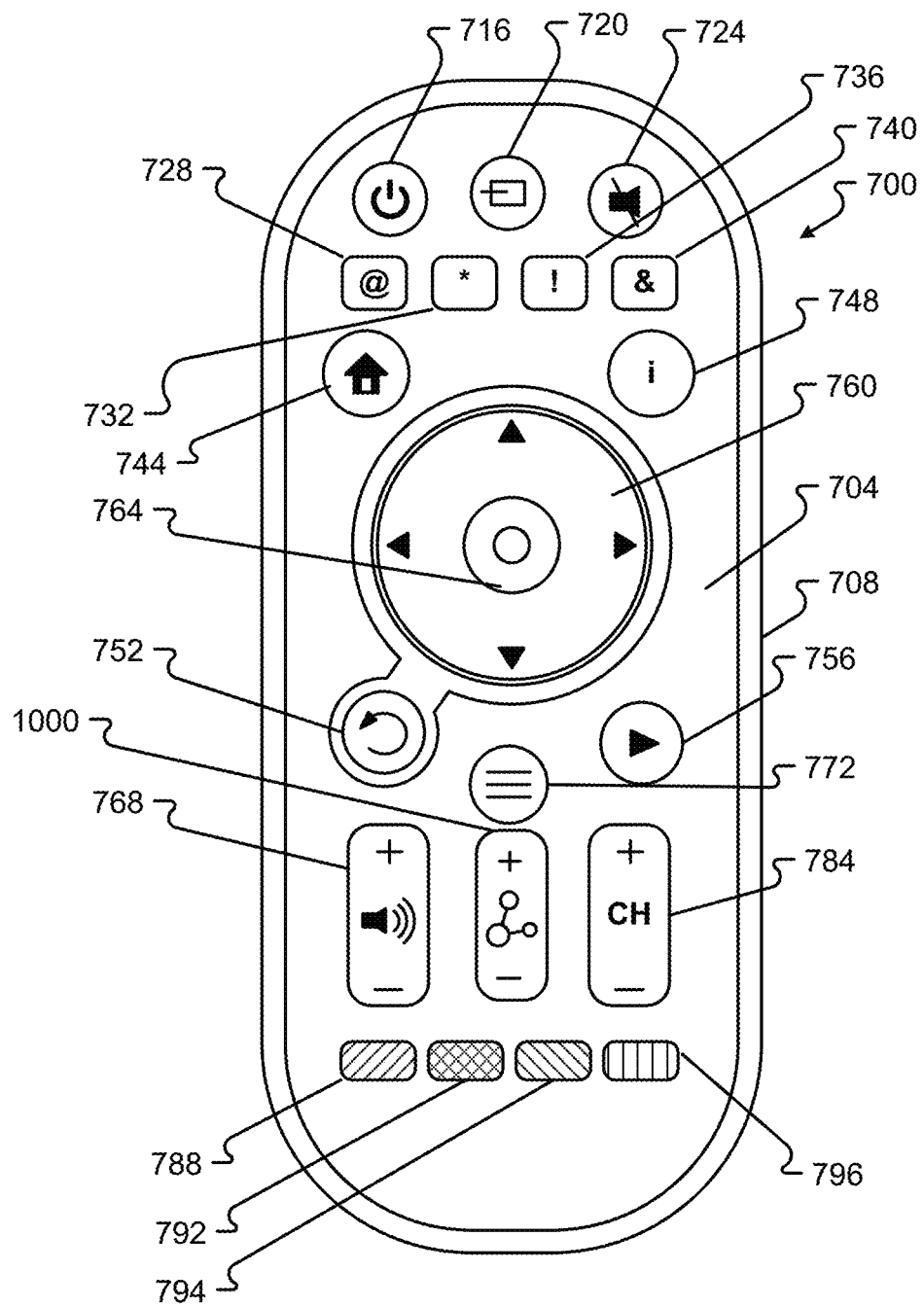
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, Myspace™, Twitter™, YouTube™, DailyMotion™, Facebook™, Google+™, or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
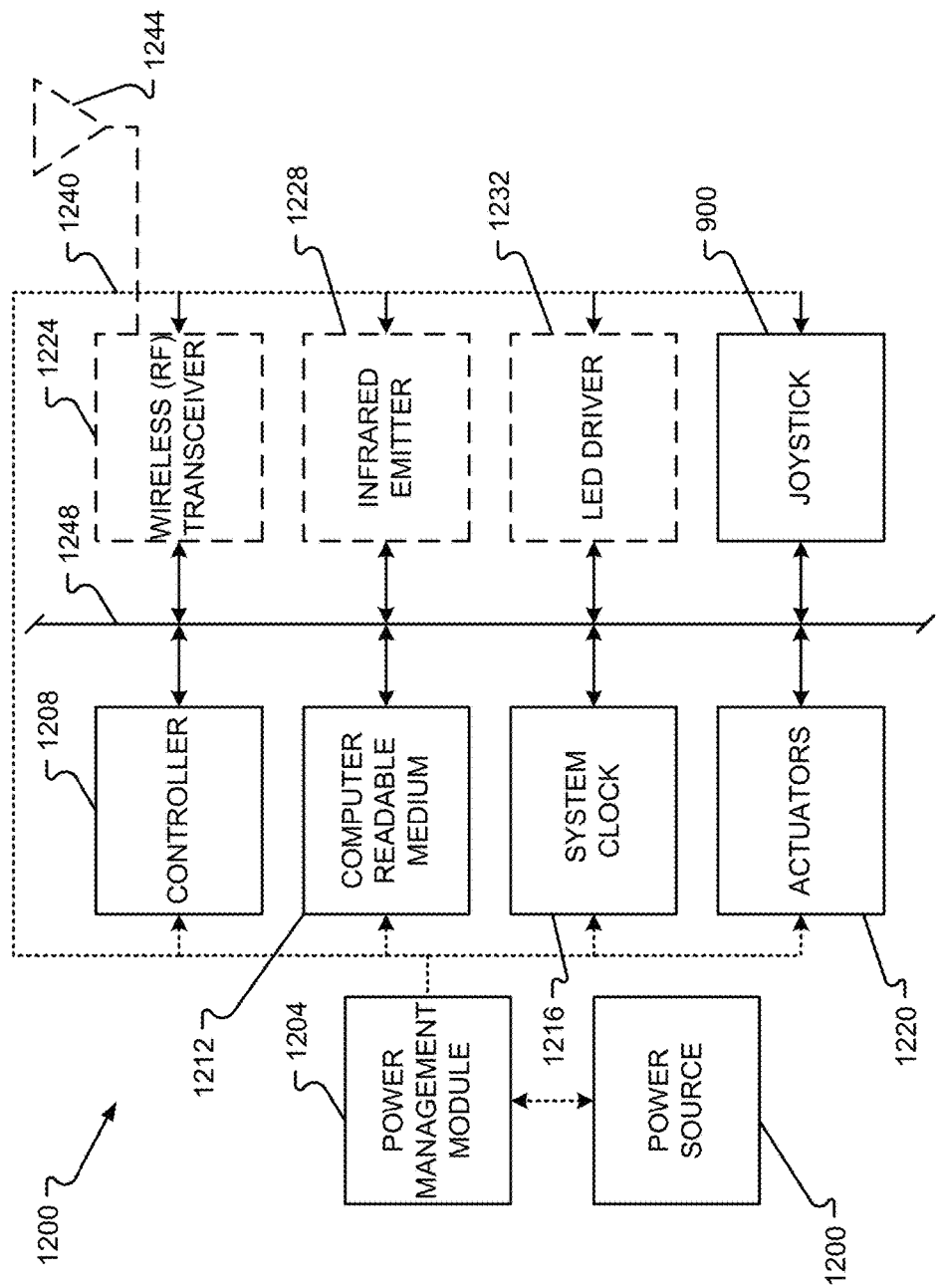
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
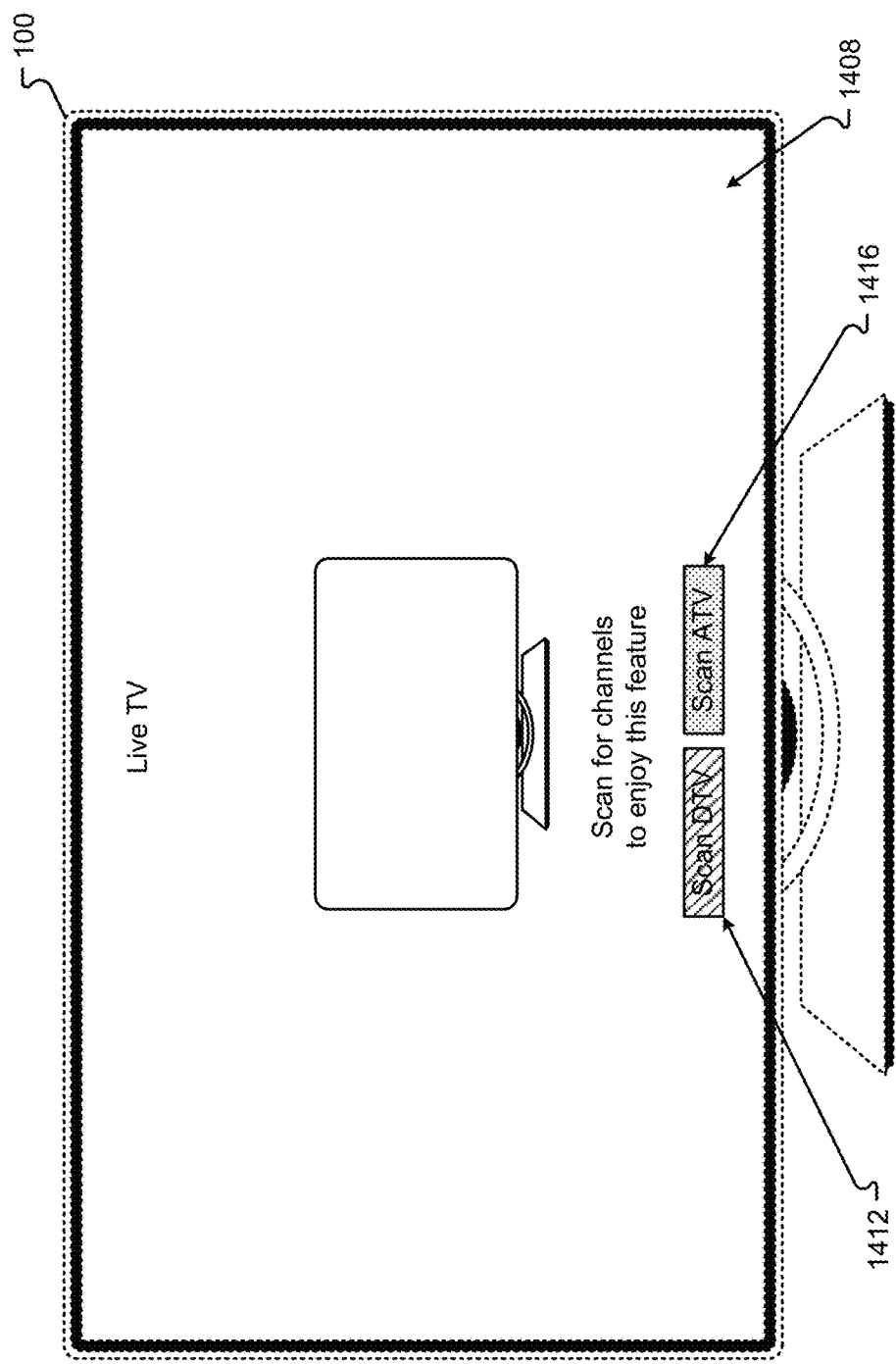
FIG. 14 is a visual representation of a user interface that is presented to an Intelligent TV when a live TV application is in a first time experience state in accordance with embodiments of the present disclosure.

Live TV and Interface:

FIG. 14 depicts a first-time experience user interface 1408 for the live TV application of an Intelligent TV 100. Before the functionality associated with the live TV application may be enabled, one or more channel sets may need to be scanned. As such, if the live TV application is started and no channel sets have been scanned, the user may be prompted to scan for channels. Channel sets may be associated with at least one signal source. For instance, one signal source may correspond to analog television channels while another may correspond to digital television channels. In some embodiments, the at least one signal source may include one or more of an over-the-air broadcast medium, a digital TV channel source, an analog TV channel source, a cable provider, a satellite provider, the Internet, a multiple-system operator (MSO), and combinations thereof. In this example, two buttons 1412 and 1416 are presented to the user. The button 1412, when selected by the user, requires the TV 100 to scan digital TV signals to determine which channels or content sources are available for the live TV application. Similarly, if the user selects button 1416, the television 100 scans analog TV signals to determine the channels that may be available for the live TV application. The buttons 1412, 1416 may be selected via a remote control or other input device.

In some embodiments, a scan may have been previously conducted for either the analog or the digital TV signals or channel sets. In this case, a user may be presented with a "switch to" button in lieu of a "scan for" button as one of the options displayed to the intelligent television 100. The "switch to" button, if selected, may allow a user to access an available channel set and even the functionality associated with the live TV application. For example, if a user has previously conducted a scan of analog channels (ATV), but has not scanned for digital channels (DTV), button 1412 may read "Scan DTV" while button 1416 may read "Switch to ATV." As can be appreciated, the same may apply for a previously conducted scan of digital channels where analog channels have not been previously scanned. The option to switch to a previously scanned channel set may be provided in the event that at least one channel has been found in a previous scan. However, when both channel sets have been scanned, the functionality associated with live TV may be enabled.

Figure 15:
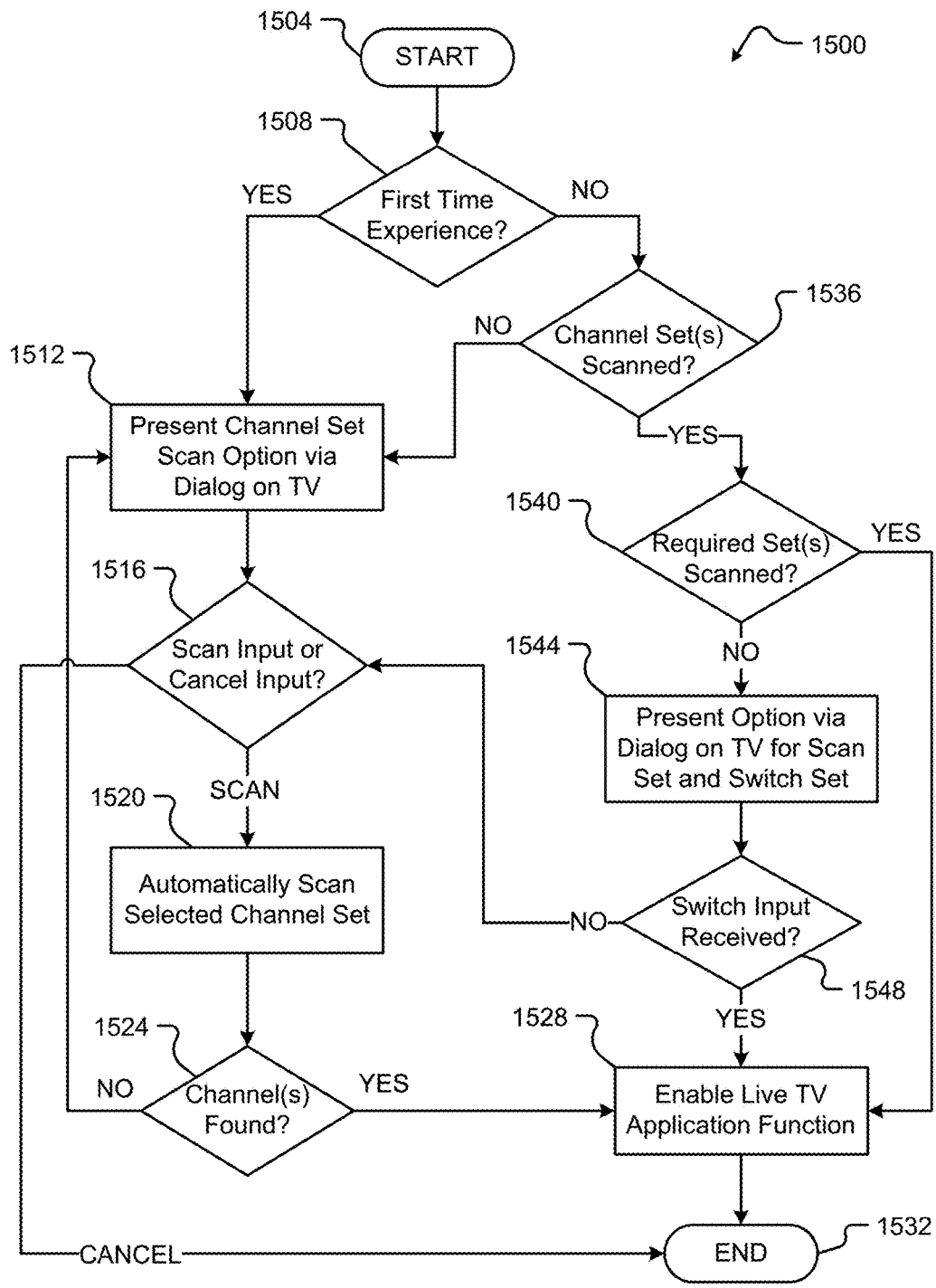
FIG. 15 is a flow diagram depicting a first time experience setup method in accordance with embodiments of the present disclosure.

FIG. 15 is a flow diagram depicting a first time experience setup method 1500 in accordance with embodiments of the present disclosure. The method 1500 begins at step 1504 when a user attempts to access the live TV application of the Intelligent TV 100. Next, the method 1500 may determine whether the live TV application is accessed for the first time (step 1508). In some cases, this determination may be made by the Intelligent TV 100 recognizing that the live TV application has not been previously configured.

If it is determined that the Intelligent TV 100 should present a first-time experience to a user, the method 1500 may continue by presenting one or more channel set scan options via the Intelligent TV 100. In some embodiments, the channel sets may be grouped by various signal sources. For example, the scan options may include analog television, digital television, combinations thereof, and the like as provided herein. It is anticipated that the scan options may be presented as interactive dialog boxes displayed to the Intelligent TV 100.

In response to the presented scan options, a user may provide a scan input or a cancel input (step 1516). As can be appreciated, the scan or cancel input may be provided via a remote control or other input device. In one embodiment, one of the scan options may be highlighted by default. As such, a user may only need to provide an enter input rather than provide a navigation selection and an enter input.

In the event that a user provides a scan input, the method 1500 continues by automatically scanning the selected channel set (step 1520). Next, the method 1500 continues by determining whether any channels are found as part of the automatic scan (step 1524). If no channels are found the method 1500 may return to step 1512. However, if one or more channels are found as part of the automatic scan the method 1500 may continue by enabling live TV application functionality (step 1528). In one embodiment, if one or more channels are found on a first channel set the method 1500 may return to step 1512 to provide the user with the option to scan a second channel set. Once the live TV application functionality has been enabled, the method 1500 ends at step 1532.

If it is determined at step 1508 that a first-time experience will not be presented to a user, the method 1500 may continue by determining whether one or more channel sets have been previously scanned (step 1536). When it is determined that no channel sets have been scanned, the method 1500 may continue at step 1512. However, if it is determined that at least one channel set has been previously scanned, the method 1500 may proceed to step 1540.

In some embodiments, the Intelligent TV 100 may require that a particular channel set be scanned to enable live TV application functionality. In other words, a user may be prevented from accessing certain functionality associated with the live TV application if a particular channel set is not scanned. The method 1500 may optionally continue by determining whether a required channel set has been scanned (step 1540). If the required channel set has been scanned, the method 1500 may proceed to enable live TV application functionality (step 1528). On the other hand, if the required channel set has not been scanned, or if there is no requirement to scan a particular channel set, the method 1500 may continue at step 1544.

At step 1544, a user may be presented with an option via an interactive dialog box to scan a particular channel set and to switch to another particular channel set. As provided above, a user may have conducted a previous channel scan. This previous channel scan may allow the user to switch to the previously scanned channel set and enable live TV functionality via the interactive dialog box presented to the Intelligent TV 100 (step 1548). The user may provide a switch input via a remote control or other input device. If no switch input is received, method 1500 may continue by detecting a scan input or a cancel input (step 1516).

FIGS. 16A-16E depict various dialog, or notification, presentations in accordance with embodiments of the present disclosure. In some instances, it may be necessary for one or more components of the Intelligent TV 100 to communicate to a user via a dialog box. These dialog boxes may include interactive features and/or informational content that may be viewed by a user. Among other things, the dialog box may allow a user to review information and/or select content while watching the live TV application. As such, the dialog box may be configured to be discreet and un-obstructive. For example, the dialog box may be one or more of, transparent, justified to a particular section of the Intelligent TV 100 display, constructed from a single color, utilize a clear font type (e.g., sans serif, regular font style, etc.), include minimal features, and even be configured to disappear after a certain time. It is an aspect of the present disclosure, that the dialog boxes may incorporate standard operating system dialogs that are used to convey information to, and/or require input from, a user.

A dialog box presented to a user via the Intelligent TV 100 may be configured to disappear after a given period of time. Alternatively, and in some cases, a dialog box may be configured to remain displayed to the Intelligent TV 100 depending on the content associated with the dialog box. In some cases, a dialog box may incorporate a default selection or action. In this instance, if a user fails to provide a selection, the selection may be made automatically in response to a passage of time.

Figure 16A:
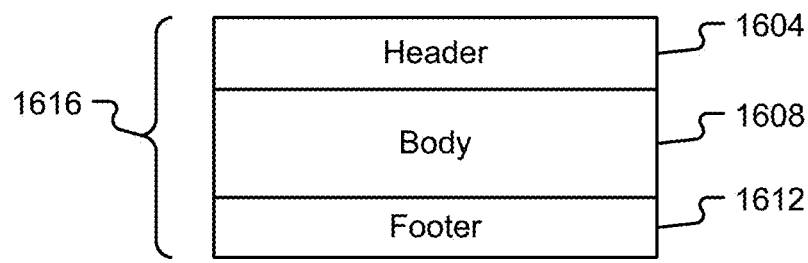
FIG. 16A is a block diagram of a first embodiment of an Intelligent TV dialog presentation.

FIG. 16A is a block diagram of a first embodiment of an Intelligent TV 100 dialog presentation. The dialog box 1616 depicted in FIG. 16A may comprise a header 1604, a body 1608, and a footer 1612 section. Although these separate sections 1604, 1608, 1612, may be combined to form a dialog box 1616, it should be appreciated that any one of the sections 1604, 1608, 1612, individually, may comprise the dialog box. In some embodiments, the various sections 1604, 1608, 1612, may include one more features. These features may further comprise informational portions and/or interactive portions. For example, the header 1604 may include the title of a channel or notification. The body 1608 may include content associated with the dialog box, such as, a description of a program or reminder, a selectable option, a timeout feature, or the like. The footer 1612 may include similar content as the header 1604 or the body 1608. It should be appreciated, that any of the sections 1604, 1608, 1612, described herein and in FIGS. 16A-E, can include graphics, dividers, markers, delineations, text, checkboxes, radio buttons, selectable content, hyperlinks, and/or the like.

Figure 16B:
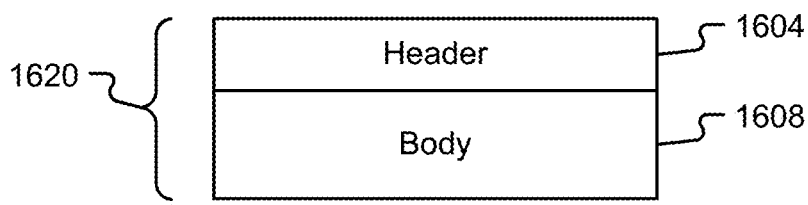
FIG. 16B is a block diagram of a second embodiment of an Intelligent TV dialog presentation.

FIG. 16B is a block diagram of a second embodiment of an Intelligent TV 100 dialog presentation. Specifically, a compact dialog box 1620 is shown comprising a header 1604 and a body 1608. As described herein, the header 1604 may contain titles, prompts, information, and the like. In some embodiments, the header 1604 may be separated from the body 1608 by a visual and/or content divider. For example, the header 1604 may include a question, or prompt, asking the user for input via a selection mechanism contained in the body 1608. Such prompts may correspond to programming information, personal preferences, Intelligent TV 100 settings, application settings, and the like. In some cases, the body 1608 may include a yes/no, on/off, or option list, from which a user may select.

Figure 16C:
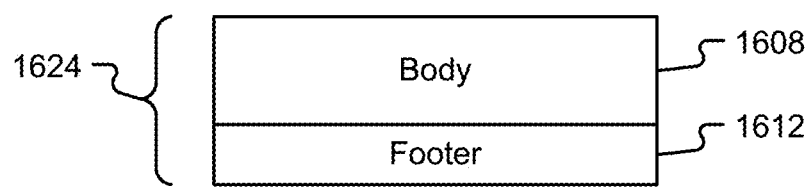
FIG. 16C is a block diagram of a third embodiment of an Intelligent TV dialog presentation.

FIG. 16C is a block diagram of a third embodiment of an Intelligent TV 100 dialog presentation. In particular, FIG. 16C shows a variation of a dialog box 1624 that includes a body 1608 and a footer 1612. The footer 1612, like the header 1604 and the body 1608, may include a timing feature associated with the presentation of the dialog box 1616, 1624. The timing feature may be configured to show a visual progress of the elapsed time associated with dialog box 1616, 1624. In some cases, the timing feature may be configured to show a time remaining with the presentation of the dialog box 1616, 1624. For example, the time remaining may be expressed as one or more numbers, progress bars, countdown timers, reverse progress bars, etc. Once the timer has expired, whether counting up or counting down, the dialog box 1608, 1616, 1620, 1624, may disappear from the display of the Intelligent TV 100.

Figure 16D:
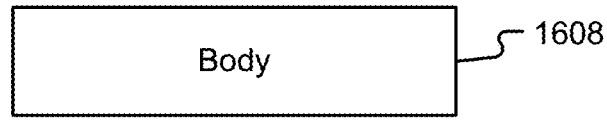
FIG. 16D is a block diagram of a fourth embodiment of an Intelligent TV dialog presentation.

FIG. 16D is a block diagram of a fourth embodiment of an Intelligent TV 100 dialog presentation. In an exemplary embodiment, the dialog box may comprise the body 1608 only. Although the body 1608 may contain timing features, titles, selectable options, descriptions, and other content, is anticipated that the dialog box will remain at a reduced size in comparison to the size of the display of the Intelligent TV 100. For instance, the dialog box 1608 may be presented to a section of the Intelligent TV 100 display, such that, it only takes up a small portion of the viewing content area. A dialog box configured as a body 1608 may be used as a simple reminder, or notification, of content associated with the live TV application.

Figure 16E:
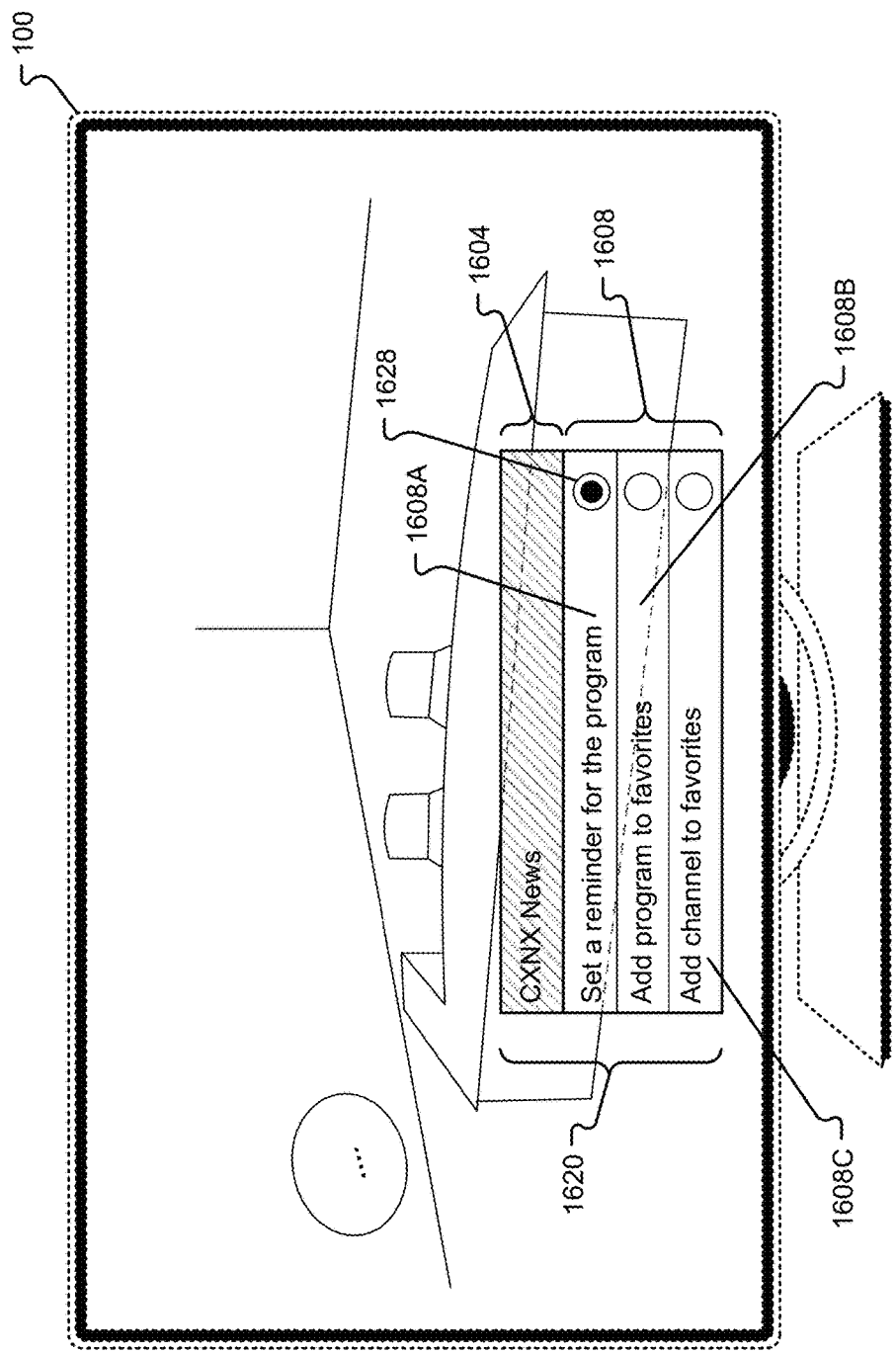
FIG. 16E is a block diagram of a dialog presented to the display of an Intelligent TV in accordance with embodiments of the present disclosure.

FIG. 16E is a block diagram of a dialog presented to the display of an Intelligent TV 100 in accordance with embodiments of the present disclosure. As shown, the dialog box 1620 includes a header 1604 and a body 1608. The header 1604 displays the title of the program that is available via the live TV application. In FIG. 16E, the title of the program shown via the dialog box 1620 is "CXNX News." The body 1608 can include prompts 1608A, 1608B, 1608C, along with one or more selectable inputs 1628, such that a user may select an input that is associated with the prompts 1608A, 1608B, 1608C. In the present example, the first prompt 1608A is associated with a reminder setting, the second prompt 1608B is associated with a program favorite setting, and the third prompt 1608C is associated with a channel favorite setting. As can be appreciated, a user may navigate among these prompts 1608A, 1608B, 1608C, to select a corresponding action that may be performed by the live TV application. In the present example, the reminder setting prompt 1608A is highlighted by default. A user may move the position of the highlight via a remote control or other input device.

Figure 17:
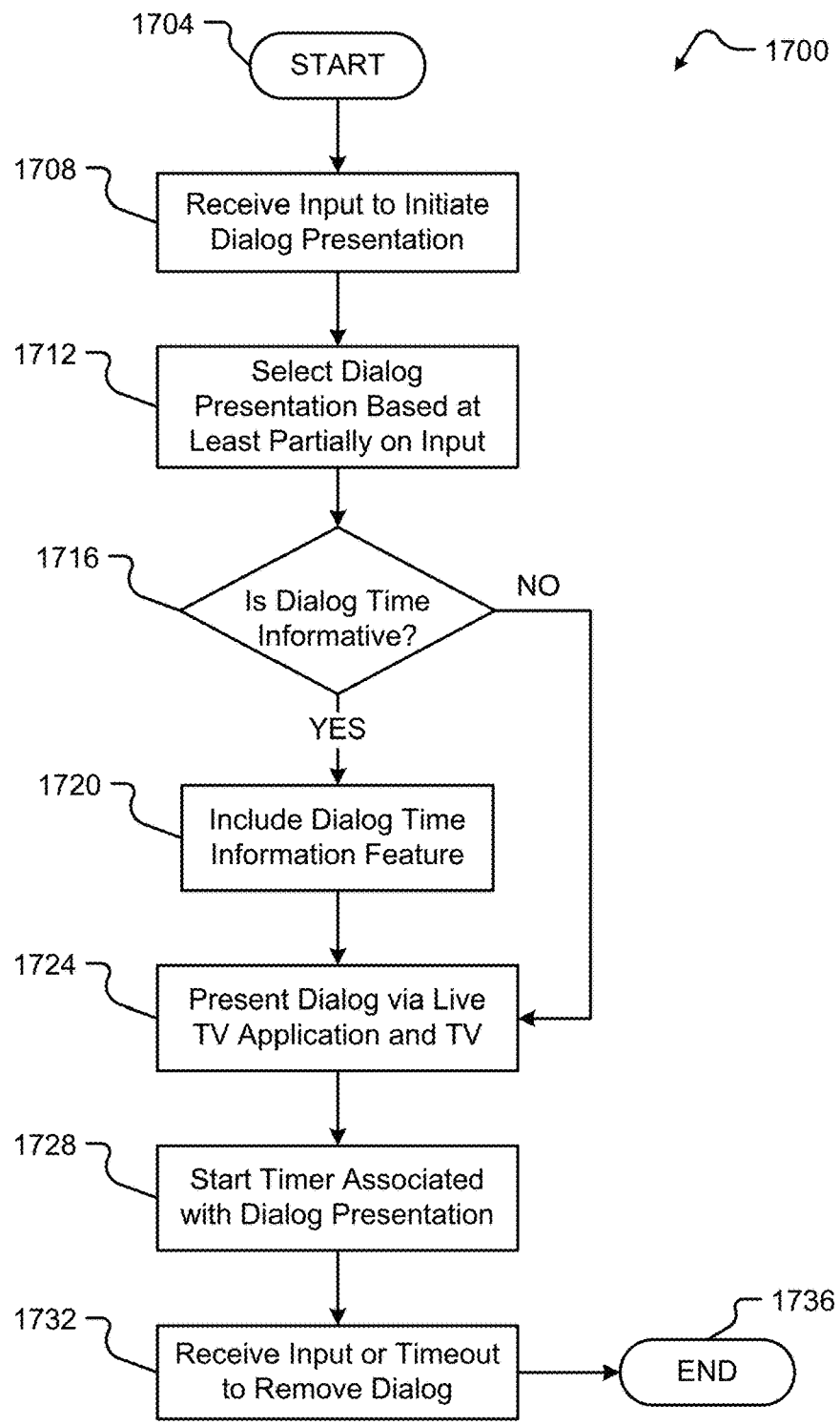
FIG. 17 is a flow diagram depicting a dialog presentation method in accordance with embodiments of the present disclosure.

Referring to FIG. 17 a flow diagram depicting a dialog presentation method 1700 is shown in accordance with embodiments of the present disclosure. The method 1700 begins at step 1704 and continues when the live TV application receives an input to initiate a dialog presentation (step 1708). The initiation input may be provided by one or more of, a user, the live TV application, other applications associated with the Intelligent TV 100, and/or one or more components of the Intelligent TV 100. For instance, a reminder may have been set, or programmed, for a specific program or show that is scheduled to play on live TV. The reminder may be associated with an initiation condition, including but not limited to, a timer, an input from an electronic programming guide, in response to another condition, some other input, or combinations thereof. Continuing the example, when the initiation condition is satisfied for the reminder, the reminder may display to the Intelligent TV 100. In some cases, the reminder may be displayed within a specific timeframe of a scheduled program or show.

The method 1700 continues by selecting a dialog presentation based at least partially on the received input (step 1712). Selection of the dialog presentation may include determining whether the presentation should include a header 1604, a body 1608, a footer 1612, and/or combinations thereof. Additionally or alternatively, selection of the dialog presentation may include determining content and/or features contained within a dialog. For instance, a typical informative dialog presentation may include a body 1608 only. However, a dialog presentation that includes a title and descriptive information coupled with selectable inputs and even a timeout feature may require a header 1604, a body 1608, and a footer 1612. By way of example, a reminder dialog presentation may include the title of the reminder in a header 1604 and at least one selectable option in the body 1608 that allows a user to change channels to the program associated with the reminder.

Next, the method 1700 may determine whether or not the dialog presentation is time informative (step 1716). In some embodiments, the dialog presentation may provide a visual representation of a time associated with certain dialog content. As can be appreciated, a user may be provided with a countdown timer, a progress bar, or other time feature associated with the dialog box. The time feature may be informative of a program start time, a current time, and/or a time associated with the dialog box presentation. Determining whether or not a dialog is time informative may include referring to a memory having stored preferences, or rules, associated with one or more of TV content, dialog boxes, time informative features, etc. For example, a reminder presented to a user via a dialog box may inform the user of a start time of a TV show. Because the start time of the TV show is time sensitive, the reminder dialog box may provide at least one of, a start time of the show, a time until the start time, a countdown time until the start time, and a time feature relating to the presentation of the dialog box. Among other things, the time feature disclosed in this example can allow a user to make a selection decision while a dialog box is presented via the Intelligent TV 100. If the dialog is not determined to be time informative, the method 1700 continues at step 1724.

If the dialog is determined to be time informative, the method 1700 continues by including at least one time information feature as part of the dialog presentation (step 1720). In one example, a time feature may include a progress bar displayed as part of the dialog box. The progress bar may represent an amount of time associated with the presentation of the dialog box. For instance, a progress bar may show how long a dialog has been presented to the display of an Intelligent TV 100. As such, the progress bar may include a time start point and a time endpoint. In another example, a reverse progress bar may be configured to countdown, and/or display a graphical change, representing a time remaining for the presentation of the dialog. Upon an expiration of the time shown via the reverse progress bar, the dialog may be configured to disappear. The progress bar, reverse progress bar, or other time feature, may relate to live TV content or the presentation of a dialog.

As previously stated, the dialog box may incorporate a default selection, or action, that may be automatically selected in response to a passage of time. Among other things, providing a user with a visual representation of time associated with the dialog box can allow a user to make a selection other than the default selection associated with the dialog box.

The method 1700 continues by presenting the dialog via the live TV application and the Intelligent TV 100 (step 1724). Presentation of the dialog may include, but is not limited to, a display justification point (e.g., left-justified, right-justified, center-justified, bottom justified, top-justified, and combinations thereof), a transparency level, a font type or style, an overall size, an action, a size in relation to the display of the Intelligent TV 100, and more.

When the dialog is presented to the display of the Intelligent TV 100, a timer may be initiated that defines the amount of time the dialog will be presented (step 1728). As can be appreciated, the timer may be a "count-up" timer or a "countdown" timer. The live TV application may be configured to provide an action upon the expiration of the dialog presentation timer. One example of an action associated with the expiration of the timer may include causing the dialog to disappear from the display of the Intelligent TV 100. Another example of an action associated with the expiration of the timer may include an automatic selection of an available option via the Intelligent TV 100.

Next, the method 1700 receives an input from a user, or the expiration of the timer, to remove the dialog presentation (step 1732). A user input may correspond to a selection associated with the dialog presentation, a cancellation, or some other input associated with the Intelligent TV 100. For example, a user may select an option associated with the dialog box, in which case the dialog box may disappear. In some embodiments, a user may not enter an input and an automatic selection may be made by the expiration of the timer. In any event, when the timer has reached the end of its scheduled time the dialog box may be configured to disappear from display. In an alternative embodiment, the dialog box may be configured to fade out, move to the application (or other) panel, minimize, or otherwise dismiss from the content view area of the Intelligent TV 100. The method ends at step 1736.

Figure 18:
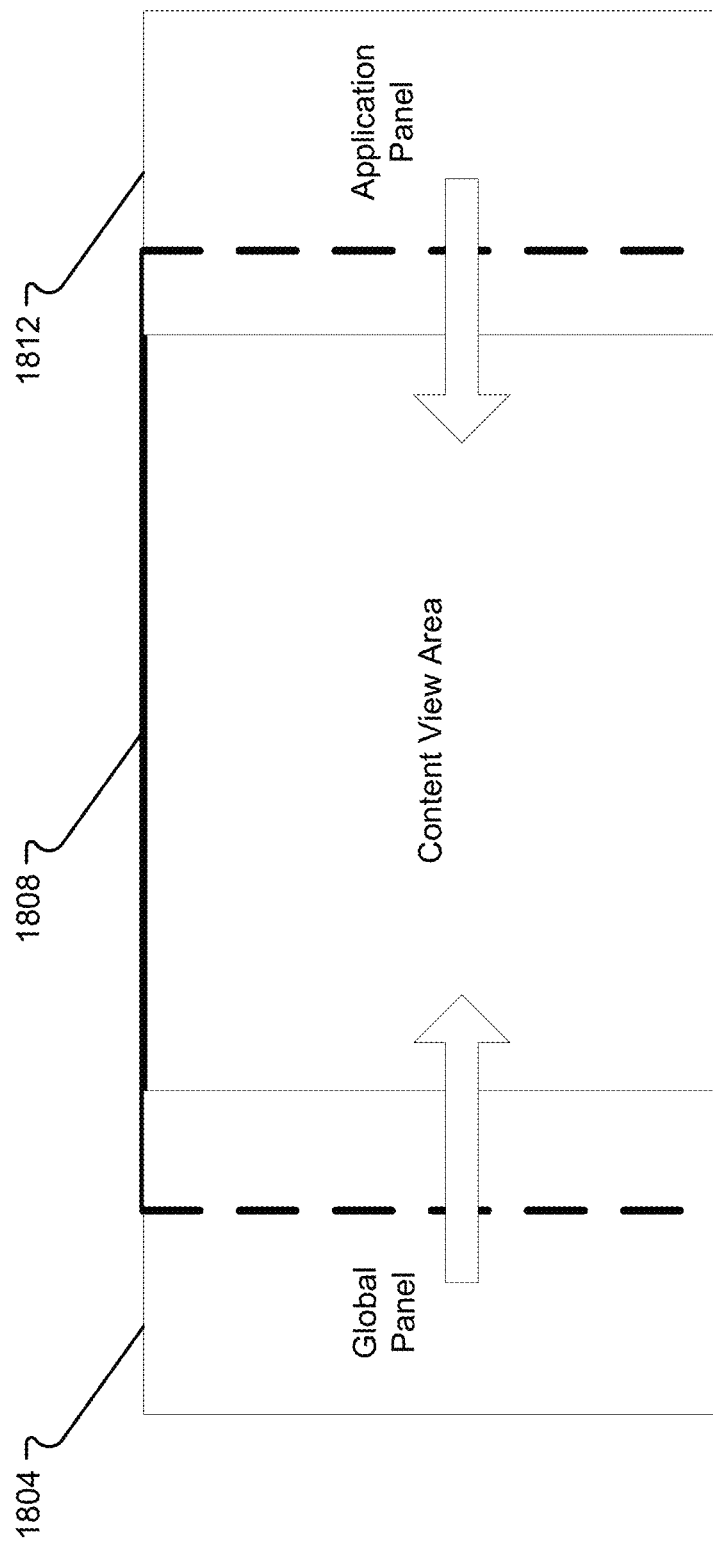
FIG. 18 is a block diagram of a first panel view of an Intelligent TV in accordance with embodiments of the present disclosure.

Referring now to FIG. 18, a panel configuration in accordance with embodiments of the present disclosure is illustrated. As previously discussed, the panel manager 536 is operable to display panels in the user interface to manage transitions between those panels or to effect user interface inputs received in the panel. The panel manager 536 may thus be in communication with different user interface panels such as a global panel 516, a volume panel 520, a settings panel 524, and application panel 544, and/or a notification panel 528. The panel manager 536 can display these types of panels depending on the inputs received from the input event dispatcher 508. The panel system is designed to provide a quick access to extended functionality while still maintaining visibility into the main content view.

As illustrated in FIG. 18, the Intelligent TV 100 may display a global panel 1804, an active content view area 1808, and an application panel 1812. The global panel 1804 may be the same or similar to global panel 516. The global panel 1804 may include information that is associated with the home screen or top level hierarchical information for the user. For instance, global panel 1804 may be used to contain and access functionality that exists at a system level; this functionality may be completely independent of the currently viewed content. The global panel 1804 may be displayed in such a manner as to not disrupt the content view area 1808; that is, the global panel 1804 may be displayed in such a manner as to provide a user the ability to view content displayed in the content view area 1808 over or adjacent to live TV content. For example, the global panel 1804 may be translucent in nature such that the content displayed in the content view area 1808 is displayed (i.e., still viewable to a user), behind the global panel 1804. The global panel 1804 may provide a consistent access to high-level actions across all applications, an anchor for all views, a unified experience, and further may follow the same pattern as the application panel 1812. Moreover, and as previously discussed, global panel 1804 may be displayed by the Intelligent TV 100 such that the active content in the content view area 1808 is always in view. In some embodiments, the global panel 1804 and the contents of the global panel 1804 may depend on the user; that is, the global panel 1804 may be specific to one or more users. Therefore, the global panel 1804 may also be thought of as a home panel.

As further illustrated in FIG. 18, the Intelligent TV 100 may display an application panel 1812. The application panel 1812 may be the same or similar as application panel 544. The application panel 1812 may provide access to contextually relevant functionality based on the currently viewing/recently viewed material. Similar to the global panel 1804, the application panel 1812 may provide such access without disrupting the content view area 1808. That is, the application panel 1812 may be displayed in such a manner as to provide a user the ability to view content displayed in the content view area 1808 over or adjacent to live TV content. For example, the application panel 1812 may be translucent in nature such that the content displayed in the content view area 1808 is displayed (i.e., still viewable to a user), behind the application panel 1812. The application panel 1812 may provide quick access to core functionality of the Intelligent TV 100 such that the active content in the content view area 1808 is always in view. Moreover, the application panel 1812 may provide a consistent user experience across all applications and may include focused contextual content.

Figure 19:
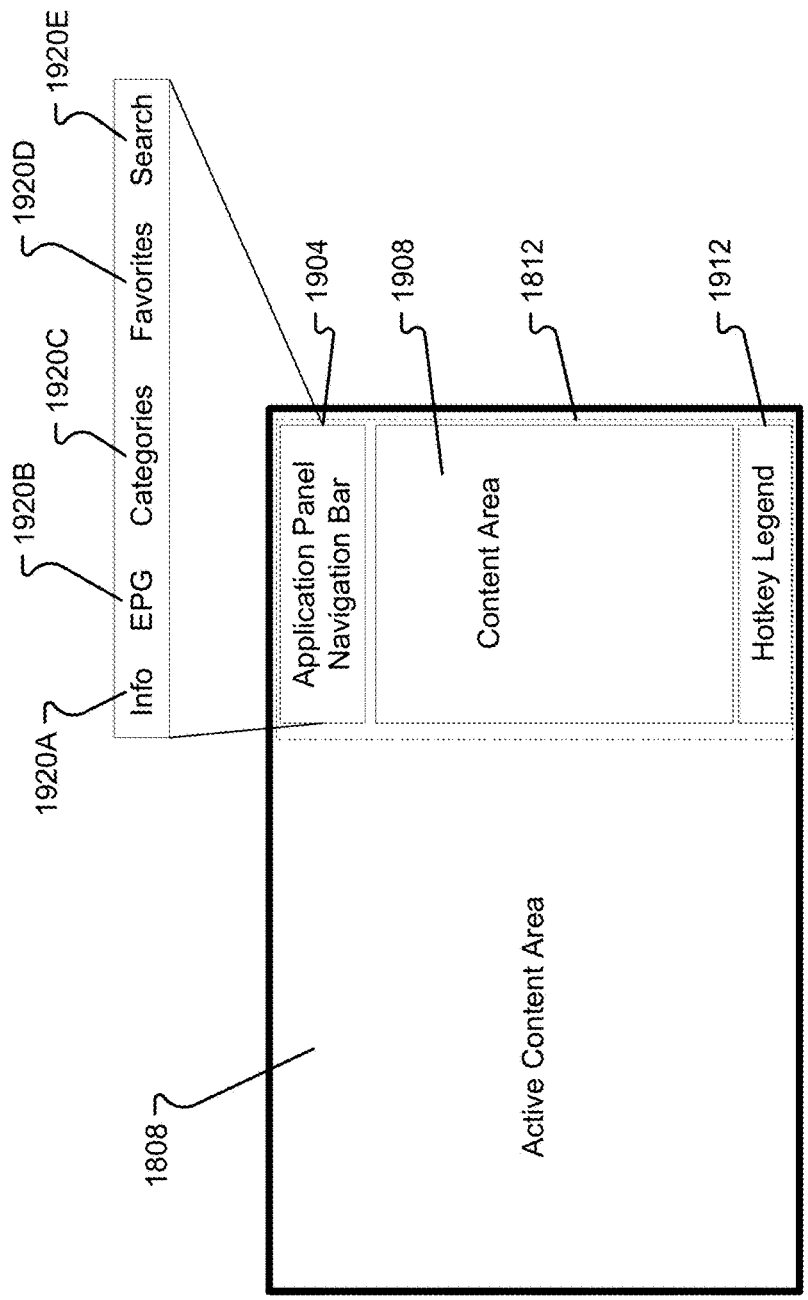
FIG. 19 is a block diagram of a second panel view of an Intelligent TV in accordance with embodiments of the disclosure.

The Intelligent TV 100 may include an application panel 1812 as shown in FIG. 19. The content displayed in the application panel 1812 depends on the content displayed in the content view area 1808. Stated another way, the application panel 1812 is contextually dependent upon the source of content and the content itself in the content view area 1808. This is significantly different from the global panel 1804, in which the content displayed in the global panel 1804 contains functionality that exists at a system level and is completely independent of the currently viewed content in the content view area 1808. The application panel 1812 also provides customized information for each application. The application panel 1812 may comprise application panel elements comprising an application panel navigation bar 1904, a content area 1908, and a hotkey legend 1912. The application panel navigation bar 1904 is presented such that the navigation pattern and content remain consistent across all applications. That is, the navigation bar 1904 may include the same or similar elements such that an easy navigation is maintained no matter which application and/or sources are selected and displayed. For example, the navigation panel bar 1904 may include fixed regions 1920A-1920E corresponding to live TV navigable menus and further comprising Info, EPG, Categories, Favorites, and Search. Although, Info, EPG, Categories, Favorites, and Search are illustrated in FIG. 19, additional or fewer tab regions may be displayed.

The content area in 1908 is panel view specific. For example, depending on the panel view focus, the content area 1908 may update, as further described below. Moreover, the application panel 1812 may include a hotkey legend 1912 corresponding to one or more hotkeys. The hotkey legend 1912 is positioned at the bottom of the panel 1812 across all applications. The function of the hotkeys is context sensitive and may vary depending on the application selected and/or displayed in the content view area 1808. However, generally speaking, some hotkeys are generally navigation based while others may be action based. For example, the hotkeys may correspond to shortcuts such as marking a series, program, show, or channel as a favorite. In another example, at least one of the hotkeys may correspond to a reminder such that a series, program, or show can be marked for a reminder.

Figure 20:
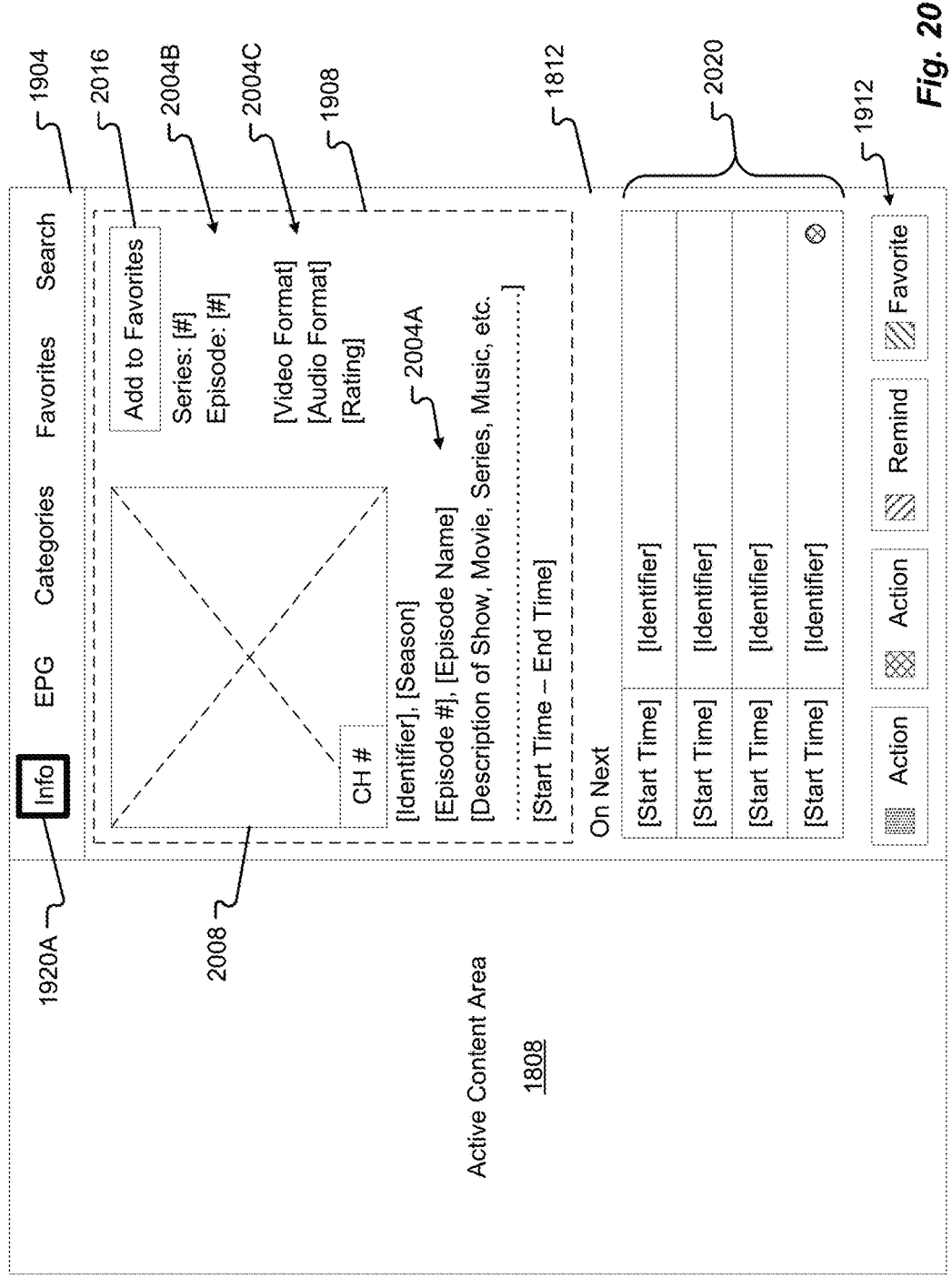
FIG. 20 depicts a first embodiment of an information panel presented via an application panel of an Intelligent TV.

FIG. 20 depicts a first embodiment of an information (Info) panel presented via an application panel of an Intelligent TV. The sample live TV application panel 1812 shown in FIG. 20 includes an application panel navigation bar 1904, a content area 1908, and a hotkey legend 1912. In this example, Info tab 1920A is highlighted to display live TV informational content via the application panel 1812. In particular, FIG. 20 depicts an example where the Info fixed region 1920A has a focus in accordance with some embodiments of the present disclosure. When the Info fixed tab region 1920A has a focus, or is highlighted, an Info panel type, such as panel type 1812 may be presented. Panel type 1812 may be presented when the content displayed in the active content area 1808 is associated with content having series information.

The application panel 1812 may include a section that identifies a program type. Program types may include, but are not limited to, TV episodes, TV specials, movies, sports events, radio stations, and undefined or general programs. TV episodes can include, but are in no way limited to, drama series, situation comedies (sitcoms), animated series, reality shows, mini-series, talk shows, game shows, newscasts, combinations thereof and the like. Sports events may include, but are not limited to, baseball season, hockey playoffs, boxing matches, Superbowl, football championships, etc. Specials may include holiday or seasonal specials, election coverage, special news reports, and more. In the event that a program type is not recognized, or does not have program information, the application panel 1812 may display undefined content in the content area 1908. An unrecognized program type may include any program playing on live TV that does not include metadata. In one embodiment, a program may not be classified into one of the program types disclosed above in which case, the application panel 1812 may provide general informational content. In one example, live TV informational content may be determined by referring to rules stored in a memory. Continuing this example, informational content fields may be mapped to a particular live TV broadcast content, or program, types. For instance, an event program type may include similar informational content to a TV series program type. The event may be configured to include fields such as, a thumbnail graphic, a description, and a channel identifier. The TV series may also be configured to include fields such as, a thumbnail graphic, a description, and a channel identifier. In some embodiments, the program type of a particular program (e.g., one presented to the active content area 1808, etc.) may be compared to one or more mapped content fields stored in rules. Once the informational content field, or fields, have been determined, the Intelligent TV 100 may include the content fields in the presentation layout of the informational content. When retrieved, the informational content may use the fields to populate the informational content presented to an application panel 1812.

As part of the program identification, the application panel 1812 may include a program name, season, episode number, description, and the like, in a program identification section 2004A. Additionally or alternatively, a program may be identified by a series or episode number in a second program identification section 2004B. A third program identification section 2008C may include program format, ratings, preferences, and/or other settings. The program identification section in the contact content area 1908 may include a thumbnail graphic 2008. The thumbnail graphic 2008 may be used to identify a program visually, and may even include a channel identification number or symbol. In some embodiments, the content area 1908 may include preference information such as a favorites button 2016. A favorites button 2016 may be used to add a program, or channel, to a favorites list. Additionally or alternatively, the favorites button 2016 may be used to remove a program, or channel, from a favorites list. The favorites list may be stored in a memory as disclosed herein.

As previously stated, the application panel 1812 and the panel type may dynamically change depending on the information associated with the live TV content playing in the content view area 1808. For instance, in the event that a TV series is playing in the active content area 1808, the application panel 1812 may display TV series information in the content area 1908. In some embodiments, the live TV broadcast content playing in the content view area 1808 can continue to play even while an application panel 1812, EPG, information content, and more are displayed in an overlapped condition over at least a portion of the content view area 1808. In one embodiment, the application panel 1812 and content in the application panel 1812 are at least partially transparent. As such, live TV content is visible beneath an overlapped application panel 1812, whether the application panel is showing an EPG, information, favorites, or other content. TV series information may include one or more of a channel number, thumbnail graphic, season, episode, description, start time, and time, and other TV series-specific information.

A thumbnail graphic 2008 may be displayed for a program, movie, show, episode, special, sports event, as a default, or for some other undefined content. It is anticipated, that the thumbnail graphic 2008 be related to the content associated with the program. As such, thumbnail graphic 2008 content may be retrieved from a memory, or an electronic programming guide, for display in the application panel 1812. In some embodiments, a thumbnail graphic 2008 may be provided by the metadata that accompanies a broadcast channel signal. In some cases, however, a thumbnail image, or graphic, may not be available for a particular program. In this instance, the live TV application may retrieve a thumbnail image from a memory associated with the Intelligent TV 100. Default images may be used to define specific program types, or undefined program types. For instance, a radio station program may not be associated with a particular thumbnail image or graphic and as such a default image of a radio station can be provided via the thumbnail graphic 2008.

In some embodiments, a content area 1908 of the application panel 1812 may provide an "On Next" information 2020 section. The "On Next" information 2020 may comprise information relating to one or more programs, shows, specials, events, movies that are playing on live TV after the program shown in the content area 1908 has finished playing. As such, the "On Next" information 2020 may include a thumbnail graphic 2008 of the next program and/or additional information related to the program (e.g., a description, etc.). In one embodiment, the "On next" information 2020 may include a start time, and an identification of the program. In another embodiment, the "On Next" information 2020 may provide "recommended" viewing content, subsequent episodes playing on different channels, and even "favorite" viewing content. "On Next" information 2020 sections may be associated with one or more info panels displaying movies, TV specials, sports events, and/or TV series episodes.

As can be appreciated, various information panels may include more or less information depending on the content associated with the live TV broadcast. For example, an unrecognized or undefined program may not include "On Next" information 2020. In another example, a movie program may not include episode information. In yet another example, a radio station channel, or music channel, may not include episode information, "On Next" information 2020, or season information. In many cases, however, the various programs may include a description of what is playing on live TV. Additionally, the various programs may include a channel identifier in the application panel 1812.

Figure 21:
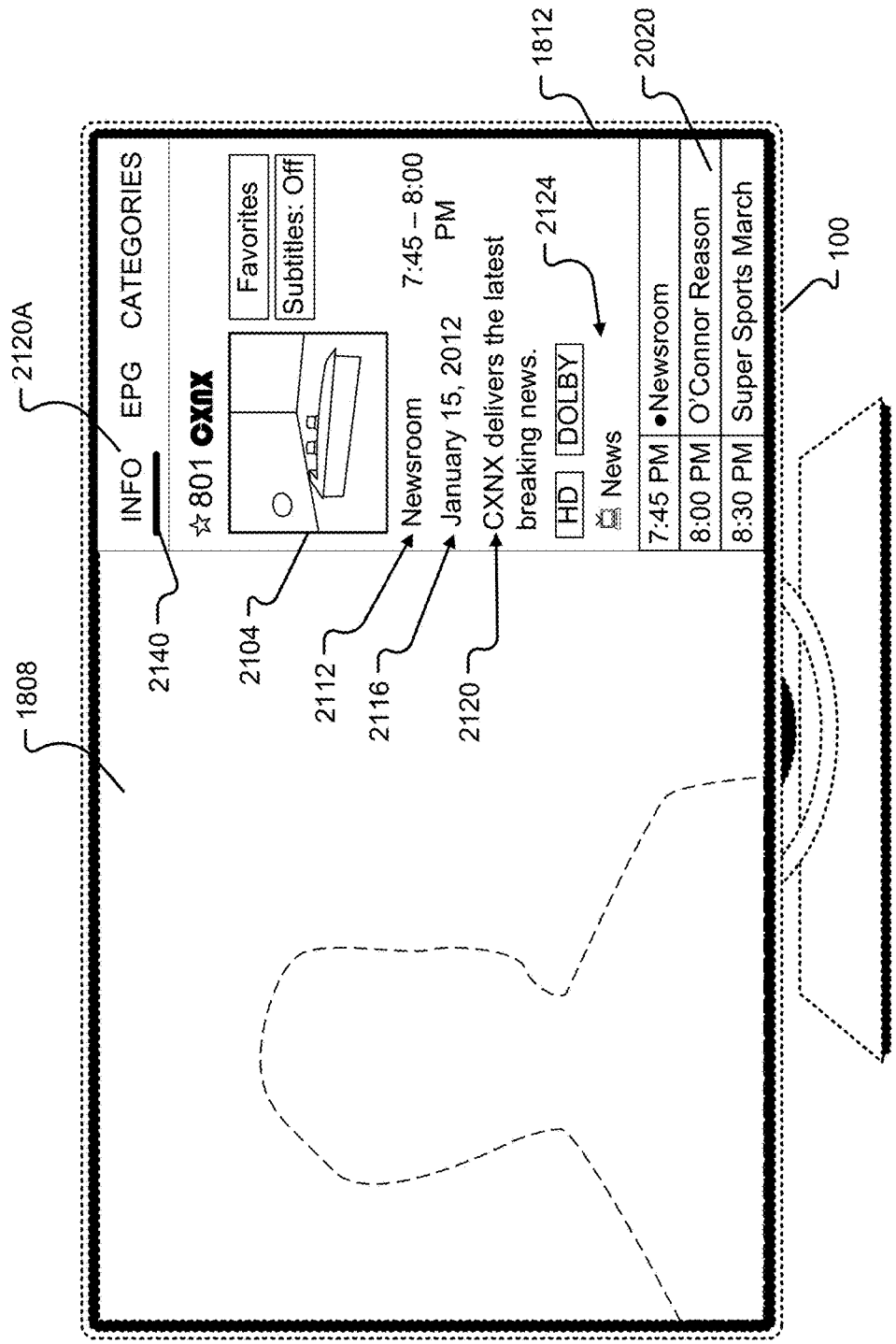
FIG. 21 depicts a second embodiment of an information panel presented via an application panel of an Intelligent TV.

In accordance with some embodiments of the present disclosure, and as previously described, a user may select a fixed tab region 2140 corresponding to Info, as illustrated in FIG. 21. An indicator, such as indicator 2140 may display which fixed tab region is selected or has the current select-focus. Application panel 1812 may then display context specific information corresponding to the active content area 1808. For example, the application panel 1812 may include information specific to live TV. For instance, channel 801 may correspond to the network "CXNX." Additionally, a thumbnail graphic 2104 corresponding to the channel 801, or program 2112 playing on the channel, may be displayed in the application panel 1812. Moreover, the application panel 1812 may utilize one or more panel content types discussed herein. For example, a mini-electronic program guide, or "On Next" information 2020 section displaying program scheduling pertaining to the active content area 1808 may be displayed in the application panel 1812. Moreover, additional information pertaining to the active content area 1808 may be presented to a user. Information such as the title of the program 2112, the scheduling of the program 2116, a description of the program 2120, and characteristics of the program (e.g., visual quality, High Definition (HD), signal quality, sound quality, Dolby®, category, genre, etc.) 2124 may also be displayed. Moreover, upon the display of the application panel 1812, other linked areas or functions may also be displayed.

Figure 22:
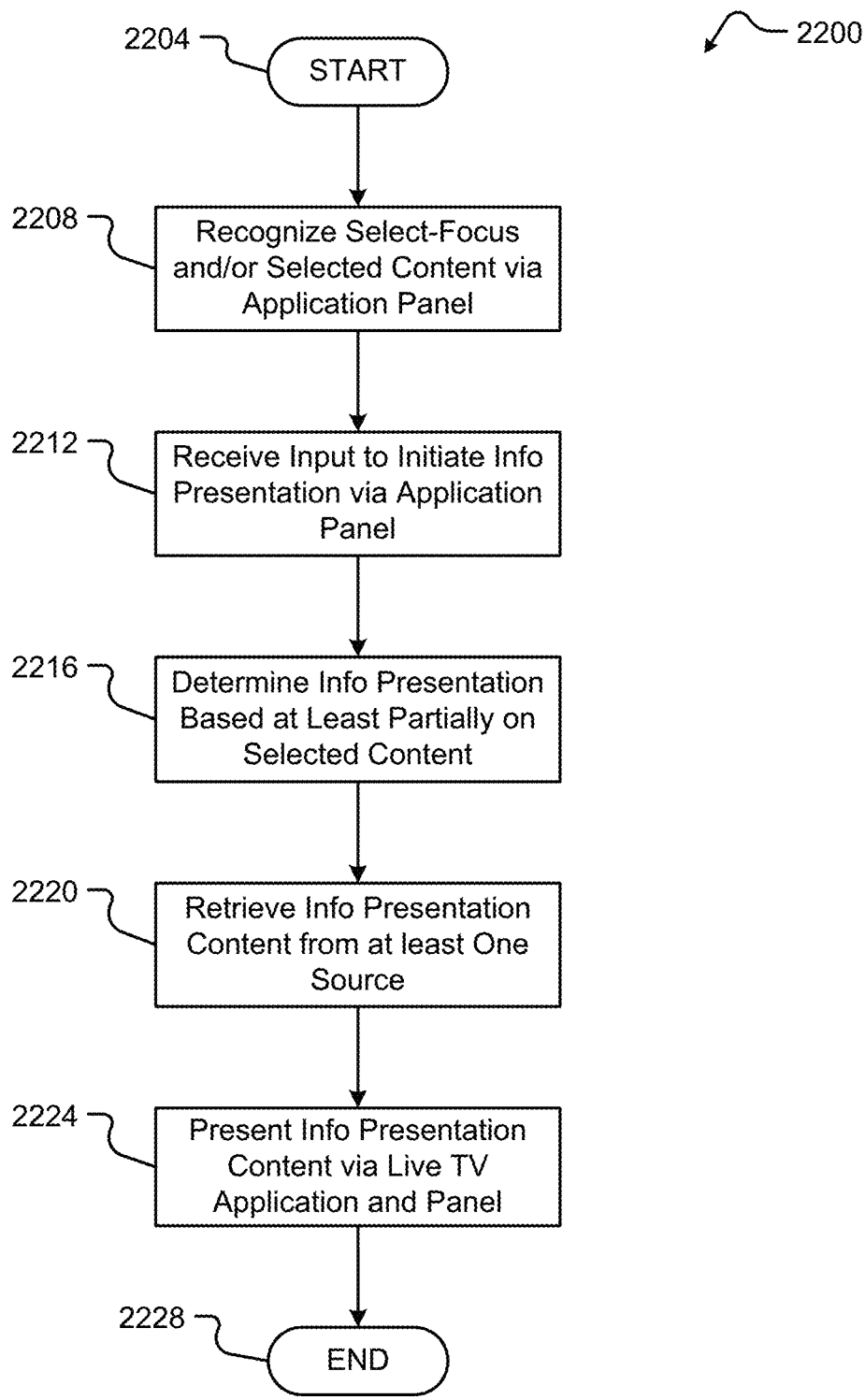
FIG. 22 is a flow diagram depicting an information panel presentation method in accordance with embodiments of the present disclosure.

FIG. 22 shows a flow diagram depicting an information panel presentation method 2200 in accordance with embodiments of the present disclosure. The method 2200 begins at step 2204 and proceeds by recognizing a select-focus and/or selected content via the application panel 1812 (step 2208). In some embodiments, the select-focus may correspond to a position of a user's cursor, or indicator 2140, on the application panel 1812. A select-focus may include a default focus associated with one or more of the fixed tab regions 1904. The select-focus may be moved via a user input from a remote control or other input device. One example of moving or shifting the select-focus may include providing a directional input via a remote control. Selected content may be recognized via an input provided in association with a selection-focus. Additionally or alternatively, selected content may be recognized by detecting an input that is independent of a selection-focus. For example, although an indicator 2140 may be associated with a portion of the application panel 1812, a user may provide an input corresponding to a different portion of the application panel 1812. In this example, a user may select a program hotkey, provide a directional input (e.g., up, down, left, right, angles, and combinations thereof), a swipe input, and/or a hold input to select content.

If the select-focus is associated with an Info tab region 1920A, the method 2200 continues by receiving an input to initiate the information presentation via the application panel 1812 (step 2212). The input may be provided by a user via a remote control or other input device. In some embodiments, the user-provided input may be a selection input based on a corresponding position of a select-focus associated with the navigation bar 1904. In other embodiments, an informational input may be provided via an information button associated with a remote control or other input device. In this case, a select-focus may not be required to display informational content via the live TV application panel 1812. Additionally or alternatively, the input may be provided via the Intelligent TV 100 in response to a condition. For example, a timer may be configured to change live TV channels on the Intelligent TV 100 at a given time. Once the channel is changed, the Info tab 1920A may be automatically selected and information may be shown via the application panel 1812. This automatic selection and presentation may be provided by one or more of the components associated with the Intelligent TV 100. As can be appreciated, rules and/or preferences may be used to determine the automatic selection and/or presentation of information via the Info tab 1920A and the application panel 1812.

Upon receiving an input to initiate the information presentation via the application panel 1812, the method 2200 continues by determining the presentation of information based at least partially on the selection (step 2216). The presentation of information may include, but is not limited to, a layout, a graphical representation, selected fields, descriptions, and the like. As such, certain presentations of information may be governed by the content related to the selection input. In one example, a selection input may be provided to show information relating to broadcast content playing via live TV in the active content area 1808. Continuing this example, if a movie is playing in the active content area 1808, the information presentation selected for the application panel 1812 may include a movie name, a description, a cast list, a movie rating, a start and end time, and more. On the other hand, if a radio station program is playing in the active content area 1808, the information presentation selected for display in the application panel 1812 may include the radio station program channel number, a default image, a description of any music playing etc. In some embodiments, a size of the active content area 1808 may include the total viewable area of the Intelligent TV 100 display.

The method 2200 continues by retrieving the information presentation content from at least one source (step 2220). For instance, if the information presentation content includes a description of the content playing on live TV, the Intelligent TV 100 may retrieve this information from at least one broadcast signal. Typically, such programming information may be included in the data accompanying a broadcast signal. Additionally or alternatively, if the information presentation content includes "recommended" or "favorite" content, the Intelligent TV 100 may refer to a memory where such content may be stored. In one embodiment, the memory may be associated with the hardware of the Intelligent TV 100. In some cases, this content may be stored in a memory remote from the Intelligent TV 100, in which case, the Intelligent TV 100 and its various components may be caused to communicate across a network to retrieve the content. Among other things, the content retrieved across the network may include, but is in no way limited to, programming information, thumbnail graphics, EPGs, etc. One example of the network may include, but is not limited to, the Internet.

Next, the Intelligent TV 100 may present the information presentation content via the live TV application and panel 1812 (step 2224). As disclosed herein, the presentation may include a visual, audible, and/or combination presentation via the live TV application. In some embodiments, the presentation of information may be associated within the application panel 1812 alone. The presentation of information may include, but is not limited to, a layout, a graphical representation, selected fields, descriptions, and the like. In any event, the presentation layout is displayed to the Intelligent TV 100 as determined in step 2216. This presentation of information may include any of the layouts shown in the application panels 1812 of the appended figures. Additionally or alternatively, the presentation of information, and even the application panel 1812, may be at least partially transparent. In some embodiments, the content presented to the active content area may be at least partially visible beneath, or through, the live TV application panel 1812 and even the information presentation content that is presented via the application panel 1812. In one embodiment, the size of the active content area is maintained upon presenting the information presentation content via the application panel 1812. For example, the application panel 1812 in some instances does not affect the size of the displayed active content. The method 2200 ends at step 2228.

Figure 23A:
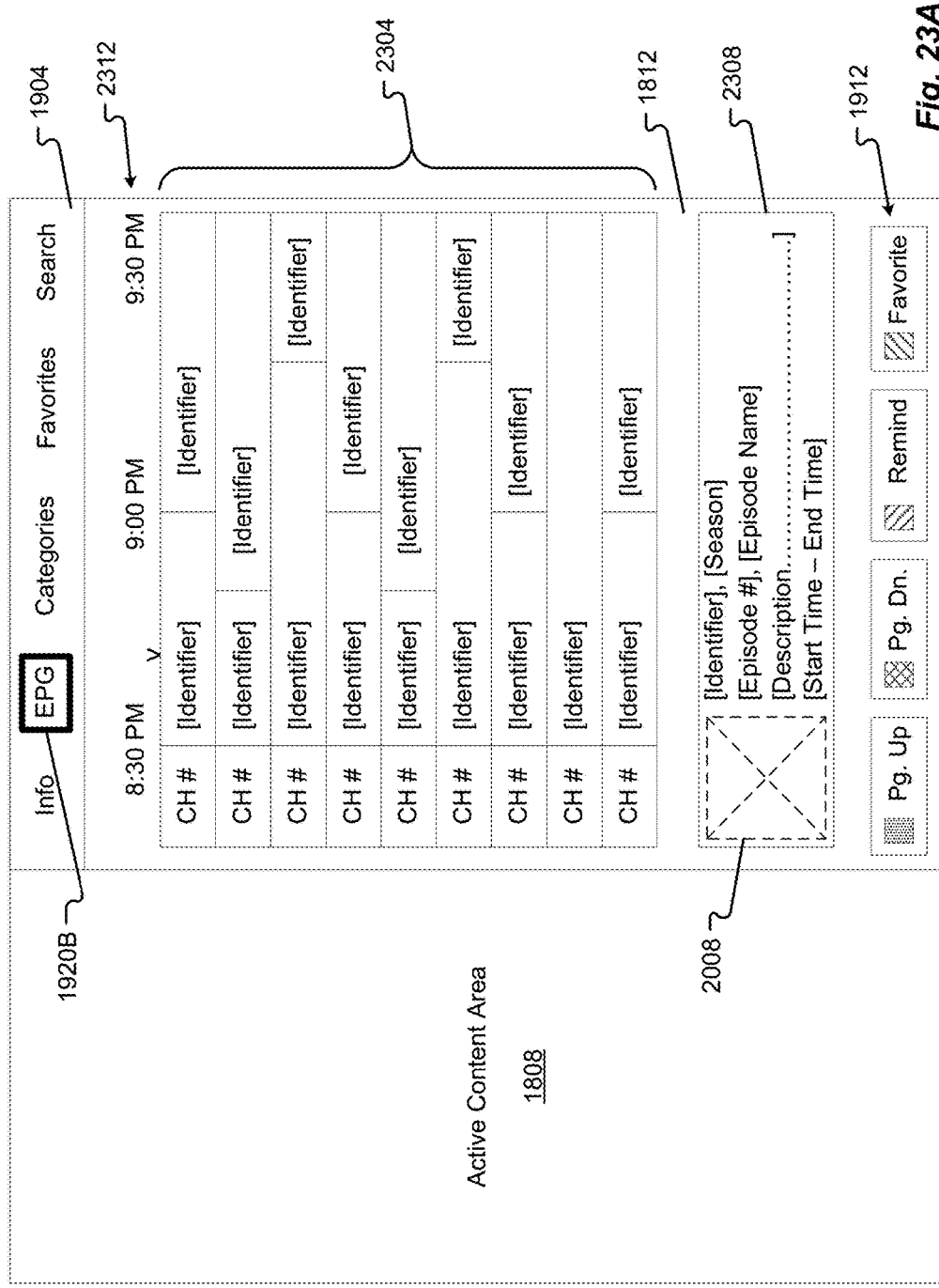
FIG. 23A depicts a first embodiment of an electronic programming guide presented via an application panel of an Intelligent TV.

FIG. 23A shows a first embodiment of an EPG 2304 presented via an application panel 1812 of an Intelligent TV 100. As shown, the application panel 1812 can overlap or move at least a portion of the active content area 1808. The EPG region 1920B of the panel navigation bar 1904 is shown as selected. The selection may be provided via a user input and/or automatically via the Intelligent TV 100 (e.g., in response to condition or other selection made). In some cases the selection of the EPG region 1920B may be indicated via a select-focus in the form of a highlight, an underline, a specific font style, an action (e.g., movement of the EPG region indicator 1920B, brightness adjustment, etc.), combinations thereof, and the like. This select-focus indication may be associated with the EPG region 1920B. The application panel 1812 may also include a hotkey legend 1912 similar to other application panels 1812 displayed via the Intelligent TV 100. As previously discussed, the hotkeys provided in the hotkey legend 1912 may be customized to facilitate shortcut navigation and/or special features associated with the Intelligent TV 100 and/or the application panel 1812. For instance, the hotkeys may be context sensitive to a particular application panel 1812 displayed. As shown in FIG. 23A, the hotkey legend 1912 may include Page Up, Page Down, Remind, Favorite, and other features.

In some embodiments, the EPG 2304 may be displayed via an application panel 1812 in a particular layout or format that presents scheduled programming to a viewer of the Intelligent TV 100. This particular layout or format may be customized and/or changed by a user via at least one input provided via a remote control or other input device. For example, a first format of the EPG 2304 may present the scheduled programming in a table, or list, in a channel number order. As can be appreciated, the channels may be selected from one or more particular groups of channels (e.g., favorites, available channels, premium channels, etc.) and ordered from low-to-high channel number or from high-to-low channel number. Each channel may include program information that can include start, end, duration, and other times associated with the channel's programming.

Additionally or alternatively, the application panel 1812 may include a program preview pane 2308 that may include a program thumbnail graphic 2008, an identifier, description, times, and other information that is associated with the channel and/or the program. The program preview pane 2308 may change to display new information as time passes or as a user navigates through selected channels. In some embodiments, the Intelligent TV 100 may select a particular channel to display information via the program preview pane 2308. This selection may be based on stored rules. In some cases, the program preview pane 2308 may be configured to display information associated with the first channel on the EPG 2304 list, as a default.

The EPG 2304 may be configured to present one or more programs for each channel in a list, or tabular, format that is accompanied by an EPG time scale 2312. For instance, and as shown in FIG. 23A, the first channel in the list has a first program that runs until 9:00 PM and a second program that begins at 9:00 PM. The program may include a text, graphic, and/or combination thereof identifier. The identifier may be used to identify the program to a user of the Intelligent TV 100. Although shown with a finite number of channels displayed via the list of the EPG 2304, it is anticipated that other channels may be caused to display to the EPG 2304 list given a user provided input. For instance, a user may scroll to another line, or page, on the list, by using the Page Down hotkey of a remote control or other input device as designated by the hotkey legend 1912. As another example, a user may navigate through channels in the EPG 2304 by providing a directional input (e.g., via arrow keys, channel up/down buttons, etc.) from a remote control or other input device.

In some embodiments, the EPG time scale 2312 may include a current time indicator. The current time indicator may be represented by a graphic that is associated with the EPG time scale 2312 and that is capable of moving relative to the EPG time scale 2312. FIG. 23A shows a small arrow, or caret symbol, positioned between the 8:30 PM and 9:00 PM on the EPG time scale 2312 that acts as a current time indicator. The position of the caret symbol along the scale in the present example indicates that the time is approximately 8:40 PM. Although shown as a caret symbol, it is anticipated that any graphic may be used to provide an indication of the current time to a user or viewer of the Intelligent TV 100. Moreover, while a moveable time indicator is disclosed above, it is anticipated that some embodiments may employ a fixed current time indicator while the EPG time scale 2312 itself moves relative to the fixed current time indicator.

Figure 23B:
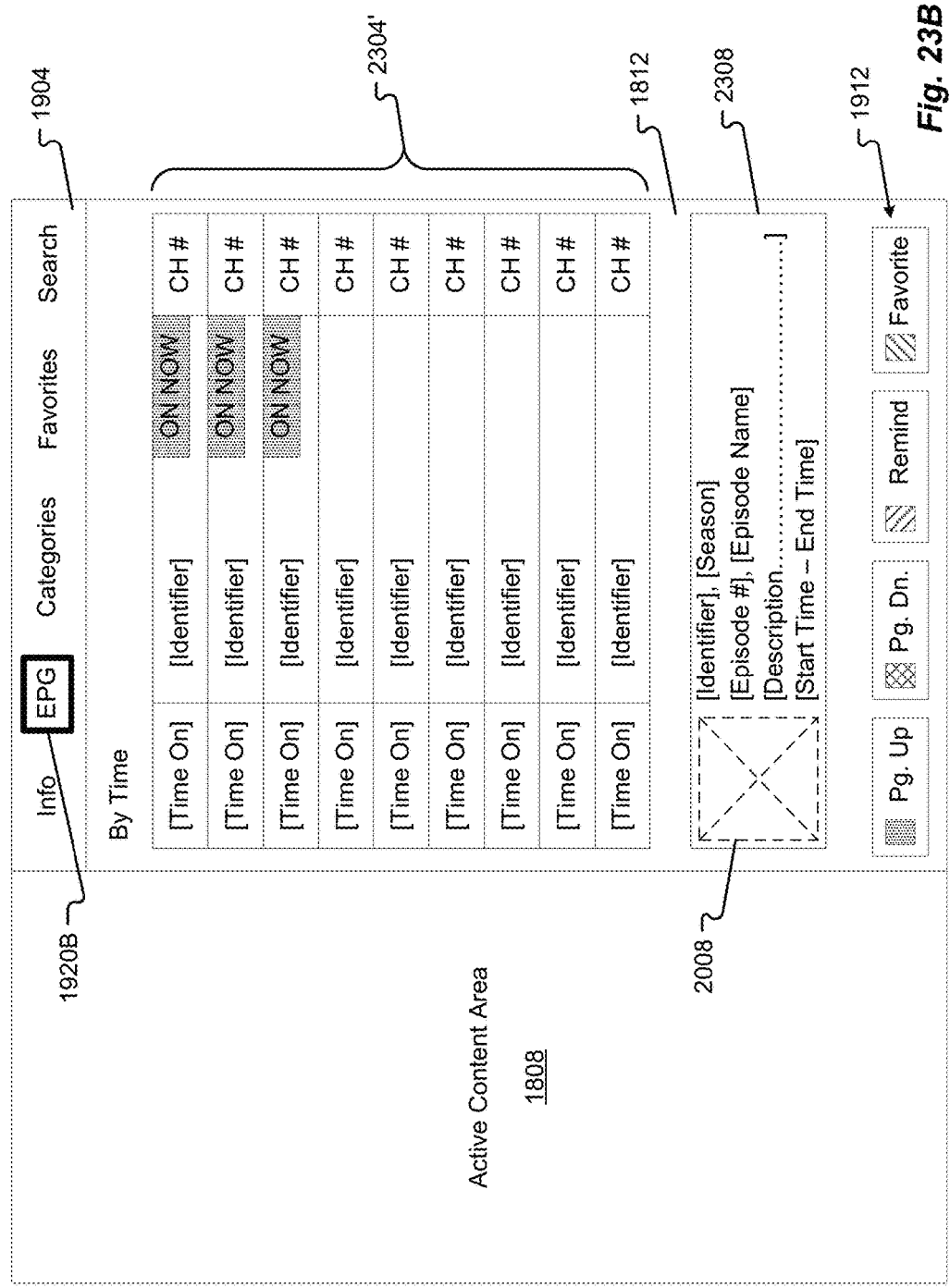
FIG. 23B depicts a second embodiment of an electronic programming guide presented via an application panel of an Intelligent TV.

Referring now to FIG. 23B, a second embodiment of an EPG 2304' presented via an application panel 1812 of an Intelligent TV 100 is shown. In some embodiments, the EPG 2304' may present programming information by time. In other words, the list of programs contained in the EPG 2304' can be ordered by a time associated with the program. The time may indicate a time that a program is scheduled to start. Additionally or alternatively, the program list may be compiled in the EPG 2304' via the Intelligent TV 100 from one or more groups of channels (e.g., favorites, available channels, premium channels, etc.). The times associated with each program can be ordered from earliest-to-latest start time or latest-to-earliest start time. Each program in the list may include program information, a description, start, end, duration, and other times associated with the programming and the like. In some cases, each program identifier may be accompanied by an alert feature. For example, the first three programs shown in the EPG 2304' of FIG. 23B indicate via an alert feature that the program is "ON NOW." In this example, the alert feature may be used to indicate that select programs are playing now on a channel associated with the program information displayed in the EPG 2304'. Additionally or alternatively, the alert features may be configured to indicate that a show is new, a favorite, recommended, scheduled for a reminder, scheduled for recording, and more.

As previously stated, the application panel 1812 may include a program preview pane 2308 that may include a program thumbnail graphic 2008, an identifier, description, times, and other information that is associated with the channel and/or the program. The program preview pane 2308 may change to display new information as time passes or as a user navigates through selected channels, programs, or start times. In some embodiments, the Intelligent TV 100 may select a particular start time, channel, or program, to display information via the program preview pane 2308. This selection may be based on stored rules. In some cases, the program preview pane 2308 may be configured to display information associated with the first channel on the EPG 2304' list, as a default.

In any of the EPG embodiments disclosed herein, a user may select an item (e.g., program, channel, etc.) from the EPG list and the Intelligent TV 100 may change the currently tuned channel to the program and/or channel selected. In some embodiments, the selection of one of the items in the EPG list may result in the live TV application closing and the live feed being changed to the selected channel. Among other things, the user selection may be provided by an input according to any manner of input disclosed herein.

Figure 24A:
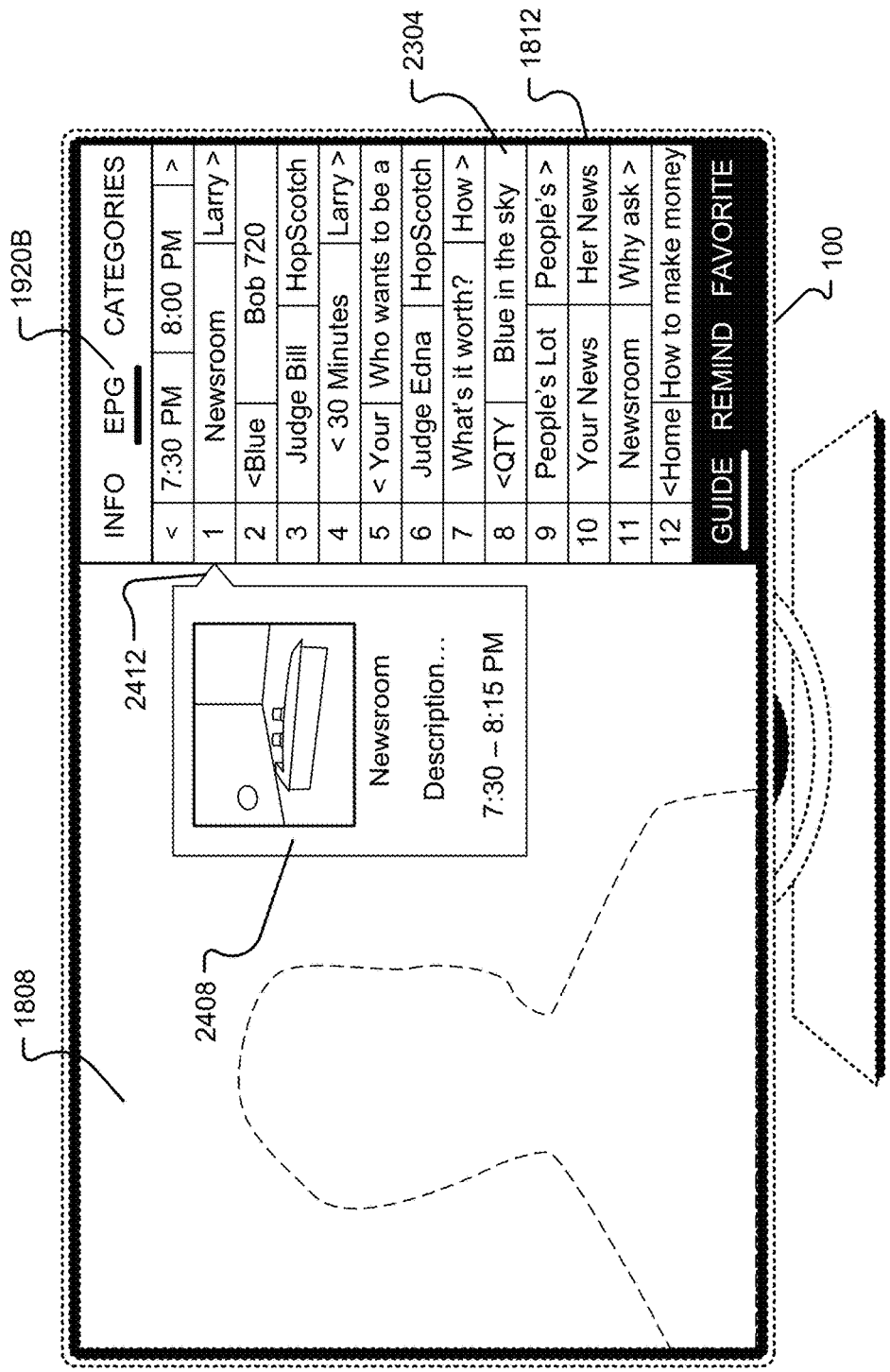
FIG. 24A depicts a first embodiment of an electronic programming guide and preview window presented via an application panel of an Intelligent TV.

FIG. 24A depicts a first embodiment of an EPG 2304 and EPG preview window 2408 presented via an application panel 1812 of an Intelligent TV 100. The EPG 2304 shown includes scheduled programming listed by channel number (e.g., from channel number 1 to channel number 12). The application panel 1812 also shows the application panel navigation bar, an EPG time scale, and a hotkey legend, in accordance with embodiments of the present disclosure. In some embodiments, select content from the EPG 2304 may provide an EPG preview window 2408 via the Intelligent TV 100. The EPG preview window 2408 may include a thumbnail graphic, a title, description, time, channel identifier, combinations thereof, and the like. Among other things, the EPG preview window 2408 may include expanded information of program information that is displayed in the EPG 2304.

In some embodiments, an EPG preview window 2408 may be visually associated with a particular channel and/or program. For instance, the EPG preview window 2408 may include a preview indicator 2412. Among other things, the preview indicator 2412 may point to a particular row (e.g., program, channel, time segment, etc.) in the EPG 2304.

The EPG preview window 2408 may be displayed by navigating to a particular row, program, or time slot, within the EPG 2304. In one embodiment, the EPG preview window 2408 may display after a given period of time has passed since a row, program, or slot is selected (whether the selection is provided by a user input or in response to a default condition of the Intelligent TV 100). In another embodiment, a user may select to display the EPG preview window 2408 by providing an input via a remote control or other input device. For example, a selection of the first row, or Channel 1 in FIG. 24A, may cause an EPG preview window 2408 to appear within at least a portion of the active content area 1808. The EPG preview window 2408 may be translucent or at least partially transparent to allow content playing in the active content area 1808 to show through the EPG preview window 2408. In essence, this translucent appearance of the EPG preview window 2408 can allow information to be displayed to a viewer, or user, without totally obstructing content that is playing on the Intelligent TV 100. Continuing the example above, the EPG preview window 2408 is presenting expanded information associated with the program "Newsroom."

Figure 24B:
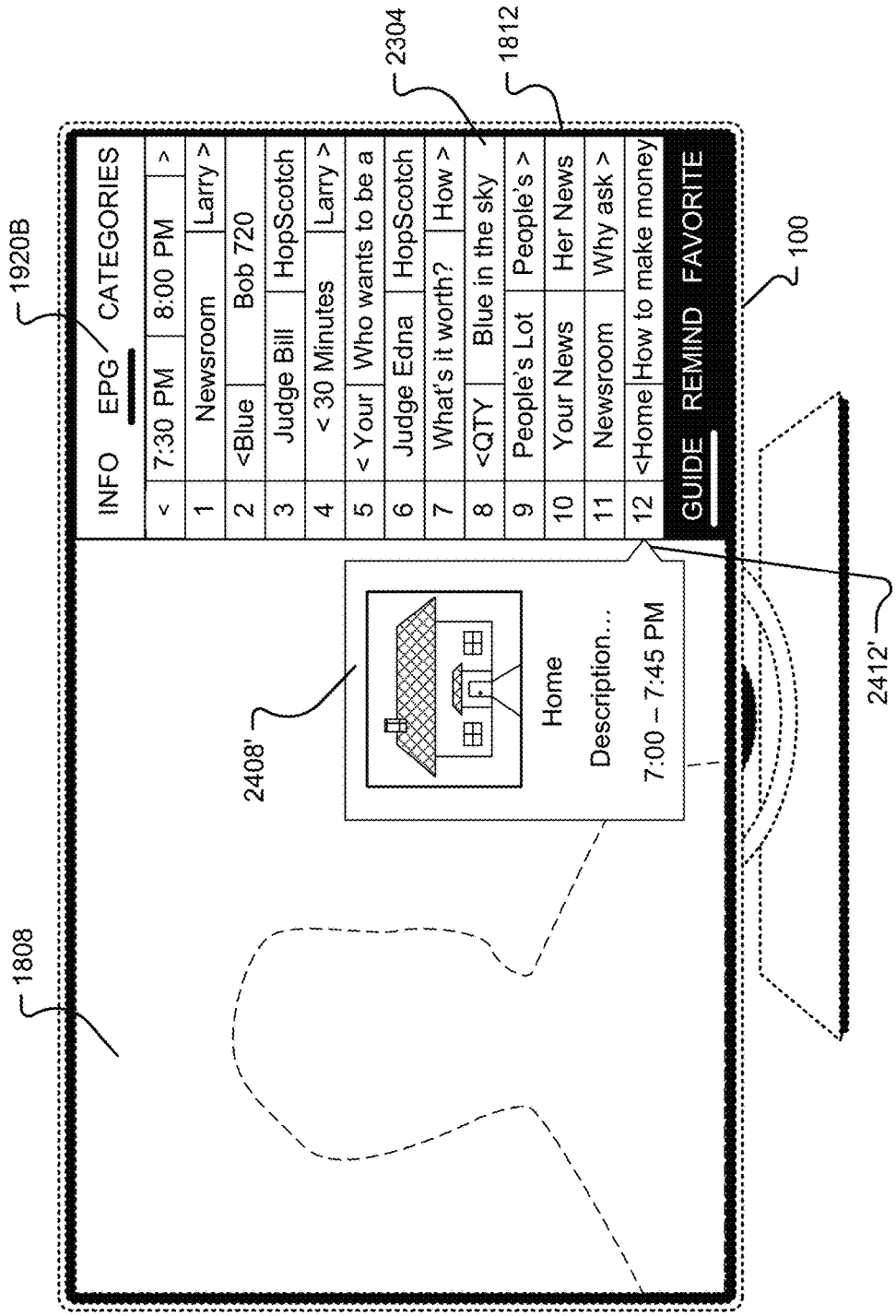
FIG. 24B depicts a second embodiment of an electronic programming guide and preview window presented via an application panel of an Intelligent TV.

FIG. 24B shows an EPG preview window 2408' associated with programming content playing on Channel 12. In this example, a user may have provided an input to navigate to the first program in the Channel 12 row on the EPG 2304. For example, a user may have provided a navigational input (e.g., up, down, left, right, etc.) via a remote control or other input device associated with the Intelligent TV 100. As such, the EPG preview window 2408 may move closer to the selected channel and the preview indicator 2412' may shift to point to the row associated with the selected channel. In this example, the EPG preview window 2408' is now presenting expanded information associated with the program "Home." In any embodiment, the behavior of the EPG preview window 2408 and the preview indicator 2412 may depend on rules stored in memory. Such rules may govern when the EPG preview window 2408 moves relative to the EPG 2304. Additionally or alternatively, the rules stored in memory may govern how the preview indicator 2412 moves relative to the EPG preview window 2408 and/or the EPG 2304.

Figure 25:
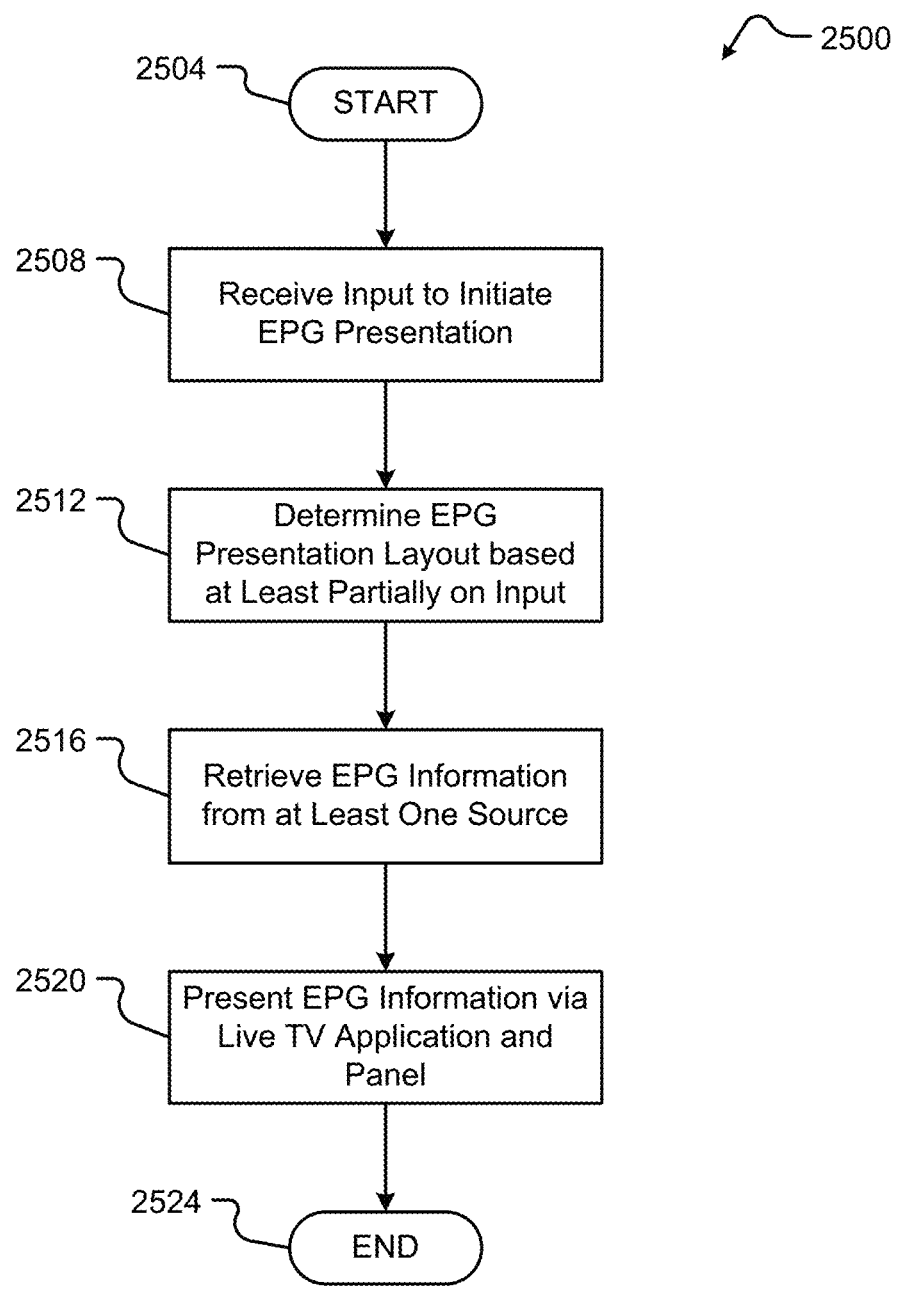
FIG. 25 is a flow diagram depicting an electronic program guide presentation method in accordance with embodiments of the present disclosure.

FIG. 25 shows a flow diagram depicting an EPG presentation method 2500 in accordance with embodiments of the present disclosure. The method 2500 begins at step 2504 and proceeds when the Intelligent TV 100 receives input to initiate the EPG presentation (step 2508). In some embodiments, the EPG may be initiated by a user providing an input via a remote control or other input device. In one example, a user may activate the application panel 1812 by providing an input via the remote control or other device. Once the application panel is presented to the Intelligent TV 100, the user may navigate along the application panel navigation bar 1904 and shift the select-focus to the EPG region 1920B. In another example, a user can provide an input via a hotkey, or other button, associated with a remote control or other device that may cause the application panel 1812 to display the EPG directly. In other words, the user would not be required to navigate through regions on the application panel navigation bar 1904 to display the EPG. In yet another example, the EPG may be automatically displayed by the Intelligent TV 100 in response to detecting a condition stored in rules.

Next, the EPG presentation layout is determined by the Intelligent TV 100 (step 2512). This determination may be based at least partially on the input that initiated the EPG presentation. For example, if an input is provided to display a channel-based EPG, the Intelligent TV 100 would determine a channel-based EPG to present via the application panel 1812. On the other hand, if an input is provided to display a time-based EPG, the Intelligent TV 100 would determine to present a time-based EPG via the application panel 1812. Rules stored in a memory associated with the Intelligent TV 100 may dictate the presentation layout. In some embodiments, the rules stored in a memory may include one or more EPG information layout templates. The one or more EPG information layout templates may correspond to a layout template that arranges content that makes up the EPG information. As can be appreciated, the EPG information layout template may be associated with a specific EPG presentation input and/or live TV content playing in the content view area 1808 as an EPG presentation input is received. In one embodiment, an EPG presentation input may be matched to stored EPG inputs to determine a select EPG information layout template for the presentation of the EPG information.

In some embodiments, the EPG presentation layout may include at least one position associated with content that makes up the EPG information. The at least one position may correspond to a position of the content within a live TV application panel 1812. In some embodiments, the EPG presentation layout may include specific content that makes up the EPG information. For example, an EPG presentation layout may be determined to include a thumbnail graphic, a preview window, and a time scale. In another example, the EPG presentation layout may be determined to present the EPG information in a particular arrangement, position, location, space, size, and/or combinations thereof relative to the application panel 1812.

The method 2500 continues by retrieving EPG information from at least one source (step 2516). In some cases, the Intelligent TV 100 may retrieve program information from over-the-air channel signals. Typically, the program information provided in such signals is limited to simple text-based descriptions. However, the Intelligent TV 100 may be connected to a network (e.g., the Internet) and as such, may retrieve detailed program information, graphics, additional content, multimedia, and the like. Accordingly, the Intelligent TV 100 may compare, select, and/or aggregate information retrieved from at least one source.

At step 2520, the Intelligent TV 100 presents the EPG information retrieved in step 2516 via the live TV application and panel 1812. The EPG information may be presented in the predetermined EPG presentation layout. Additionally or alternatively, the arrangement of the presented EPG information may be altered via user input. The method 2500 ends at step 2524.

Figure 26:
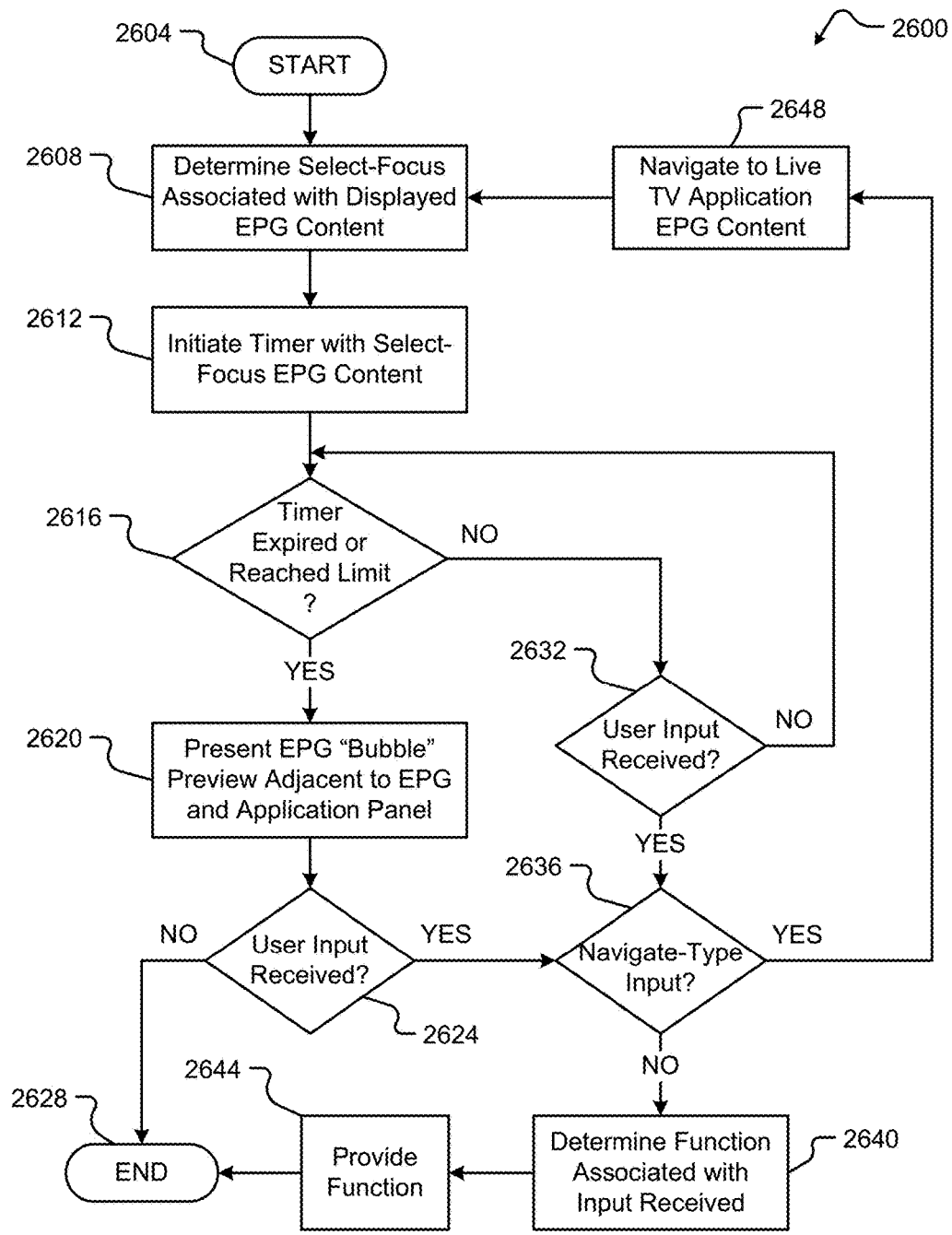
FIG. 26 is a flow diagram depicting an electronic program guide and preview window presentation method in accordance with embodiments of the present disclosure.

FIG. 26 shows a flow diagram depicting an EPG and preview window 2408 presentation method 2600 in accordance with embodiments of the present disclosure. Similar to the other methods presented herein, the method 2600 may be performed by at least one processor executing instructions stored in a non-transitory computer readable medium associated with the Intelligent TV 100. The method 2600 begins at step 2604 and proceeds by determining a select-focus associated with displayed EPG content (step 2608). Among other things, displayed EPG content may correspond to a row, a program, a time, or combinations thereof that are associated with an EPG list. As previously described above, the select-focus may correspond to a visual representation of the position of a user's cursor, or indicator, on the application panel 1812. Examples of select-focus visual representations may include, but are not limited to, highlights, underlines, font style emphasis/change, shadows, glows, color change, associated icons, actions, combinations thereof, and the like. The select-focus may indicate that a specific program and/or EPG entry in the displayed EPG information is selected.

Once a select-focus that is associated with EPG content is determined, the Intelligent TV 100 may initiate a timer for the determined EPG content (step 2612). The timer may be configured to count up or count down, depending on the configuration. In any event, the timer can include a goal time. Upon reaching the goal time, the method may continue. In some embodiments, the timer may be configured to reset if the select-focus is shifted to other EPG content. Additionally or alternatively, the timer may be preconfigured with an expiration time, a limit, or an overall duration.

The method 2600 continues by determining whether the timer has expired or reached its preset limit, or goal time (step 2616). If the timer has not completed its timing function, the method 2600 may proceed to determine whether user input is received by the Intelligent TV 100 (step 2632). Where no user input is received, the method 2600 may return to step 2616 and continue to run the timing function associated with the initiated timer.

If the timer has completed its timing function, the method continues by presenting an EPG preview window 2408, or "bubble" preview (step 2620). In some embodiments, the EPG preview window 2408 may be presented adjacent to the application panel 1812 in the active content area 1808 of the Intelligent TV 100. It is anticipated that the EPG preview window 2408 may be separate and apart from the application panel 1812. The EPG preview window 2408 may include a preview indicator 2412. In some cases the preview indicator 2412 may be configured to overlap at least a portion of the application panel 1812. Additionally or alternatively, the preview indicator 2412 may be linked to an EPG entry that is associated with the EPG preview window and the EPG information presented to the display of the Intelligent TV 100. In one embodiment, the link of the preview indicator 2412 to the EPG entry may be indicated by an arrow. For example, the preview indicator 2412 may point to a specific EPG entry in the EPG information presented via the application panel 1812.

Next, the method 2600 continues by determining whether user input is received (step 2624). If no user input is received, via a remote control or other input device, the method 2600 ends at step 2628. On the other hand, if user input is received, at step 2624 or at step 2632, the method 2600 continues by determining whether the user input is a navigate-type input (step 2636). In some embodiments, the navigate-type input may be provided by a remote control or other input device. Examples of navigate-type inputs may include, but are not limited to, directional inputs (e.g., via arrow keys, swipes, touch-screens, etc.), channel up inputs, channel down inputs, hotkey inputs associated with navigation, combinations thereof, and the like. As disclosed herein, the navigate-type input may correspond to movement within EPG content that is available via the application panel 1812. In some cases, the EPG content may not be displayed to the application panel 1812, but a navigate-type input may display the EPG content to the application panel 1812. Upon receiving a navigate-type input, the method 2600 may proceed to navigate to the EPG content associated with a direction or destination of the navigate-type input (step 2648). After navigating to the EPG content, based on the provided navigate-type input, the method 2600 may repeat from step 2608.

If a user-input is received via the Intelligent TV 100, but it is determined to be an input other than a navigate-type input associated with EPG content, the method 2600 continues by determining a function associated with the input received (step 2640). Next, the method continues by providing the function determined in step 2640 (step 2644). For example, a user may provide an "exit" input via a remote control device. Based on this input, the Intelligent TV 100 determines that the input is not a navigate-type input as disclosed herein. Continuing the example, the method 2600 provides the "exit" input functionality, which in this case may correspond to closing the application panel 1812. In another example, a user may provide an "enter" input while the select-focus is associated with a program in the EPG content. In this case, the "enter" input may be associated with tuning the Intelligent TV 100 to the signal source associated with the program in the select-focus. The Intelligent TV 100 may provide the functionality associated with the "enter" input and tune to the signal source. The method ends at step 2628.

Figure 27:
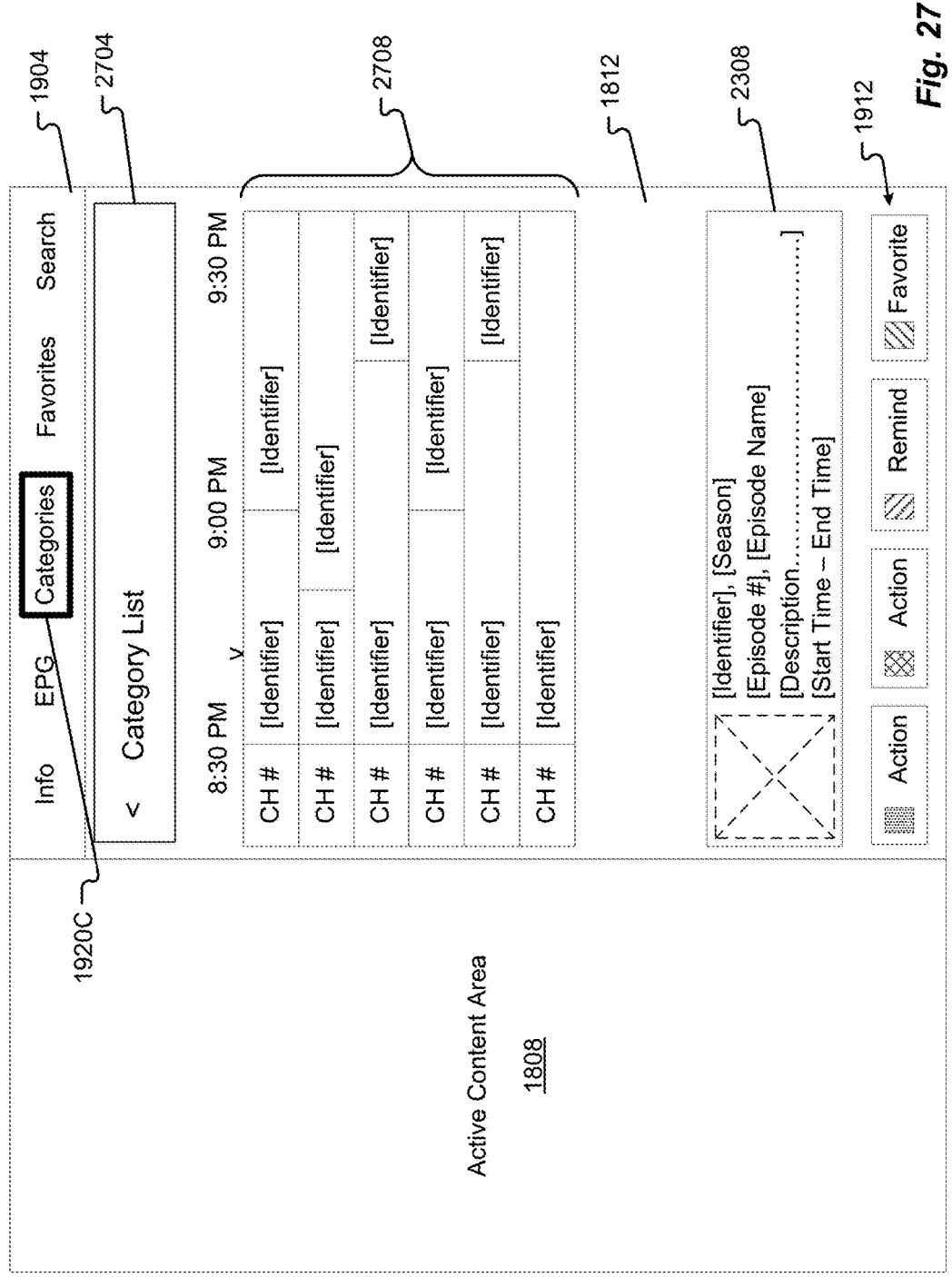
FIG. 27 depicts an embodiment of a compact electronic programming guide presented via an application panel of an Intelligent TV.

FIG. 27 depicts an embodiment of a compact EPG 2708 presented via an application panel 1812 of an Intelligent TV 100. As shown, the select-focus associated with the application panel navigation bar 1904 is set to the Categories tab 1920C. In some cases the selection of the Categories tab 1920C may be indicated via a select-focus in the form of a highlight, an underline, a specific font style, an action (e.g., movement of the Categories tab 1920C indicator, brightness adjustment, etc.), combinations thereof, and the like. This select-focus indication may be associated with the Categories tab 1920C. The application panel 1812 may also include a hotkey legend 1912 similar to other application panels 1812 displayed via the Intelligent TV 100. As previously discussed, the hotkeys provided in the hotkey legend 1912 may be customized to facilitate shortcut navigation and/or special features associated with the Intelligent TV 100 and/or the application panel 1812. For instance, the hotkeys may be context sensitive to a particular application panel 1812 displayed. As shown in FIG. 27, the hotkey legend 1912 may include Remind, Favorite, and other actions associated with one or more hotkeys. The hotkeys may be associated, or mapped, to one or more inputs of a remote control or other input device.

The application panel 1812 includes an EPG layout header 2704. The EPG layout header 2704 may be used to alter the format of a displayed compact EPG 2708. For instance, the EPG layout header 2704 shows "Category List" in FIG. 27 with a caret pointing left, while the compact EPG 2708 is presenting the compact, or "mini," EPG in a chosen category format. A user may select the EPG layout header 2704 to change, remove, create, or select categories that the compact EPG 2708 will display. Categories available via the "Category List" may include, but are not limited to, time-based, genre, title, program type (e.g., movie, TV special, sport, radio, undefined, etc.), channel-based, reminders, combinations thereof, and even user-created categories. In this example, the chosen category EPG list is shown by channel number on the left-hand side of the compact EPG 2708. In some embodiments, a user may select the EPG layout header 2704 to modify the presentation of the compact EPG 2708 in the application panel 1812. Upon selecting the EPG layout header 2704, the user may be presented with a number of compact EPG 2708 layout options. One example of such a presentation layout option may include displaying the compact EPG 2708 as any one of the categories disclosed above that can be chosen via a selection from within the Category tab 1920C of application panel 1812. In a "Time-Based" category presentation, the compact EPG 2708 may be arranged by time (as opposed to channel number, as previously discussed above). In another embodiment, a user may select a "Movie" category from the "Category List," in which case the compact EPG 2708 displays a list of movies that are available for viewing via the Intelligent TV 100. Other variations and presentation layouts regarding categories, as disclosed above, may be made to the compact EPG 2708.

Additionally or alternatively, the application panel 1812 may include a program preview pane 2308 that may include a program thumbnail graphic 2008, an identifier, description, times, and other information that is associated with the channel and/or the program. The program preview pane 2308 may change to display new information as time passes or as a user navigates through selected channels, programs, or rows in the compact EPG 2708. In some embodiments, the Intelligent TV 100 may select EPG content information to display via the program preview pane 2308. This selection may be based on stored rules. In some cases, the program preview pane 2308 may be configured to display information associated with the first channel on the compact EPG 2708 list, as a default.

The compact EPG 2708 may be configured to present one or more programs for each channel in a list format that is accompanied by an EPG time scale 2312. Similar to the EPG 2304 disclosed above, a program in the compact EPG 2708 may include a text, graphic, and/or combination thereof identifier. In some embodiments, the compact EPG 2708 may be configured to display a specific number of lines, rows, programs, and/or information. The identifier may be used to identify the program to a user of the Intelligent TV 100. Although shown with a finite number of rows displayed via the list of the compact EPG 2708, it is anticipated that other channels may be caused to display to the compact EPG 2708 list given a user provided input. For instance, a user may scroll to another line, or page, on the list, by using a remote control or other input device. As another example, a user may navigate through channels in the compact EPG 2708 by providing a directional input (e.g., via arrow keys, channel up/down buttons, etc.) from a remote control or other input device.

In some embodiments, the EPG time scale may include a current time indicator. The current time indicator may be represented by a graphic that is associated with the EPG time scale and that is capable of moving relative to the EPG time scale 2312. FIG. 27 shows a small arrow, or caret symbol, positioned between the 8:30 PM and 9:00 PM on the EPG time scale 2312. The position of the caret symbol along the scale in the present example indicates that the current time is approximately 8:40 PM. Although shown as a caret symbol, it is anticipated that any graphic may be used to provide an indication to a user. Moreover, while a moveable time indicator is disclosed above, it is anticipated that some embodiments may employ a fixed current time indicator while the EPG time scale 2312 itself moves relative to the fixed current time indicator.

Figure 28A:
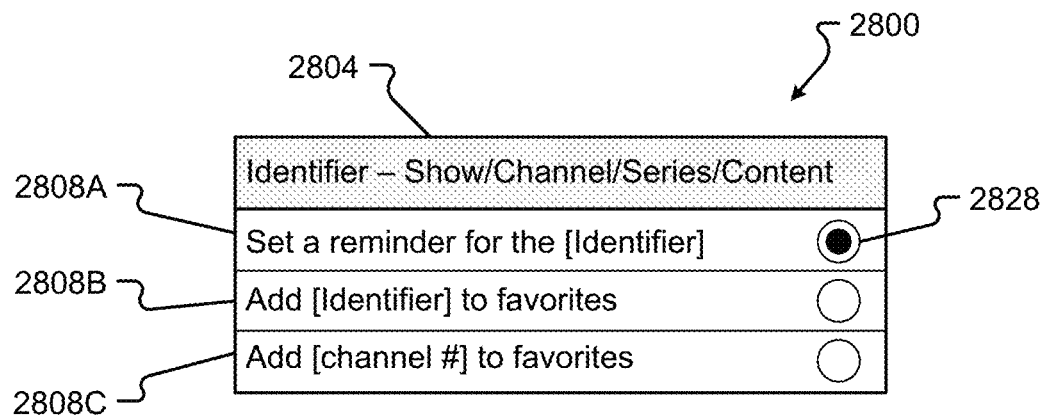
FIG. 28A depicts a first embodiment of a reminder dialog presentation in accordance with embodiments of the present disclosure.

FIG. 28A depicts a first embodiment of a reminder dialog presentation 2800 in accordance with embodiments of the present disclosure. A reminder may be set for a program, show, channel, time, and combinations thereof. The reminder may be associated with an initiation condition, including but not limited to, a timer, an input from an EPG, in response to another condition, some other input, or combinations thereof. Continuing the example, when the initiation condition is satisfied for the reminder, the reminder may display to the Intelligent TV 100. In some cases, the reminder may be displayed within a specific timeframe of a scheduled program or show. The reminder dialog presentation may utilize one or more of the dialog presentations disclosed above.

The reminder dialog presentation 2800 includes a reminder header 2804 and a reminder body comprising one or more reminder prompts 2808A-C. The reminder header 2804 may include an identifier associated with a show, channel, series, content, reminder, program, time, etc. For example, the reminder header 2804 may display the title of a program that is available via the live TV application. The reminder body can include prompts 2808A, 2808B, 2808C, along with one or more selectable inputs 2828, such that a user may select an input that is associated with the prompts 2808A, 2808B, 2808C. As can be appreciated, a user may navigate among these prompts 2808A, 2808B, 2808C, to select a corresponding action that may be performed by the live TV application. In the present example, the reminder setting prompt 2808A is highlighted by default. A user may move the position of the highlight via a remote control or other input device.

In some embodiments, the reminder dialog presentation 2800 may be initiated in response to a user input. A user may desire to add a reminder for a specific program, show, channel, etc. As such, a user may utilize a "remind" input associated with a remote control or other input device. In one example, a "remind" input may be provided via a hotkey associated with the remote control or other input device. For instance, a user may be viewing an EPG via the application panel 1812 of an Intelligent TV 100 and notice that an interesting program is scheduled to start in an hour. Desiring to be reminded of the program, the user may select the program, activate the reminder input (e.g., via the "remind" hotkey, or other input) to initiate the reminder dialog presentation 2800. Then, the user may select the first prompt 2808A to set a reminder for the program.

The second prompt 2808B allows a user to add the live TV content (e.g., show, series, program, etc.) to a "Favorites" compilation, or group. In a similar fashion, the third prompt 2808C listed on the reminder dialog presentation 2800 may be configured to provide an option for a user to add a selected channel to the "Favorites" compilation, or group. As can be appreciated, the "Favorites" group may be arranged at least by channel and content.

Figure 28B:
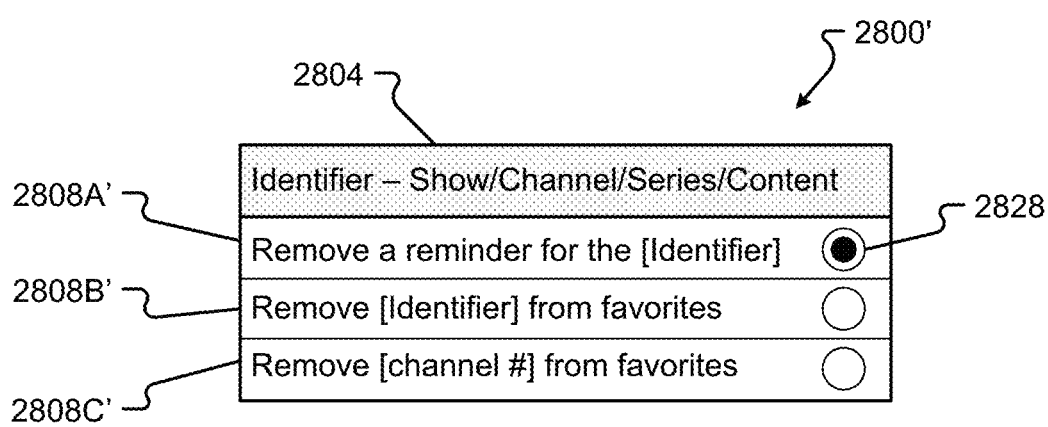
FIG. 28B depicts a second embodiment of a reminder dialog presentation in accordance with embodiments of the present disclosure.

Referring to FIG. 28B a second embodiment of a reminder dialog presentation 2800' is depicted in accordance with embodiments of the present disclosure. In the event that a reminder is previously set for live TV content, a user may initiate the second reminder dialog presentation 2800' shown in FIG. 28B. Among other things, the user may modify settings associated with the previously set reminder via the second reminder dialog presentation 2800'. The second reminder dialog presentation 2800' can be initiated in a similar manner as the reminder dialog presentation 2800. Additionally or alternatively, the second reminder dialog presentation 2800' may be initiated by a user selecting a previously set reminder, or a program that is associated with a previously set reminder. Upon providing the selection input, the user may view the second reminder dialog presentation 2800'.

The second reminder dialog presentation 2800' includes a reminder header 2804 and a reminder body comprising one or more reminder prompts 2808A'-C'. As shown in FIG. 28B, the reminder prompts 2808A'-C' have changed from setting a reminder and adding a channel or content as a favorite to removing a reminder and channel or content from a "Favorites" group. In the event that a user wishes to remove the reminder from particular content, the user may initiate the second reminder dialog presentation 2800' (as disclosed above) and select the "remove reminder" prompt from the appropriate reminder prompt 2808A'. Although FIGS. 28A-B show exemplary reminder dialog presentations 2800, 2800', it should be appreciated that the presentation of user prompts 2808A-C, 2808A'-C' can vary in the number of prompts presented as well as the order in which they are presented.

FIGS. 29A-D depict embodiments of reminder dialog notifications in accordance with embodiments of the present disclosure. In particular, FIGS. 29A-D show various reminder dialogs that are presented to the display of the Intelligent TV 100 upon receiving a reminder initiation input. The reminder initiation input may be provided by one or more of, a user, the live TV application, other applications associated with the Intelligent TV 100, and/or one or more components of the Intelligent TV 100. For instance, a reminder may have been set, or programmed, for a specific program or show that is scheduled to play on live TV.

In some embodiments, a reminder may be set for a specific program. The reminder may notify a user when the specific program is about to start, regardless of where the user is in the Intelligent TV 100 system (e.g., on another channel, silo, etc.). In one embodiment, a reminder may be set and created for a specific instance of a complete series. For example, if a program is on every Friday night at 8:00 PM on channel 3, then setting a reminder for the program may create a reminder that is provided every Friday at 7:58 PM. Additionally or alternatively, if a program is a single airing event (such as a movie or TV special), then a reminder may only be provided for that singular instance.

Reminders may be created for one or more parameters including, but not limited to, program names at program times on a program channel. The reminder may be stored in a memory and whenever a program is on that matches the one or more parameters the reminder may be set. The program logic used to create and/or set reminders does not require consideration of the day of the week associated with the one or more parameters. As such, all of the logical configurations may be covered. For example, reminders may be set for weekdays only (e.g., a soap opera, talk show, etc.), every day (e.g., news), twice a week (e.g., variety shows, competition shows having a competition day and a voting results day, etc.), once a week (e.g., a situation comedy (sitcom), drama show, etc.), and even once only (e.g., movie, TV special, etc.). This configuration may cover scenarios where shows go off the air for some time period between seasons.

In any event, a reminder may be associated with an initiation condition, including but not limited to, a timer, an input from an EPG, in response to another condition, some other input, or combinations thereof. Continuing the example, when the initiation condition is satisfied for the reminder, the reminder may display to the Intelligent TV 100 in the form of at least one of the reminder dialog presentations shown in FIGS. 29A-D. In some cases, the reminder may be displayed within a specific timeframe of a scheduled program or show. The notifications may be displayed to the active content area 1808 of the Intelligent TV 100. Additionally or alternatively, the notifications may be translucent, or semi-transparent, to allow content from the active content area 1808 to show through the notifications.

The reminder time bar 2912 may be similar in form and function to the timing feature disclosed in reference to FIGS. 16A-E of the detailed description. Among other things, the reminder time bar 2912 may be configured to display an amount of time that is associated with the visual presentation of the reminder dialog notification. In other words, the reminder time bar 2912, may indicate how long a reminder is expected to be displayed before the reminder notification disappears. By way of example, the reminder time bar 2912 may be configured as a progress bar that increases in dimension (e.g., length, width, height, combinations thereof, etc.) until the dimension reaches a specific size, at which point the reminder notification disappears. In another embodiment, the reminder time bar 2912 may be arranged as a timed progress bar that decreases in dimension (e.g., length, width, height, combinations thereof, etc.) until the progress bar disappears with the notification. The reminder time bar 2912 that decreases in size may be called a reverse progress bar. In any event, at the end of a specific period of time set, or upon reaching a time goal, for a reminder notification, the notification may be configured to disappear.

A user may interact with a reminder dialog notification. For instance, a reminder dialog notification 2904A-D may be configured with a user interface button 2916. In some cases, the user interface button 2916 may include a text or graphic that indicates an associated function with the button 2916. Additionally or alternatively, it is anticipated that a user may interact with a content identification bar 2908 and even a preview pane 2308. In one example, a user may select the content identification bar 2908 associated with a notification. In some cases, this selection may tune the Intelligent TV 100 to the signal source associated with the bar 2908. Depending on one or more of the style of reminder dialog notification 2904A-D, the content associated with the reminder, user preferences, and Intelligent TV 100 settings, any of the various reminder dialog notifications may be presented to a user via the display of the Intelligent TV 100.

The live TV application may be configured to receive multiple reminder notifications at the same time. When multiple reminder notifications are received at the same time, the reminders may be queued. In some embodiments, requests to the user interface of the Intelligent TV 100 are sent one at a time to display the notification to the user. If the user chooses not to change the channel associated with the notification, the live TV application may proceed to process the next reminder notification in queue.

Figure 29A:
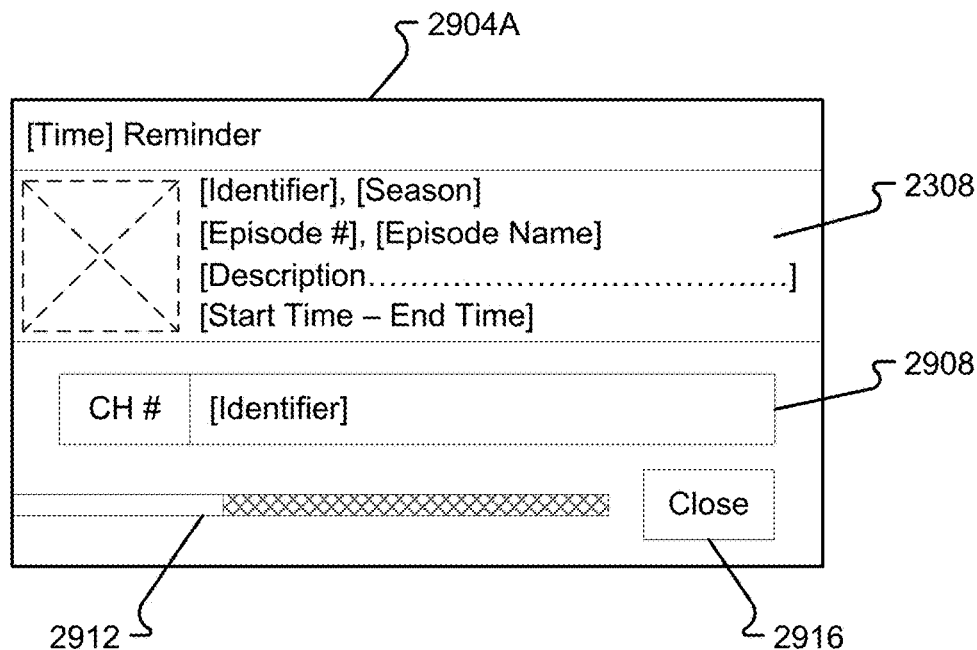
FIG. 29A depicts a first embodiment of a reminder dialog notification in accordance with embodiments of the present disclosure.

FIG. 29A depicts a first reminder dialog notification 2904A configured with a program preview pane 2308, a content identification bar 2908, a reminder time bar 2912, and a user interface button 2916. The reminder dialog notification may be accompanied by one or more of a time and reminder title in the header of the notification 2904A. The content identification bar 2908 may include a channel number, identifier, graphic, description, and the like associated with live TV content. This configuration of reminder dialog notification allows for a great amount of information to be included in the reminder. As can be appreciated, the size of the first reminder dialog notification 2904A may occupy a substantial portion of the viewing area of the active content area 1808. It should be appreciated, however, that the dialog notification may be justified (bottom, left, right, top, middle, combinations thereof, etc.) to occupy a specific portion of the Intelligent TV 100 active content area 1808. In some embodiments, the first reminder dialog notification 2904A may be presented only at a first time to a user, while subsequent reminders for the same content may utilize another dialog notification as disclosed herein.

Figure 29B:
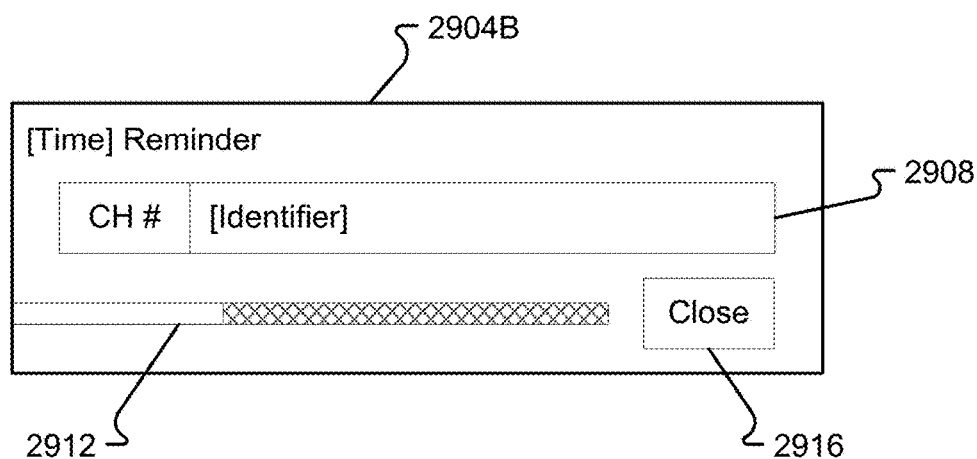
FIG. 29B depicts a second embodiment of a reminder dialog notification in accordance with embodiments of the present disclosure.

FIG. 29B depicts a compact reminder dialog notification 2904B configured with a content identification bar 2908, a reminder time bar 2912, and a user interface button 2916. Although shown with a combination of features, the compact reminder dialog notification 2904B may include more or less features than shown. For example, an unobtrusive compact reminder dialog notification may only include the content identification bar 2908 and possibly a reminder time bar 2912 to use a limited amount of space on the Intelligent TV 100 display, especially when compared to the first reminder dialog notification 2904A. As such, the compact notification 2904B may be displayed to the active content area 1808 of the Intelligent TV 100 to appear smaller than the first reminder dialog notification 2904A. This compact reminder dialog notification 2904B may be useful in subsequent reminders or in reminders for content already observed/acknowledged by a user.

Figure 29C:
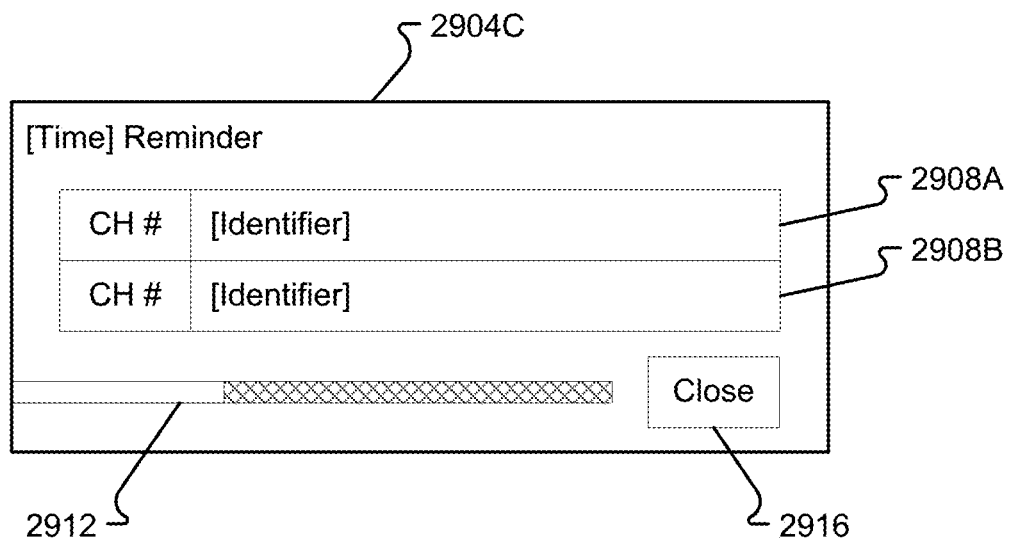
FIG. 29C depicts a third embodiment of a reminder dialog notification in accordance with embodiments of the present disclosure.

FIG. 29C depicts a multiple reminder dialog notification 2904C configured with a first content identification bar 2908A, a second content identification bar 2908B, a reminder time bar 2912, and a user interface button 2916. Among other things, the multiple reminder dialog notification 2904C can alert a user of multiple reminders that were previously set. From the multiple reminder dialog notification 2904C, a user may navigate between the various interactive features. For example, a user may at least navigate between the first content identification bar 2908A and the second content identification bar 2908B. Continuing this example, a user may select the first content identification bar 2908A associated with the multiple reminder dialog notification 2904C. In some cases, this selection may tune the Intelligent TV 100 to the signal source associated with the bar 2908. Conversely, the user may select the second content identification bar 2908B associated with the multiple reminder dialog notification 2904C. In this case, this selection may tune the Intelligent TV 100 to the signal source associated with the second bar 2908B.

It is anticipated that the multiple reminder dialog notification 2904C may be used in instances where two or more reminders are set for live TV content. In one embodiment, the maximum number of displayed reminders, or content identification bars, may be limited to a specific number. For instance, even if thirty reminders are set for live TV content on the Intelligent TV 100, and all are about to initiate a reminder dialog, only two would be presented via the embodiment above. In another embodiment, however, the number of displayed reminders, or content identification bars may not be so limited. As such, the notification 2904C may increase in size to fit the number of reminders set and configured to alert at the same time.

Figure 29D:
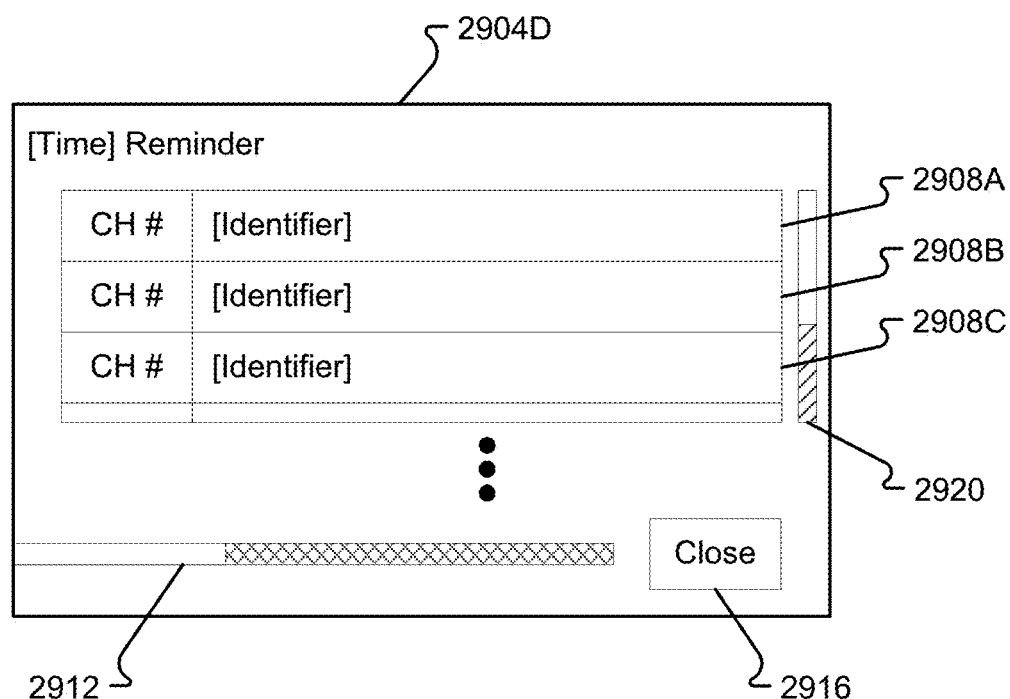
FIG. 29D depicts a fourth embodiment of a reminder dialog notification in accordance with embodiments of the present disclosure.

FIG. 29D depicts a scrollable multiple reminder dialog notification 2904D configured with a first content identification bar 2908A, a second content identification bar 2908B, a third content identification bar 2908C, a dialog scroll bar 2920, a reminder time bar 2912, and a user interface button 2916. Among other things, the scrollable multiple reminder dialog notification 2904C can alert a user of multiple reminders that have been previously set. From the multiple reminder dialog notification 2904C, a user may navigate between the various interactive features. For example, a user may at least navigate between the first content identification bar 2908A, the second content identification bar 2908B, the third content identification bar 2908C, and more via the dialog scroll bar 2920. Similar to the previous dialog notifications 2904A-C, a user may select any one of the content identification bars 2908A-C, even those not presently visible without movement of the dialog scroll bar 2920, that are associated with the scrollable multiple reminder dialog notification 2904D.

Figure 30:
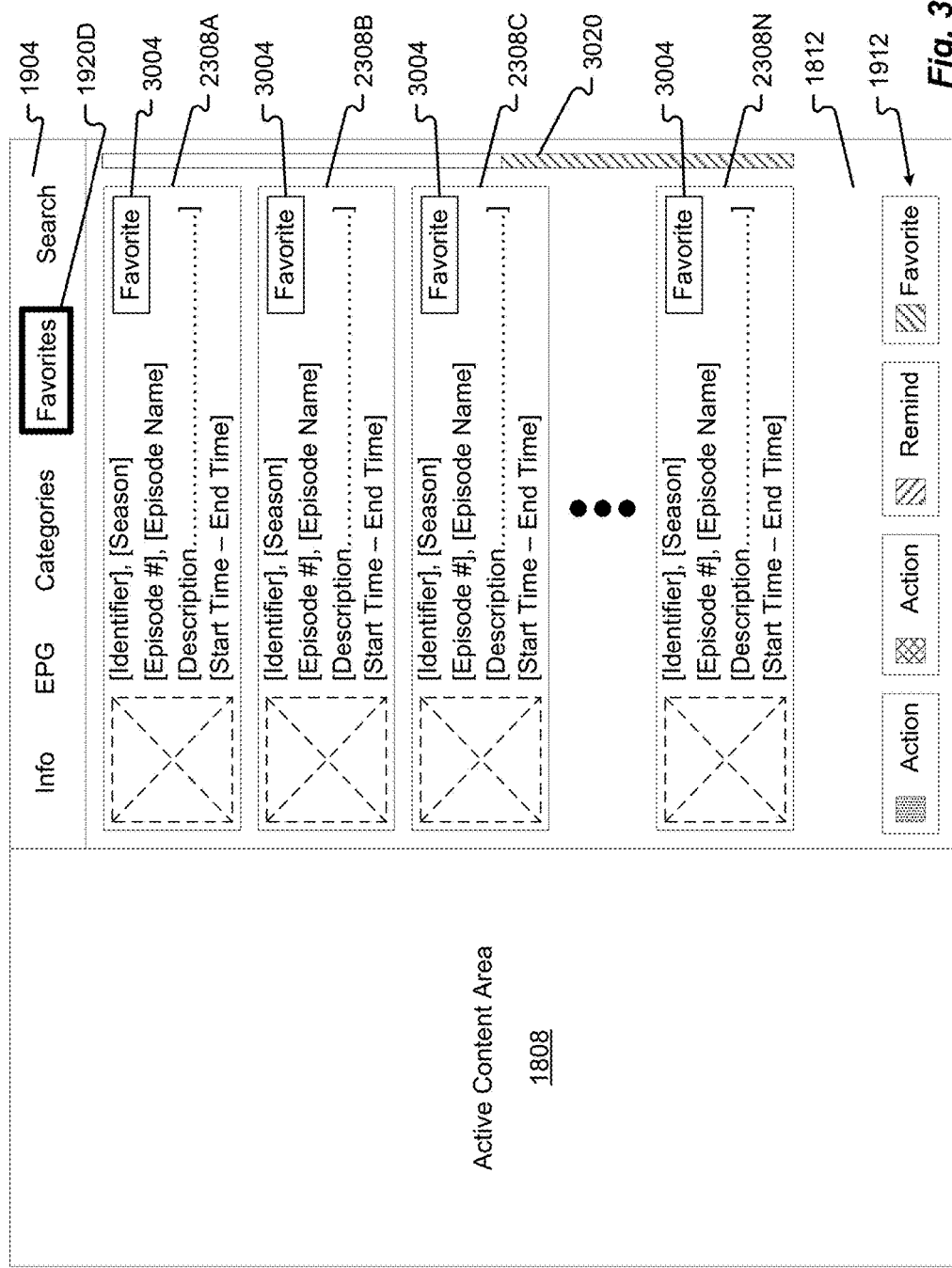
FIG. 30 depicts a grouped content panel presented via an application panel of an Intelligent TV.

FIG. 30 depicts a grouped content panel presented via an application panel 1812 of the Intelligent TV 100. In particular, FIG. 30 shows content that has been marked as a favorite by a user or Intelligent TV 100. In other words, the content grouped in the Favorites tab 1920D is preferred over ungrouped content by at least one user. As shown, the select-focus associated with the application panel navigation bar 1904 is set to the Favorites tab 1920D. In some cases the selection of the Favorites tab 1920D may be indicated via a select-focus in the form of a highlight, an underline, a specific font style, an action (e.g., movement of the Favorites tab 1920D indicator, brightness adjustment, etc.), combinations thereof, and the like. This select-focus indication may be associated with the Favorites tab 1920D. The application panel 1812 may also include a hotkey legend 1912 similar to other application panels 1812 displayed via the Intelligent TV 100. As previously discussed, the hotkeys provided in the hotkey legend 1912 may be customized to facilitate shortcut navigation and/or special features associated with the Intelligent TV 100 and/or the application panel 1812. For instance, the hotkeys may be context sensitive to a particular application panel 1812 displayed. As shown in FIG. 30, the hotkey legend 1912 may include Remind, Favorite, and other actions associated with one or more hotkeys. The hotkeys may be associated, or mapped, to one or more inputs of a remote control or other input device.

In some embodiments, the content in favorites may be displayed as an EPG list. For example, an EPG list may display programs that are currently airing on channels marked as favorite. As such each row of the list may correspond to a favorite channel, and show current program that is airing on that channel at the moment the EPG list is displayed. In the event that the EPG list is too large to display to the application panel 1812, a scroll bar 3020 may be included to allow a user to adjust the visibly displayed content.

In other embodiments, the content in favorites may comprise an EPG list that identifies programs currently airing that have been identified as preferred, or favorite. The view of the EPG list can be configured as dynamic and based on time. As time progresses, programs currently listed in the application panel 1812 that end may be removed from the EPG list automatically. Additionally or alternatively, favorite programs that begin can be added to the EPG list automatically. In the event that the EPG list is too large to display to the application panel 1812, a scroll bar 3020 may be included to allow a user to adjust the visibly displayed content. In any case a user may select one of the items in the EPG list to close the live TV application and tune the Intelligent TV 100 to the signal source associated with the selected item.

When the Favorites tab 1920D is selected, the application panel 1812 may include content that has been determined as a favorite. This determination of whether content is a favorite may be made by a user. For example, a user may be watching content on the Intelligent TV 100 and provide an input via the remote control or other input device to identify the content as a favorite. In some cases, this input may include marking a show as a favorite by toggling a favorite button or identifier. In some embodiments, the determination of favorite content may be made via the Intelligent TV 100. Among other things, the Intelligent TV 100 may store viewing habits and behavior and mark content as favorites based on the stored habits and behavior. Additionally or alternatively, the presentation of favorite content shown in the application panel 1812 may be ordered via the Intelligent TV 100. The order may be associated with a rank that is determined from stored viewing habits and behavior. For example, if a user watches a specific show more often than others, the specific show may be ordered higher in rank than the others. In the application panel 1812 a high rank may correspond to a high position in the list. Accordingly, the highest ranked show may be placed at the top position on the list displayed to the application panel 1812.

Among other things, the application panel 1812 shown in FIG. 30 may include a program preview pane 2308A-N, and a favorite identifier 3004, or toggle button for one or more live TV program, show, or content. The favorite identifier 3004 may indicate that a particular program is included in the favorites list. Additionally or alternatively, the favorite identifier 3004 may be configured as a user-interactive feature. For example, the favorite identifier 3004 may be used to remove a program from the favorites list. Continuing the example, a user may select the favorite identifier 3004 via an input from a remote control or other input device. Once selected, the user may be presented with an option to remove the content from the favorite list. The user may then select the appropriate option to remove or keep the content on the favorite list. The favorites list may be stored in a memory as disclosed herein, and may be accessed at least via the Favorites tab 1920D of the application panel navigation bar 1904. In some embodiments, content identified as favorites may be displayed in the application panel 1812 without at least one of a thumbnail graphic, description, time, and other features.

Figure 31A:
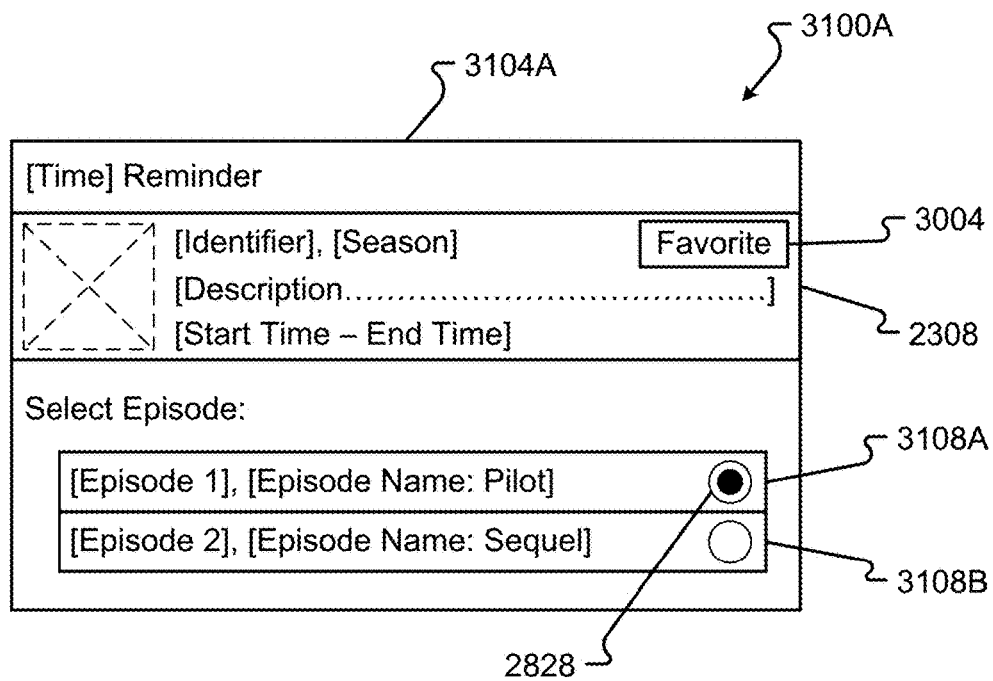
FIG. 31A depicts a first embodiment of a preferred content dialog presentation in accordance with embodiments of the present disclosure.
Figure 31B:
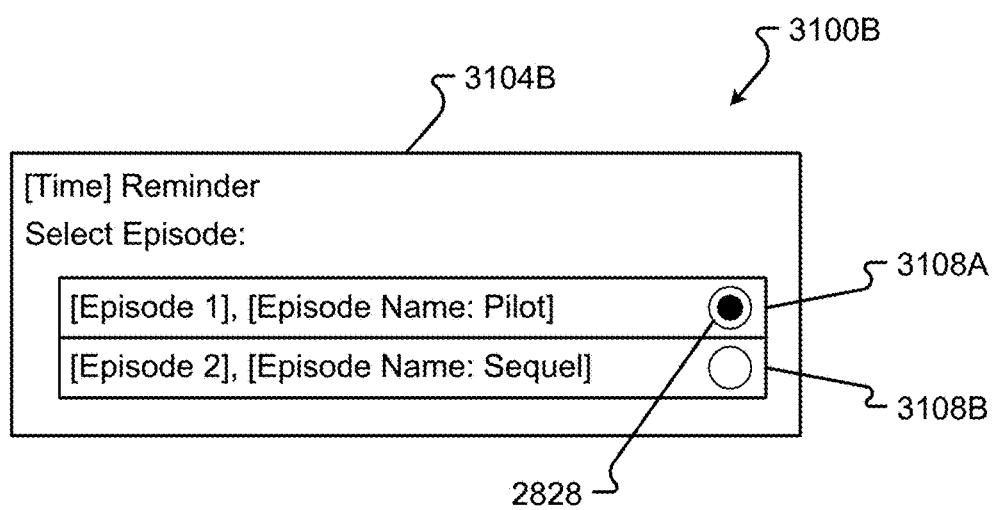
FIG. 31B depicts a second embodiment of a preferred content dialog presentation in accordance with embodiments of the present disclosure.

FIGS. 31A-B depict preferred reminder dialog presentations 3100A-B in accordance with embodiments of the present disclosure. Similar to other reminders disclosed herein, a reminder may be set for preferred content. When a program is selected as preferred, or as a favorite, and the selected program is playing (or airing) on more than one channel at a time, then the preferred reminder dialog presentation 3100 may be displayed to the Intelligent TV 100.

Referring now to FIG. 31A, a first preferred reminder dialog presentation 3100A is shown in accordance with embodiments of the present disclosure. The presentation 3100A includes a first preferred notification dialog 3104A, a program preview pane 2308, a favorite identifier 3004, a first episode selection bar 3108A, a second episode selection bar 3108B, and a selectable input 2828. FIG. 31B shows a compact version of the dialog presentation 3100B without the program preview pane 2308. In either presentation, a user may be presented with selecting from two episodes of the same program playing on different channels.

By way of example, a user may identify a program called "Home Involvement" as a favorite. Moreover, the user may have set a reminder for favorite content. Occasionally, the program "Home Involvement" may be playing on two channels at the exact same time. In this case, when the "Home Involvement" reminder appears, it may present the user with a choice of episode to select from via the first and second episode selection bars 3108A, 3108B. The first and second selection bars 3108A, 3108B may highlight differences between the two episodes, if any, via an identifier or description associated with the selection bar. In some cases an episode name and/or number associated with each selection bar 3108A, 3108B may differentiate the episodes. In other embodiments, a season number and/or description may be included to assist a user in selecting an episode of the program. When a user makes a selection between the first and second episodes the selection may tune the Intelligent TV 100 to the signal source associated with the selection.

As can be appreciated, if more than two episodes of the same program are playing on different channels at the exact same time, the reminder notification may be altered to accommodate the additional episode(s). Additionally or alternatively, the Intelligent TV 100 may determine that there are no differences between the episodes and present a reminder dialog notification without providing the choice between the two. In another embodiment, the Intelligent TV 100 may determine that the episodes are identical, but the channels airing the episodes are not. In this embodiment, the Intelligent TV 100 may use stored preferences, user behavior, habits and the like to present or select an option for the user. For example, a program may be airing in high definition (HD) on one of the channels, while the same program may be airing in standard definition (SD) on another channel. In this instance, the Intelligent TV 100 may present the choice to the user, or select the preferred viewing quality (e.g., HD or SD) on behalf of the user.

Figure 32:
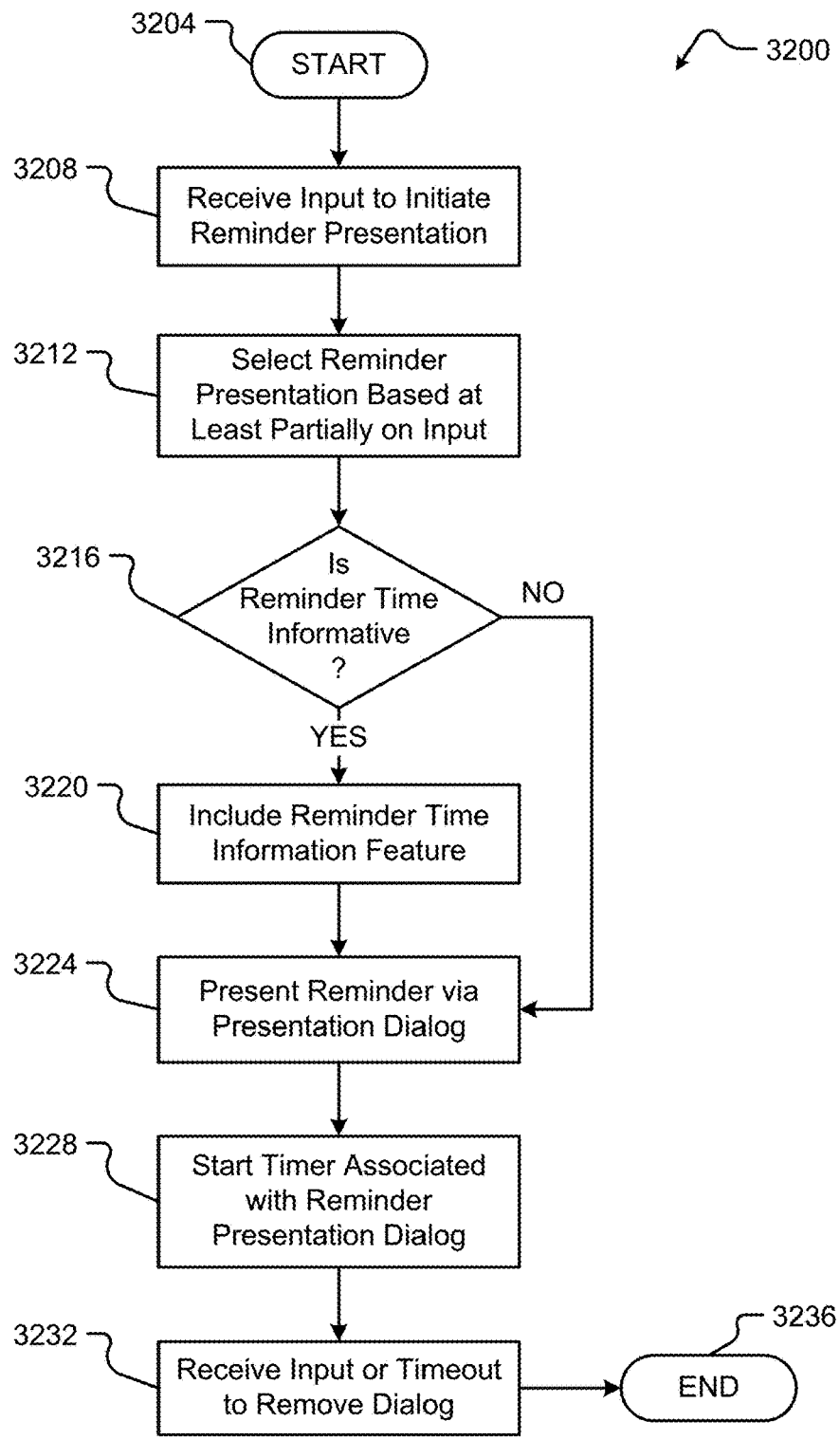
FIG. 32 is a flow diagram depicting a reminder presentation method in accordance with embodiments of the present disclosure.

FIG. 32 is a flow diagram depicting a reminder presentation method in accordance with embodiments of the present disclosure. The method 3200 begins at step 3204 and continues when input is received to initiate a reminder presentation (step 3208). In some embodiments, the input may be provided by one or more of, a user, the live TV application, other applications associated with the Intelligent TV 100, and/or one or more components associated with the Intelligent TV 100. For instance, a reminder may have been set, or programmed, for a specific program or show that is scheduled to play on live TV. The reminder may be associated with an initiation condition, including but not limited to, a timer, an input from an EPG, in response to another condition, some other input, or combinations thereof.

The method 3200 continues by selecting a reminder presentation based at least partially on the initiation input (step 3212). Selection of the reminder presentation may include determining whether the presentation should include a header, a body, one or more selectable prompts, a user interface button, and/or combinations thereof. Additionally or alternatively, selection of the reminder presentation may include determining content and/or features contained within the presentation. For instance, a reminder presentation may include a title and descriptive information coupled with selectable inputs and even a timeout feature. Among other things, the selectable option may allow a user to change channels to a program associated with the reminder presentation.

As part of the reminder presentation, the method 3200 may continue by determining whether the reminder is time informative (step 3216). Various embodiments may utilize one or more time informative feature. For example, where a reminder is determined to be associated with a scheduled program, or time-specific event, the reminder may provide the time until the program, or event, will begin. As another example, a reminder notification may be configured to appear for a limited amount of time. In this case, the reminder notification may provide an amount of time associated with the reminder notification availability, in some representation (e.g., visual, countdown, audible, etc.). In other words, the method 3200 may determine to provide a user with a visual representation of time remaining before a reminder notification disappears from view. In some embodiments, the reminder presentation may provide a visual representation of a time associated with the notification. As can be appreciated, a user may be provided with a countdown timer, a progress bar, combinations thereof, or other time feature associated with the notification. Determining whether or not a dialog is time informative may include referring to a memory having stored preferences, or rules, associated with one or more of TV content, dialog boxes, time informative features, etc.

If the reminder presentation is determined to be time informative, the method 3200 continues by including at least one time information feature as part of the reminder notification presentation (step 3220). In one example, a time feature may include a progress bar displayed as part of the notification. The progress bar may represent an amount of time associated with the visual presentation of the notification. For instance, a progress bar may show how long a reminder dialog notification has been presented to the display of an Intelligent TV 100. As such, the progress bar may include a time start point and a time endpoint. In another example, a reverse progress bar may be configured to countdown, and/or display a graphical change, representing a time remaining for the presentation of the reminder notification. The progress bar, reverse progress bar, or other time feature, may relate to live TV content or the presentation of a notification. The reminder notification may incorporate a default selection, or action, that may be automatically selected in response to a passage of time. Among other things, providing a user with a visual representation of time associated with the notification can allow a user to make a selection other than the default selection associated with the notification. In some embodiments, the default action of the notification may cause the notification to disappear from view.

The method 3200 continues by presenting the reminder notification via the live TV application and the Intelligent TV 100 (step 3224). Presentation of the reminder may include, but is not limited to, a display justification point (e.g., left-justified, right-justified, center-justified, bottom-justified, top-justified, and combinations thereof), a transparency level, a font type or style, an overall size, a size in relation to the display of the Intelligent TV, an animation, and more.

When the reminder is presented to the display of the Intelligent TV 100, a timer may be initiated that defines the amount of time the reminder dialog notification will be presented (step 3228). As can be appreciated, the timer may be a "count-up" timer or a "countdown" timer. The live TV application may be configured to provide an action upon the expiration of the dialog presentation timer. As previously state, one action may cause the reminder notification to disappear from the display of the Intelligent TV 100.

Next, the method 3200 receives an input from a user, or the expiration of the timer, to remove the reminder notification presentation (step 3232). A user input may correspond to a selection associated with the reminder notification presentation, a cancellation, a user-interface button, or some other input associated with the Intelligent TV 100. For example, a user may select an option associated with the reminder notification presentation, in which case the reminder notification presentation may disappear. In some embodiments, a user may not enter an input and an automatic selection, or action, may be made by the expiration of the timer. In any event, when the timer has reached the end of its scheduled time the reminder notification presentation may be configured to disappear from display. In an alternative embodiment, the reminder notification presentation may be configured to fade out, move to the application (or other) panel, minimize, or otherwise dismiss from the active content view area 1808 of the Intelligent TV 100. The method ends at step 3236.

Figure 33:
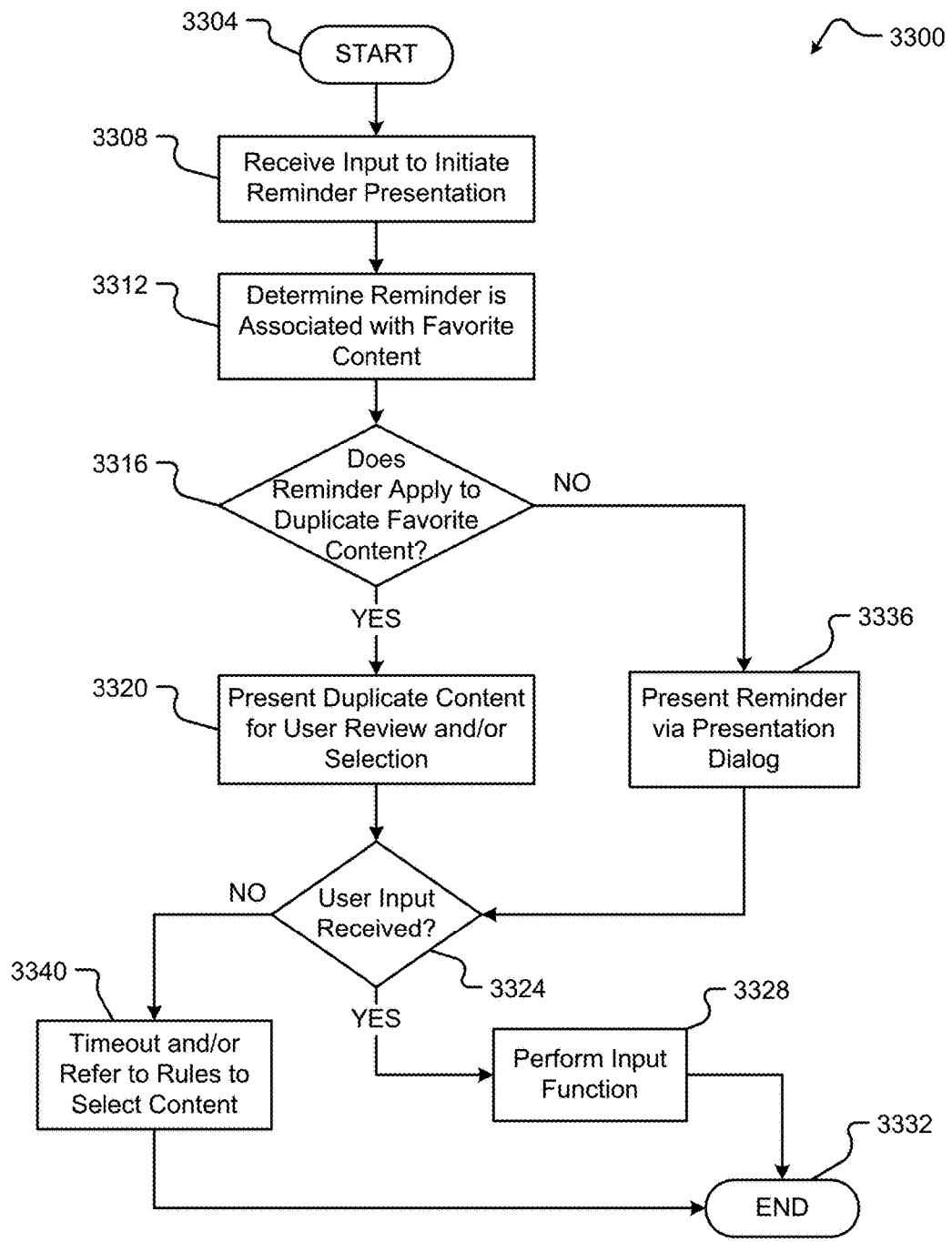
FIG. 33 is a flow diagram depicting a preferred content reminder presentation method in accordance with embodiments of the present disclosure.

FIG. 33 is a flow diagram depicting a preferred content reminder presentation method 3300 in accordance with embodiments of the present disclosure. The method 3300 begins at step 3304 and continues when the Intelligent TV 100 receives input to initiate a reminder presentation (step 3308). In some embodiments, the input may be provided by one or more of, a user, the live TV application, other applications associated with the Intelligent TV 100, and/or one or more components associated with the Intelligent TV 100. For instance, a reminder may have been set, or programmed, for a specific program or show that is scheduled to play on live TV. The reminder may be associated with an initiation condition, including but not limited to, a timer, an input from an EPG, in response to another condition, some other input, or combinations thereof.

Next, the method 3300 continues by determining whether the reminder is associated with preferred, or favorite, content (step 3312). As previously stated, a user may indicate specific content, such as one or more programs, events, channels, signal sources, combinations thereof, and the like, as preferred over other available content. In some embodiments, a user may mark content as preferred by adding the content to a preferred, or favorites, group. Content may be added to the favorites group by a user input provided via a remote control or other input device. For example, a user may select (or highlight) a program and provide a "favorite" input via a button on a remote control.

In some embodiments, the Intelligent TV 100 may determine to add content to a favorites list, or group. For instance, the Intelligent TV 100, via one or more applications, may determine at least partially based on viewing habits and recorded data that a user frequently watches a particular program or channel. Referring to rules and/or preferences, the Intelligent TV 100 may add the frequently watched program or channel to the favorites group. As disclosed herein, the favorites group, and its associated content, may be viewed in an application panel 1812 of the Intelligent TV 100. In some cases, the content comprising the favorites group may be displayed in an EPG, a list, grouped lists, tiles, genres, and the like for viewing by one or more users of the Intelligent TV 100.

Determining that a reminder is associated with favorite content may include the Intelligent TV 100 using at least one application (e.g., the live TV application, etc.) to refer to stored favorite data in memory. In one example, the favorite data may be stored in a data table in the memory. Among other things, the data table may include a content identification field and a favorite data field that can map favorites with specific content. In one embodiment, available content including, but not limited to, programs, events, channels, signal sources, genres, groups, and the like, may include a data field relating to favorite marking. For instance, a data structure associated with a program may include at least one binary digit that identifies whether the program is preferred (i.e., favorite) or not preferred. Continuing this example, a "preferred" bit of the program data structure may be marked with a "1" if the program is a favorite or a "0" if the program is not identified as a favorite. It is anticipated that this bit may be toggled via a user providing a favorite input. In any event, the Intelligent TV 100 may at least review the data structure and/or the data table associated with content to determine whether the reminder is associated with favorite content. By way of example, the Intelligent TV 100 may receive input to initiate a reminder presentation with a specific program. The Intelligent TV 100 can then refer to the data structure and/or the data table that is associated with the specific program and determine whether the specific program includes at least one favorite-identifying bit. In the event that a favorite-identifying bit is found, the reminder would be determined to be associated with favorite content.

The method 3300 continues by determining whether the reminder applies to duplicate favorite content (step 3316). Duplicate favorite content may correspond to content that is marked as favorite and is playing on at least two different channels, or signal sources, at the same time. In one embodiment, the signal sources may be differentiated by signal quality, signal definition, costs, and the like. As disclosed above, content may be associated with favorites. In some cases, content may play on at least two different channels at the same time. By way of example, a user, or Intelligent TV 100, may identify a program, such as "Home Involvement," as a favorite. Continuing the example, a user may initiate a reminder for the program so that the user is alerted via a reminder notification presentation when the program is next scheduled to play via the live TV application. In this example, the program "Home Involvement" may be playing on two different channels at the same time, or within a threshold of time as disclosed below. As such, the Intelligent TV 100 may determine that program is a favorite playing on two different channels and provide the user with selectable options and/or default selections. The selectable options may include, but are not limited to, allowing the user to select which episode of the program, quality of the program, or channel, to view.

In some embodiments, the determination of duplicate favorite content may include comparing a scheduled time that is associated for each favorite content. As such, thresholds may be set for making a positive or negative determination of duplicate favorite content. For instance, where a first program is playing on a first channel at a first time, and a duplicate program is playing on a second channel at a second time, a threshold may be set between the first and second time to make such a duplicate favorite content determination. In this example, a threshold may be set for 15 minutes, where any duplicate favorite content is determined for duplicate favorite content playing on at least two different channels within the threshold (e.g., equal to or less than the 15 minute threshold set).

If no duplicate favorite content is found, the method may continue by displaying a reminder presentation dialog (step 3336). The reminder presentation dialog displayed to the Intelligent TV 100 may resemble any one or more of the dialogs, notifications, reminder notifications, and other dialog presentations disclosed herein. Upon presenting the reminder presentation dialog, the method 3300 continues at step 3324.

In the event that duplicate favorite content is determined to apply to the reminder, the method 3300 continues by presenting the duplicate content for user review and/or selection (step 3320). The display of duplicate favorite content to an Intelligent TV may resemble the display of a multiple reminder dialog notification as disclosed along with FIGS. 29C-D. Among other things, the presentation may be displayed to an active content area 1808 of an Intelligent TV 100. Additionally or alternatively, the presentation may include identification bars associated with the duplicate content. For example, a first content identification bar may be associated with a first episode of a favorite program, while a second content identification bar may be associated with a second episode of the favorite program. A user may make a selection from at least these two options via an input provided at a remote control or other input device.

The method may continue by determining whether any user input is received by the Intelligent TV 100 (step 3324). If no user input is received by the Intelligent TV 100, the method 3300 may continue by timing out or making a default selection based at least partially on stored rules and/or preferences (step 3340). In one embodiment, the presented reminder may disappear after a preset amount of time. In another embodiment, the Intelligent TV 100 may make a default selection from at least one of the available selections provided by the reminder presentation dialog. In any event, the method 3300 ends at step 3332.

In some embodiments, the method 3300 may determine that user input is received at step 3324, in which case the method 3300 may continue by performing at least one function associated with the received input (step 3328). User input may include, but is not limited to, a selection input that can be configured to select from one or more options provided by the reminder presentation dialog, a cancellation input that may be configured to cause the reminder notification presentation dialog to disappear, an ignore input configured to delay a reminder for another time, navigational input configured to navigate to another signal source or selection, and more. Once the corresponding function is performed via the Intelligent TV 100, the method 3300 ends at step 3332.

Figure 34:
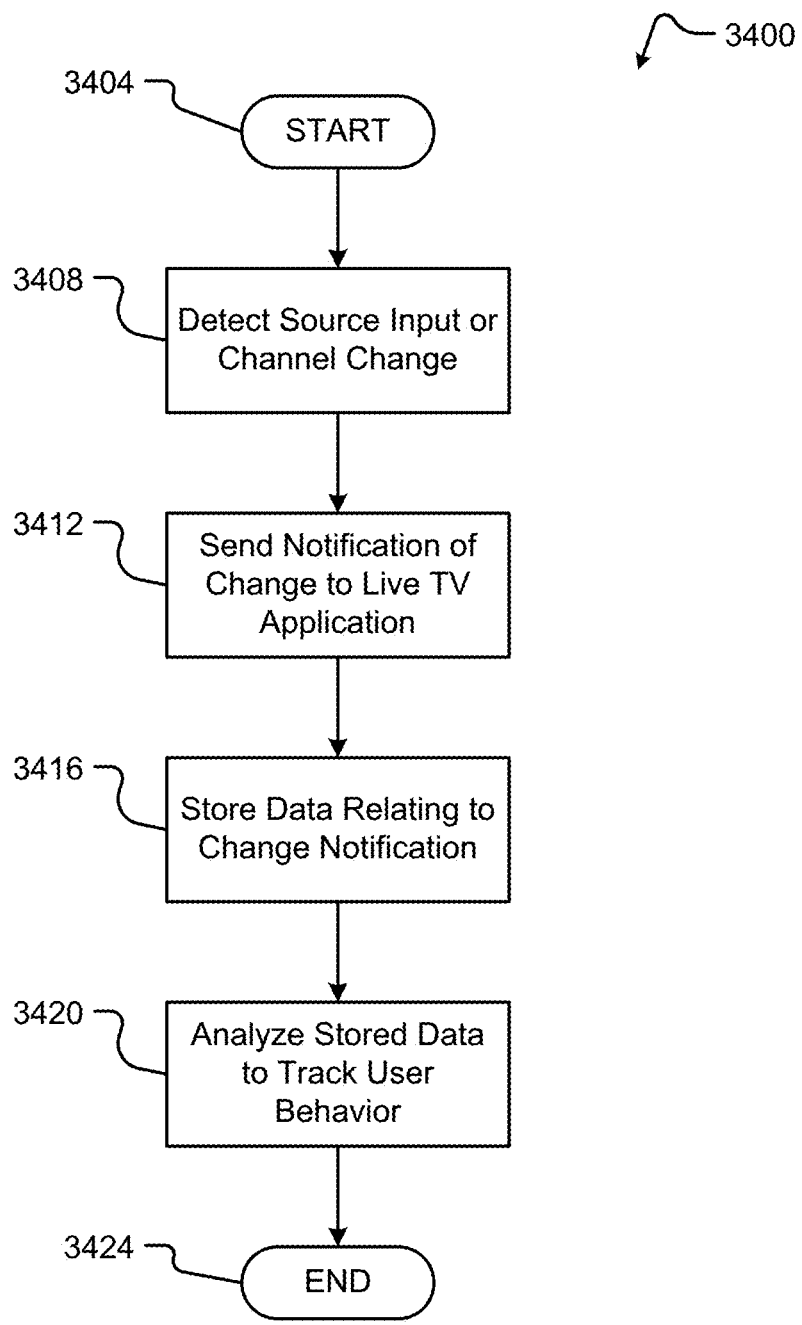
FIG. 34 is a flow diagram depicting an input-based user tracking method in accordance with embodiments of the present disclosure.

FIG. 34 is a flow diagram depicting an input-based user tracking method 3400 in accordance with embodiments of the present disclosure. The method 3400 begins at step 3404 and continues by detecting a channel, input, or other signal source change (step 3408). In some embodiments, a user may change channels of the Intelligent TV 100 via a remote control or other input device. The user inputs to change a signal source may include, but are not limited to, active selections provided directly by a user, responses to one or more notifications, default selections based on stored preferences and/or rules, and the like.

Upon detecting a change in the signal source of the Intelligent TV 100, the method 3400 continues by sending a notification to the live TV application of the Intelligent TV 100 (step 3412). The notification may be sent by one or more managers associated with DTV, analog television (ATV), input, and other sources associated with the Intelligent TV 100. In some embodiments, the one or more managers may be configured to identify a user input that changes a signal source of the Intelligent TV 100. One example of this identification may be provided by the one or more managers "listening" for a signal source change. In other words, a listener for the one or more managers may be configured to register with a source to listen for a particular event, which in this case may be a change of signal source provided by a user. The listeners may be set automatically via the live TV application. Additionally or alternatively, the listeners disclosed herein may behave in a similar manner to Java®-style program event listeners that may register to be notified of one or more events. As can be appreciated, the listeners disclosed herein may be configured to listen for events associated with one or more event source objects.

The live TV application may collect the notifications received from the one or more managers and store data relating to the change notifications in a memory (step 3416). Such data may include, but is not limited to, media consumption, channel viewing time, signal source tuning time, event viewing time, content viewing time, user identification, time of notification, content playing prior to change, new source content, and more. In some embodiments, the data may be stored in a memory location associated with a particular user or group of users. Additionally or alternatively, the data may be stored according to signal source change time. In one embodiment, the stored data may be associated with at least one time stamp. The time stamp may be useful in comparing data stored at various times that relates to user signal source changes over time.

Next, the method 3400 continues by analyzing the stored data for user behavior patterns (step 3420). Among other things, the live TV application may refer to the stored data to determine any commonalities between stored data at different times. In other words, the live TV application may review whether any commonalities exist between the user's signal source changes that are made over time. For example, the stored data from a first time may reflect that a user changed signal sources at 9:01 PM on a Tuesday, and the stored data from a second time may reflect that a user changed signal sources at 9:03 PM on the following Tuesday. The live TV application may determine that these signal source changes having occurred within two minutes but a week apart may correspond to a user behavior. In some embodiments, more data points may be obtained before a behavior is determined. As another example, a user may watch a first program every morning for a given period of time and then change signal sources to view another program for another given period of time. This behavior may be analyzed and used by the Intelligent TV 100 to configure prompts, reminders, notifications, and even anticipated signal source changes for a user. In one example, the Intelligent TV 100 may automatically change a signal source for a user based on the analyzed tracked behavior of the user. The Intelligent TV 100 may refer to rules in determining whether to automatically change a signal source. Among other things, these rules may include, but are in no way limited to, identifying a user, referring to user preferences, referring to at least one EPG, referring to a clock or timer, and the like.

It is anticipated that the stored data may be sent across a network to at least one other device associated with the Intelligent TV 100 for user behavior analysis. Additionally or alternatively, analyzed data may be sent across a network to at least one other device for use in tracking user behavior. For instance, the stored data or analyzed data may be sent to a multiple-system operator (MSO) in tracking user behavior. It is anticipated that based on the tracked user behavior, an MSO may alter its programming, offerings, presentation, or even interact with a user. In one embodiment, an MSO may interact with a user by querying why the user made the changes to the signal source or if there is anything the MSO could do to make viewing content more enjoyable. The method 3400 ends at step 3424.

Figure 35:
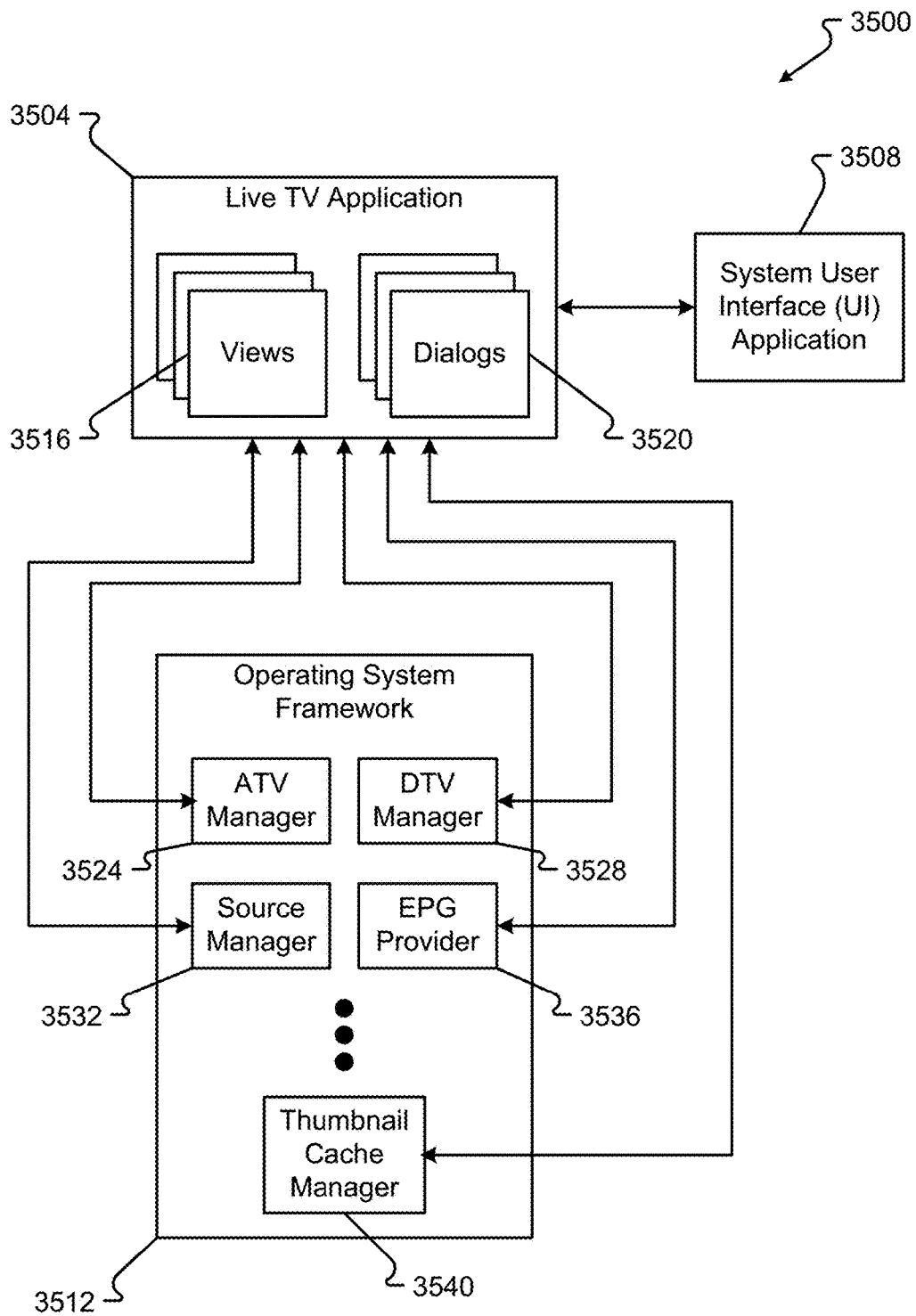
FIG. 35 is a fourth block diagram of an embodiment of the intelligent television software and/or firmware.

Referring to FIG. 35, a block diagram of the software and/or firmware of the Intelligent TV 100 is shown in accordance with embodiments of the present disclosure. Among other things, embodiments of the present disclosure anticipate using the live TV application 3504 to present views 3516 and dialogs 3520 to a display of the Intelligent TV 100. Views 3516 may include the presentation of information via one or more of a global panel 1804, an active content area 1808, an application panel 1812, combinations thereof and the like. Examples of views 3516 can include, but are not limited to, full screen EPGs, live TV header bars, on-screen channel changer, smart surfing, etc. Dialogs 3520 may include one or more of reminders, notifications, option dialogs, EPG preview windows, EPGs, and other presented information as disclosed herein. In one embodiment, the dialogs 3520 may provide one or more features to mark (e.g., add/remove favorite tagging for a channel and/or program, add/remove reminder tagging for a program, etc.) and select content (e.g., episodes, channels, etc.). Dialogs are disclosed in more detail above. Additionally or alternatively, the dialogs may be substantially similar, or equivalent, to the dialog notifications disclosed above.

In some embodiments, the live TV application 3504 may be configured to communicate with a system UI application 3508. The system UI application 3508 may provide a framework, upon which, one or more applications are built and subsequently accessed via the live TV application. In one embodiment, the system UI application 3508 may provide specific interface rules used by the live TV application 3504 in the display of content to the Intelligent TV 100. For instance, areas, regions, panels, windows, and other informational content may be set by the interface rules and the system UI application 3508. In one example, the system UI application 3508 may automatically format one or more applications for use, or display, by the live TV application 3504. Among other things, this formatting may include arranging a presentation of content that makes up the one or more applications.

The live TV application 3504 may communicate with the operating system framework 3512 and one or more of its components. In some embodiments, the operating system framework may include an ATV manager 3524, a DTV manager 3528, a source manager 3532, an EPG provider 3536, and a thumbnail cache manager 3540 to name a few. One or more of the ATV manager 3524, the DTV manager 3528, and the source manager 3532 may be configured to provide notifications, dialogs, and the like, that are disclosed in conjunction with the first time setup method 1500 and the tracking method 3400 previously disclosed. In one embodiment, the EPG provider 3536 may be substantially similar, or equivalent, to the EPG subservice 624, database 636, and content providers 616 disclosed above in conjunction with FIG. 6. Similarly, it is an aspect of the present disclosure that the thumbnail cache manager 3540 may be substantially similar, or equivalent, to the thumbnail cache manager 660 previously described in conjunction with FIG. 6.

As provided herein, the live TV application 3504 may be configured to support a user experience for one or more of changing channels, viewing channel information, viewing program information, setting up channel sets, and setting and/or clearing reminders and favorites. The live TV application 3504 may be displayed via the Intelligent TV 100 on top of any live feed. For example, a user may utilize the live TV application 3504 to change a currently displayed ATV and/or DTV channel that is supplied on a live feed. In another example, the live TV application 3504 may be used to retrieve thumbnails from thumbnail cache manager 3540. In yet another example, the live TV application 3504 may query the EPG provider 3536 for EPG listing data to be displayed via the Intelligent TV 100. As can be appreciated, the EPG listing may use thumbnails associated with live TV content that are retrieved via the live TV application 3504. Additionally or alternatively, the live TV application 3504 may receive broadcast intents to request a change of channel.

Figure 36:
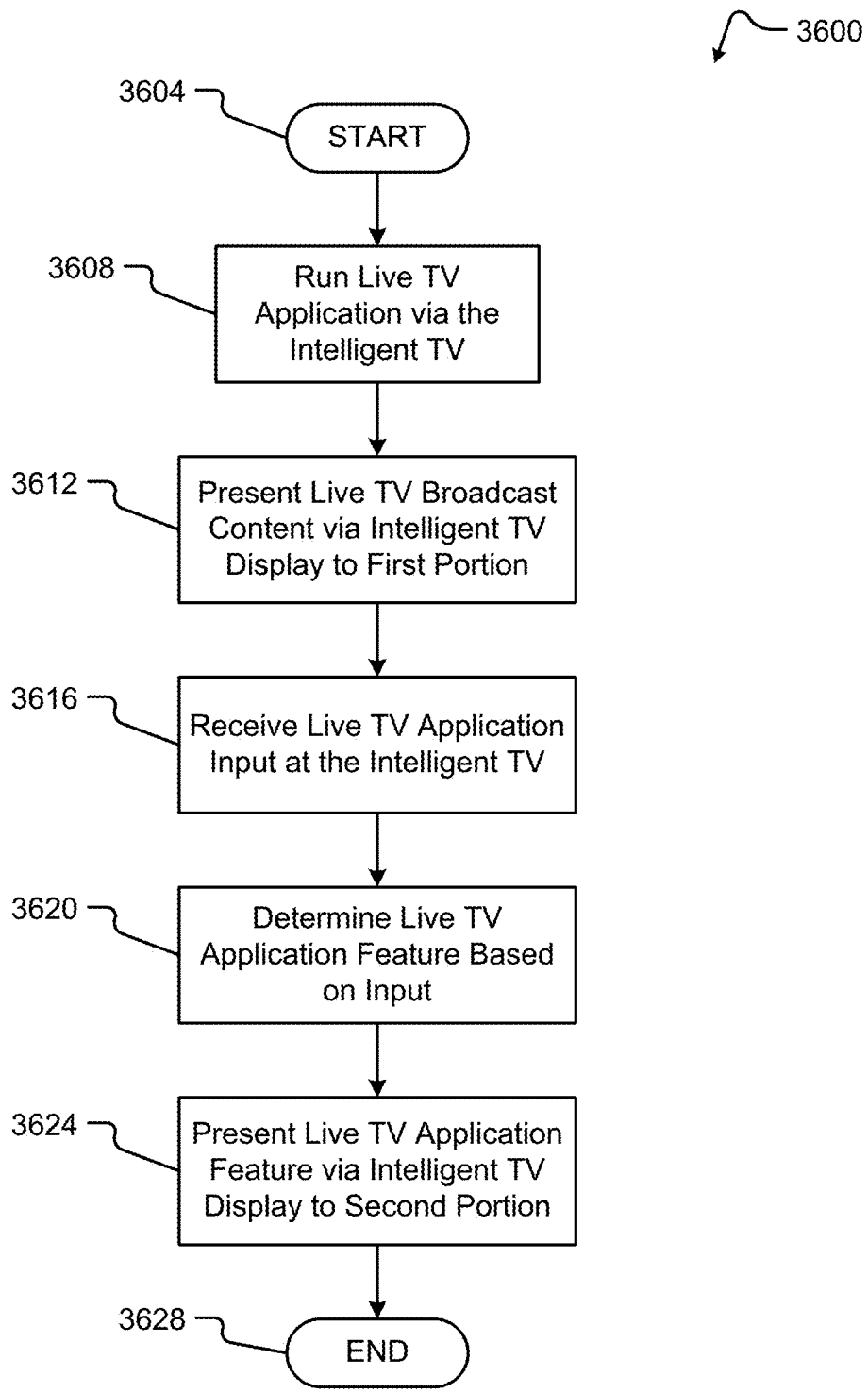
FIG. 36 is a flow diagram depicting a live TV presentation method in accordance with embodiments of the present disclosure.

FIG. 36 shows a flow diagram of a live TV presentation method 3600 in accordance with embodiments of the present disclosure. The method 3600 begins at step 3604 and proceeds by running a live TV application via the Intelligent TV 100 (step 3608). While the live TV application is running (e.g., via a processor associated with the Intelligent TV 100), the Intelligent TV 100 may simultaneously present live TV broadcast content (step 3612). In one embodiment, the live TV application 3504 may be configured to run on top of live TV content. For instance, the Intelligent TV 100 may be displaying live TV content via a display of the Intelligent TV 100. The live TV content may be displayed, or presented, to a first portion of the Intelligent TV 100. In some embodiments, the first portion of the Intelligent TV 100 may be equivalent to an area of the display of the Intelligent TV 100 that is greater than 50% of the total area of the display.

Next, the method 3600 continues by receiving an input that initiates a feature of the live TV application 3504 (step 3616). This live TV application input may be provided by at least one of, a user, an input device, automatically in response to a condition, combinations thereof and the like. In some cases, the input may be provided via a user operating the input device associated with the Intelligent TV 100. A typical input device associated with the Intelligent TV 100 may include a remote control. The remote control may be a dedicated device, a tablet, a smart phone, or other device configured to run a remote control application that is capable of communicating with the Intelligent TV 100.

A live TV application feature may then be determined based at least partially on the received input (step 3620). In some embodiments, the live TV application feature may be determined based on the input and rules stored in a memory associated with the Intelligent TV 100. Once the live TV application feature is determined, the feature may be presented to the display of the Intelligent TV 100 (step 3624). In one embodiment, the presentation of the live TV application feature may include displaying, or presenting, the feature to a second portion of the display of the Intelligent TV 100. The second portion of the display may be configured to overlap at least a portion of the first portion of the display. Additionally or alternatively, the second portion may include at least a partial transparency or translucency. This partial transparency may allow content from the first portion to be visible through the second portion. For example, while live TV content continues to display to the Intelligent TV, the live TV application may run simultaneously with the displayed live TV content. Among other things, the simultaneous playing of live TV content and live TV application functionality can allow a user access to interactive live TV application functions without interrupting live TV content displayed by the Intelligent TV 100. In some cases the live TV application feature and any associated content may include, but is not limited to, a presentation that is at least partially transparent, at least partially opaque, and combinations thereof. The method 3600 ends at step 3628.

The exemplary systems and methods of this disclosure have been described in relation to televisions and associated devices. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a television, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   detecting a first signal source change made at an intelligent television (TV), wherein the first signal source change includes changing a source of programming content from a first signal source to a second signal source, the first signal source being one of an over-the-air broadcast medium, a digital TV channel source, an analog TV channel source, a cable provider, a satellite provider, an Internet, and a multiple-system operator (MSO), and the second signal source being one of the over-the-air broadcast medium, the digital TV channel source, the analog TV channel source, the cable provider, the satellite provider, the Internet, and the multiple-system operator (MSO), the first signal source being different from the second signal source;
   sending a first notification of the first signal source change detected to a live TV application, wherein the first notification includes first viewing information associated with the first signal source change;
   storing, in a memory location of a memory associated with the intelligent TV, the first viewing information associated with the first signal source change, wherein the memory location is associated with a first user of two or more users that provide input to the intelligent TV;
   associating the first viewing information with a user of the intelligent TV by storing the first viewing information associated with the first user in the memory location associated with the first user;
   determining, based at least partially on the first viewing information, a user viewing behavior associated with the user;
   sending, across a communication network, the user viewing behavior associated with the user to a receiving device associated with a television service provider; and
   receiving, at the intelligent TV, an interaction from the television service provider based on the user viewing behavior of the first user, wherein the interaction queries the user for information about why the first signal source change was made at the intelligent TV.

2. The method of claim 1, wherein the first signal source change is made by the user.

3. The method of claim 1, further comprising:
   detecting a second signal source change made at the intelligent TV;
   sending a second notification of the second signal source change detected to the live TV application, wherein the second notification includes second viewing information associated with the second signal source change;
   storing, in the memory associated with the intelligent TV, the second viewing information associated with the second signal source change; and
   associating the second viewing information with the user of the intelligent TV.

4. The method of claim 3, further comprising:
   comparing, via a processor associated with the intelligent TV, the stored first viewing information with the stored second viewing information; and
   determining, via the processor, at least one match between the first and second viewing information.

5. The method of claim 4, further comprising:
   determining, based at least partially on the determined at least one match, a user viewing behavior associated with the user.

6. The method of claim 5, wherein the at least one match is at least one of a time associated with the first and second signal source change, a channel associated with the first and second signal source change, TV content associated with the first and second signal source change, and a viewing time of the TV content associated with the first and second signal source.

7. The method of claim 1, wherein detecting the first signal source change further comprises:
setting a listener associated with the live TV application of the intelligent TV, wherein the listener registers to be notified of one or more events associated with one or more event source objects of the intelligent TV;
monitoring, via the listener, an event associated with at least one signal source of the intelligent TV, wherein the event includes changing from a first signal source to a second signal source of the intelligent TV; and
identifying, via the live TV application, an occurrence of the event associated with the at least one signal source of the intelligent TV.

8. The method of claim 7, wherein the first signal source corresponds to a first live TV channel and the second signal source corresponds to a second live TV channel.

9. The method of claim 7, wherein the listener is set automatically via the live TV application.

10. A tangible, non-transitory computer readable medium having instructions stored thereon that, when executed by a processor, perform the method comprising:
detecting a first signal source change made at an intelligent television (TV), wherein the first signal source change includes changing a source of programming content from a first signal source to a second signal source, the first signal source being one of an over-the-air broadcast medium, a digital TV channel source, an analog TV channel source, a cable provider, a satellite provider, an Internet, and a multiple-system operator (MSO), and the second signal source being one of the over-the-air broadcast medium, the digital TV channel source, the analog TV channel source, the cable provider, the satellite provider, the Internet, and the multiple-system operator (MSO), the first signal source being different from the second signal source;
sending a first notification of the first signal source change detected to a live TV application, wherein the first notification includes first viewing information associated with the first signal source change;
storing, in a memory location of a memory associated with the intelligent TV, the first viewing information associated with the first signal source change, wherein the memory location is associated with a first user of two or more users that provide input to the intelligent TV;
associating the first viewing information with a user of the intelligent TV by storing the first viewing information associated with the first user in the memory location associated with the first user;
determining, based at least partially on the first viewing information, a user viewing behavior associated with the first user;
sending, across a communication network, the user viewing behavior associated with the first user to a receiving device associated with a television service provider; and
receiving, at the intelligent TV, an interaction from the television service provider based on the user viewing behavior of the first user, wherein the interaction queries the user of the intelligent TV for information about why the first signal source change was made at the intelligent TV.

11. The tangible, non-transitory computer readable medium of claim 10, wherein the first signal source change is made by the user.

12. The tangible, non-transitory computer readable medium of claim 10, wherein the method further comprises:
detecting a second signal source change made at the intelligent TV;
sending a second notification of the second signal source change detected to the live TV application, wherein the second notification includes second viewing information associated with the second signal source change;
storing, in the memory associated with the intelligent TV, the second viewing information associated with the second signal source change; and
associating the second viewing information with the user of the intelligent TV.

13. The tangible, non-transitory computer readable medium of claim 12, wherein the method further comprises:
comparing, via a processor associated with the intelligent TV, the stored first viewing information with the stored second viewing information; and
determining, via the processor, at least one match between the first and second viewing information.

14. The tangible, non-transitory computer readable medium of claim 13, wherein the method further comprises:
determining, based at least partially on the determined at least one match, a user viewing behavior associated with the user.

15. The tangible, non-transitory computer readable medium of claim 14, wherein the at least one match is at least one of a time associated with the first and second signal source change, a channel associated with the first and second signal source change, TV content associated with the first and second signal source change, and a viewing time of the TV content associated with the first and second signal source.

16. The tangible, non-transitory computer readable medium of claim 10, wherein detecting the first signal source change of the method further comprises:
setting a listener associated with the live TV application of the intelligent TV, wherein the listener registers to be notified of one or more events associated with one or more event source objects of the intelligent TV;
monitoring, via the listener, an event associated with at least one signal source of the intelligent TV, wherein the event includes changing from a first signal source to a second signal source of the intelligent TV; and
identifying, via the live TV application, an occurrence of the event associated with the at least one signal source of the intelligent TV.

17. The tangible, non-transitory computer readable medium of claim 16, wherein the first signal source corresponds to a first live TV channel and the second signal source corresponds to a second live TV channel.

18. The tangible, non-transitory computer readable medium of claim 16, wherein the listener is set automatically via the live TV application.

19. A system, comprising:
an intelligent television (TV) having a display and a tuner, wherein the tuner is configured to receive and convert broadcast content signals to be displayed by the display;
an input device associated with the intelligent TV;
a memory; and
a microprocessor that:
detects a first signal source change made at the intelligent TV, wherein the first signal source change includes changing a source of programming content from a first signal source to a second signal source, the first signal source being one of an over-the-air broadcast medium, a digital TV channel source, an analog TV channel source, a cable provider, a satellite provider, an Internet, and a multiple-system operator (MSO), and the second signal source being one of the over-the-air broadcast medium, the digital TV channel source, the analog TV channel source, the cable provider, the satellite provider, the Internet, and the multiple-system operator (MSO), the first signal source being different from the second signal source;

sends a first notification of the first signal source change detected to a live TV application, wherein the first notification includes first viewing information associated with the first signal source change;

stores, in a memory location of the memory, the first viewing information associated with the first signal source change, wherein the memory location is associated with a first user of two or more users that provide input to the intelligent TV;

associates the first viewing information with a user of the intelligent TV by storing the first viewing information associated with the first user in the memory location associated with the first user;

determines, based at least partially on the first viewing information, a user viewing behavior associated with the first user;

sends, across a communication network, the user viewing behavior associated with the first user to a receiving device associated with a television service provider; and receives, at the intelligent TV, an interaction from the television service provider based on the user viewing behavior of the first user, wherein the interaction queries the user of the intelligent TV for information about why the first signal source change was made at the intelligent TV.

20. The system of claim 19, wherein the first signal source change is made via the input device associated with the intelligent TV.

* * * * *